(12) United States Patent  
Ishida

(10) Patent No.: US 9,412,015 B2  
(45) Date of Patent: Aug. 9, 2016

(54) IMAGE-CAPTURING APPARATUS, CAPTURED IMAGE PROCESSING SYSTEM, AND RECORDING MEDIUM

(71) Applicant: SHARP KABUSHIKI KAISHA, Osaka-shi, Osaka (JP)

(72) Inventor: Hiroshi Ishida, Osaka (JP)

(73) Assignee: Sharp Kabushiki Kaishi, Osaka-shi (JP)

( * ) Notice: Subject to any disclaimer, the term of this patent is extended or adjusted under 35 U.S.C. 154(b) by 78 days.

(21) Appl. No.: 14/372,628

(22) PCT Filed: Jan. 11, 2013

(86) PCT No.: PCT/JP2013/050483
§ 371 (c)(1),
(2) Date: Jul. 16, 2014

(87) PCT Pub. No.: WO2013/108727
PCT Pub. Date: Jul. 25, 2013

(65) Prior Publication Data
US 2014/0362248 A1  Dec. 11, 2014

(30) Foreign Application Priority Data

Jan. 17, 2012 (JP) ................................. 2012-007558
Jun. 22, 2012 (JP) ................................. 2012-141415

(51) Int. Cl.
*G06K 9/00* (2006.01)
*H04N 1/387* (2006.01)
(Continued)

(52) U.S. Cl.
CPC .......... *G06K 9/00442* (2013.01); *G06K 9/4604* (2013.01); *G06T 5/006* (2013.01); *G06T 7/0085* (2013.01); *H04N 1/3878* (2013.01); *H04N 1/4092* (2013.01); *H04N 5/142* (2013.01);
(Continued)

(58) Field of Classification Search
None
See application file for complete search history.

(56) References Cited

U.S. PATENT DOCUMENTS

2005/0078192 A1  4/2005  Sakurai et al.
2007/0070207 A1  3/2007  Sakurai
2009/0225180 A1*  9/2009  Maruyama ............. G06T 5/006
348/222.1

FOREIGN PATENT DOCUMENTS

JP  2005-122320 A  5/2005
JP  2005-303941 A  10/2005
(Continued)

OTHER PUBLICATIONS

Saito, "Breaking the Limit of the Sampling Theorem: Super-Resolution Oversampling from a Single Image", Image Information and Television Engineers Journal, 2008, vol. 62, No. 2, pp. 181-189.
(Continued)

*Primary Examiner* — Jon Chang
(74) *Attorney, Agent, or Firm* — Birch, Stewart, Kolasch & Birch, LLP

(57) ABSTRACT

A mobile terminal apparatus includes a geometrical arrangement detecting section (111) detecting groups of edge pixels arranged in a shape of a line segment in an image captured by an image-capturing apparatus; and a display processing section (112) causes a contour line representative of a contour of a rectangular captured object to be displayed on the captured image displayed on a display section so that the contour line is superimposed on the groups of edge pixels detected by the geometrical arrangement detecting section (111).

20 Claims, 40 Drawing Sheets

(51) Int. Cl.
*H04N 5/14* (2006.01)
*H04N 5/232* (2006.01)
*G06T 5/00* (2006.01)
*G06T 7/00* (2006.01)
*H04N 1/409* (2006.01)
*G06K 9/46* (2006.01)
*H04N 5/357* (2011.01)
*H04N 5/262* (2006.01)
*G06K 9/36* (2006.01)

(52) U.S. Cl.
CPC ....... *H04N5/23206* (2013.01); *H04N 5/23245* (2013.01); *H04N 5/23248* (2013.01); *H04N 5/23293* (2013.01); *H04N 5/2621* (2013.01); *H04N 5/3572* (2013.01); *G06K 2009/363* (2013.01); *G06T 2207/20136* (2013.01); *G06T 2207/30176* (2013.01)

(56) References Cited

FOREIGN PATENT DOCUMENTS

| | | |
|---|---|---|
| JP | 2006-237757 A | 9/2006 |
| JP | 2007-43545 A | 2/2007 |

OTHER PUBLICATIONS

Tanaka et al., "Super-resolution: High-resolution Image Reconstruction from Multiple Low-resolution Images", Image Information and Television Engineers Journal, 2008, vol. 62, No. 3, pp. 337-342.

Tomasi et al., "Bilateral Filtering for Gray and Color Images", Proceedings of the 1998 IEEE International Conference on Computer Vision, Bombay, India.

* cited by examiner

FIG. 5
Original luminance image
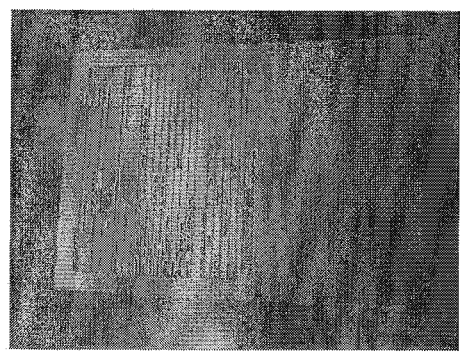
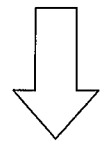
After application of Canny filter
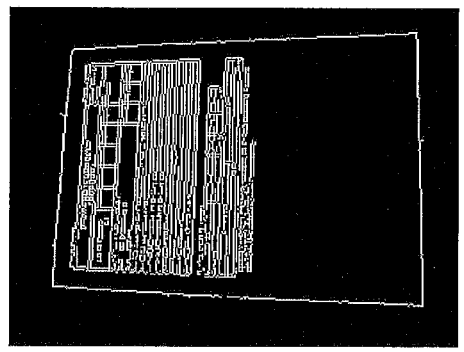

| MN | 0 |
|---|---|
| MN+△ | 1 |
| MN+△×2 | 2 |
| MN+△×3 | 3 |
| MN+△×4 | 4 |
| ⋮ | ⋮ |
| ⋮ | ⋮ |
| MN+△×255 | 255 |

(a)
$A=((1)+(5))/2$
$B=(9\times(2)+4\times(6))/13$
$C=(9\times(4)+4\times(8))/13$ (b)
$A=((1)+(2))/2$
$B=(2)$
$C=((4)+(5))/2$ (c)
$A=((1)+(2)+(4))/3$
$B=(9\times(2)+4\times(4))/13$
$C=(4\times(2)+9\times(4))/13$ (d)
$A=((1)+(4))/2$
$B=((2)+(5))/2$
$C=(4)$

FIG. 35

| tan Θ | Θ |
|---|---|
| −0.17632698 | −10.0 |
| −0.17452794 | −9.9 |
| −0.17272999 | −9.8 |
| −0.17093313 | −9.7 |
| −0.16913734 | −9.6 |
| −0.16734261 | −9.5 |
| −0.16554893 | −9.4 |
| ⋮ | ⋮ |
| 0.16554893 | 9.4 |
| 0.16734261 | 9.5 |
| 0.16913734 | 9.6 |
| 0.17093313 | 9.7 |
| 0.17272999 | 9.8 |
| 0.17452794 | 9.9 |
| 0.17632698 | 10.0 |

IMAGE-CAPTURING APPARATUS, CAPTURED IMAGE PROCESSING SYSTEM, AND RECORDING MEDIUM

TECHNICAL FIELD

The present invention relates to a captured image processing system in which an image captured by an image-capturing apparatus is outputted by an image output apparatus.

BACKGROUND ART

Along with progress of Internet technologies, there are increasing opportunities to save an image captured with the use of a mobile terminal apparatus such as a mobile phone. In addition, there are increasing opportunities to take not only images of landscapes, portraits, etc. but also images of explanatory diagrams and texts displayed in exhibitions etc. and images of slides used in academic conferences. In saving such an image taken with the use of a mobile terminal apparatus, a user generally uses a file name automatically given based on information such as a shooting date or creates a file name by himself or herself.

Patent Literature 1 discloses a technique of finding a contour of an image on the basis of data of the image that is captured and stored in a storage section and finding a shape of a captured object on the basis of the contour. Then, a projection parameter of the shape of the captured object and an actual object is obtained, and image conversion is carried out with the use of this projection parameter.

CITATION LIST

Patent Literature 1

Japanese Patent Application Publication, Tokukai, No. 2005-122320 A (Publication Date: May 12, 2005)

SUMMARY OF INVENTION

Technical Problem

However, according to technique disclosed in Patent Literature 1, which is a technique for finding a shape of a captured object on the basis of image data captured and stored in the storage section, it is necessary to carry out capturing again in a case where a desired shape could not be extracted. Moreover, even if a desired shape could be extracted, part of the object cannot be captured in a case where part of the captured object is outside a captured image area.

The present invention was accomplished in view of the above problems, and an objective of the present invention is to provide an image-capturing apparatus, a captured image processing system, a program and a recording medium which make it possible to easily check a position of an object in a captured image area before storing image data in a storage section.

Solution to Problem

In order to attain the above objective, an image-capturing apparatus of an embodiment of the present invention includes: an image-capturing section capturing an object, which is rectangular; display means for displaying a captured image, which is an image captured by the image-capturing section; an output target image determining section determining, as an output target image, the captured image displayed on the display means at a designated timing; a detecting section detecting groups of edge pixels arranged in a shape of a line segment on the image captured by the image-capturing section; and a display processing section causing a contour line representative of a contour of the object to be displayed on the captured image displayed on the display means in such a manner that the contour line is superimposed on the groups of edge pixels detected by the detecting section.

A captured image processing system of an embodiment of the present invention includes: the image-capturing apparatus; and an image output apparatus, the image output apparatus acquiring image data representative of an output target image determined by the output target image determining section and outputting the image data or processed image data obtained by subjecting the image data to image processing.

Advantageous Effects of Invention

The present invention produces an effect that it is possible to provide an image-capturing apparatus which makes it possible to easily check a position of an object in a captured image area before storing image data in a storage section.

BRIEF DESCRIPTION OF DRAWINGS

FIG. 5 shows an example of how an edge image is generated.

FIG. 28 shows a method for determining pixel values of interpolation pixels.

FIG. 32 shows an example of a screen obtained in a case where an automatic shutter function is on.

FIG. 35 shows an angle of skew θ and a value of tangent of the skew θ in the example of FIG. 34.

DESCRIPTION OF EMBODIMENTS

An embodiment of the present invention is described below in detail.

(1) Overall Configuration of Captured Image Processing System

Figure 1:
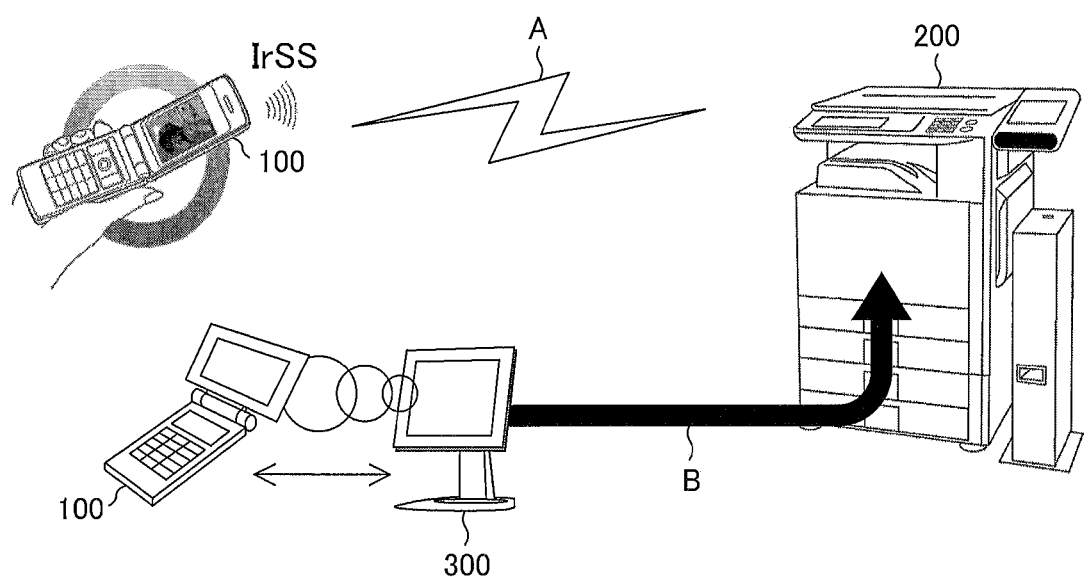
FIG. 1 shows an overall configuration of a captured image processing system of an embodiment of the present invention.

FIG. 1 shows an overall configuration of a captured image processing system of the present invention. As illustrated in FIG. 1, the captured image processing system includes a mobile terminal apparatus (image-capturing apparatus) 100, such as a camera-equipped mobile phone or a digital still camera, that includes image-capturing means; an image forming apparatus (image output apparatus) 200 such as a multifunction printer or a printer; and an image display apparatus (image output apparatus) 300 such as an information display and an electronic blackboard.

The mobile terminal apparatus 100 is carried around by a user. The user can capture an object in various situations with the use of the mobile terminal apparatus 100.

In the present embodiment, the mobile terminal apparatus 100 has a function of a document capturing mode of capturing a rectangular object such as a sheet or a poster on which a document image is printed, a display screen on which a document image is displayed (e.g. a display screen or a screen on which an image is projected by a projector) and causing the captured image to be outputted from the image forming apparatus 200 or the image display apparatus 300. That is, the mobile terminal apparatus 100 transmits, to the image forming apparatus 200 or the image display apparatus 300, image data (hereinafter referred to as output target image data) that is obtained by the capturing in the document capturing mode and is to be outputted from the image forming apparatus 200 or the image display apparatus 300.

The image forming apparatus 200 carries out predetermined image processing on the received output target image data, and then outputs the output target image data that has been subjected to the image processing (hereinafter referred to as corrected image data) or an image represented by the corrected image data. The image display apparatus 300 carries out display processing for displaying the output target image data.

It is not always possible for a user to capture a rectangular object (e.g. a sheet or a poster on which a document image is printed or a display screen on which a document image is displayed) while standing in front of the object. That is, the user sometimes captures the object from an oblique direction in such a state that a normal of a plane on which the document image is formed does not coincide with a capturing direction of the image-capturing means. In this case, the object is sometimes captured in a state in which part of the object is outside an image area captured by the image-capturing means, i.e., in a state in which part of the object is missing. In such a case, the object is captured in a state in which part of information desired by the user is missing. In the present embodiment, the mobile terminal apparatus 100 has a function of preventing, while the document capturing mode is selected, an object from being captured in such a state in which part of the object is outside the captured image area.

Examples of output processing executed by the image forming apparatus 200 encompass printing processing of printing/outputting an image represented by corrected image data, filing processing of storing output target image data in a storage apparatus such as a server or a USB memory, and e-mail sending processing of sending an e-mail to which corrected image data is attached. Output processing executed by the image display apparatus 300 is display processing of displaying the output target image data.

The mobile terminal apparatus 100 and the image forming apparatus 200 are capable of communicating with each other. As described above, the mobile terminal apparatus 100 transmits the output target image data to the image forming apparatus 200. As a method of communication between the mobile terminal apparatus 100 and the image forming apparatus 200, there are a method shown by the sign "A" and a method shown by the sign "B" in FIG. 1. The method shown by the sign "A" is a wireless communication method based on any one of infrared communication standards such as IrSimple. The method shown by the sign is contactless wireless communication such as Felica (registered trademark). Specifically, the method shown by the sign "B" is a method of once transmitting the output target image data to the image display apparatus 300 and then transferring the data from the image display apparatus 300 to the image forming apparatus 200 with the use of wireless communication such as Bluetooth (registered trademark). In the present embodiment, it is assumed that a user operates the mobile terminal apparatus 100 in front of the image forming apparatus 200 and transmits data from the mobile terminal apparatus 100 to the image forming apparatus 200 with the use of a short-range wireless communication method such as infrared communication.

The image display apparatus 300 is, for example, an information display or an electronic black board which is made up of a liquid crystal display, a plasma display, an organic electroluminescence display, or the like. The image display apparatus 300 carries out display processing of displaying an image represented by the output target image data. This display processing is one kind of output processing of outputting the output target image data. That is, it can be said that the image display apparatus 300 is an image output apparatus that carries out output processing of outputting the output target image data. It is also possible that after the image represented by the output target image data is displayed on the image display apparatus 300, the image is printed by the image forming apparatus 200, transmitted to another address by e-mail, or stored in a computer or a server or the like connected via a network.

Note that a method of communication among the mobile terminal apparatus 10, the image forming apparatus 200 and the image display apparatus 300 is not limited to those described above, and can be one utilizing a known communication method. For example, the output target image data may be transmitted to the image forming apparatus 200 or the image display apparatus 300 as an attachment to an e-mail.

(2) Configuration of Mobile Terminal Apparatus

Figure 2:
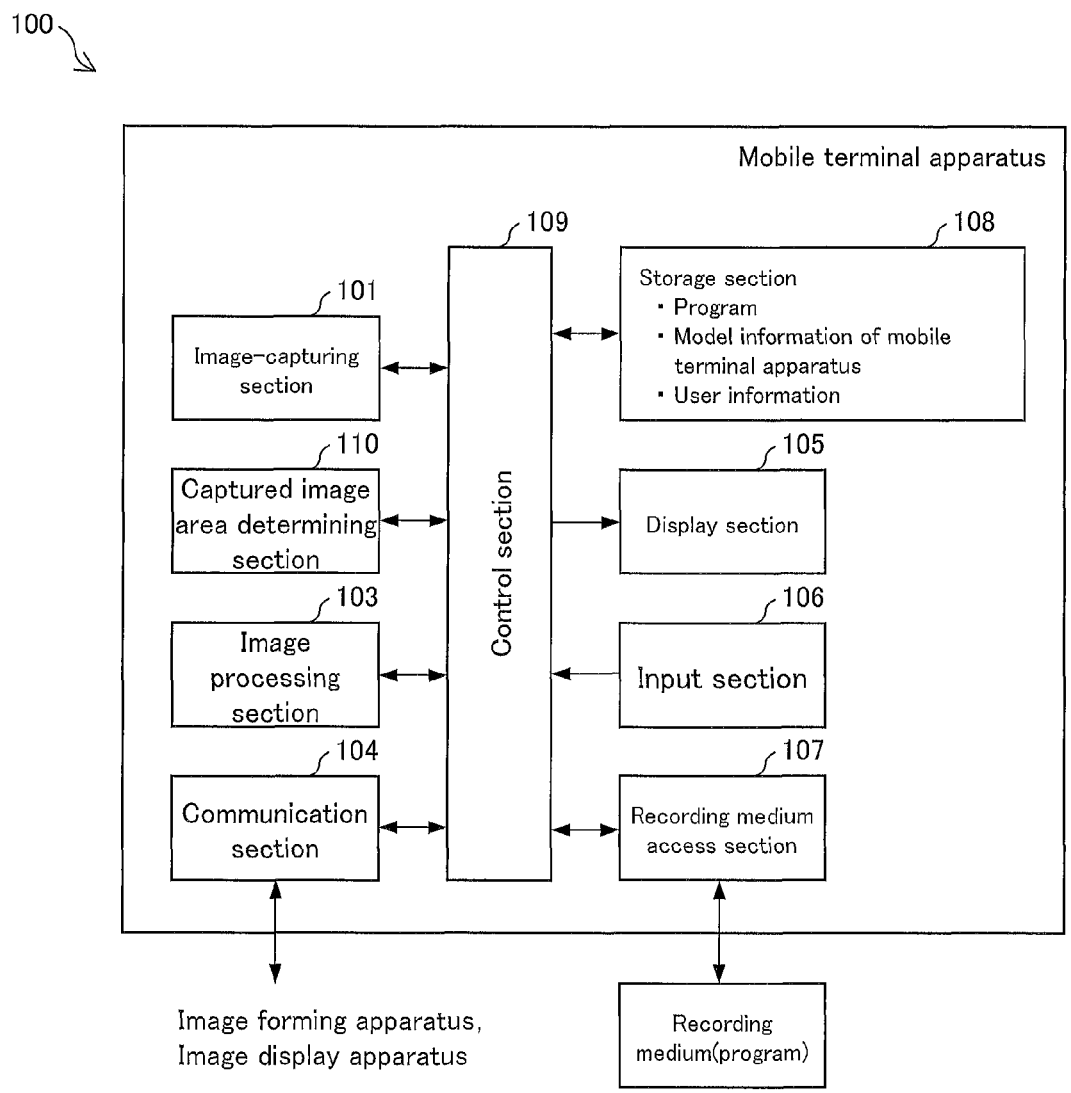
FIG. 2 is a block diagram showing a configuration of a mobile terminal apparatus of the embodiment of the present invention.

First, with reference to, FIG. 2, the mobile terminal apparatus 100 of the present embodiment is described. FIG. 2 is a block diagram showing a configuration of the mobile terminal apparatus 100. As illustrated in FIG. 2, the mobile terminal apparatus 100 includes an image-capturing section 101, a captured image area determining section 110, an image processing section 103, a communication section (transmitting section) 104, a display section 105, an input section 106, a recording medium access section 107, a storage section 108, and a control section 109.

The image-capturing section 101 captures an object with the use of a CCD sensor or a CMOS sensor, and then causes the display section 105 to display a captured image obtained by capturing the object. Note that the image-capturing section 101 captures an object at preset resolution. Note also that a range (hereinafter referred to as a captured image area) captured by the image-capturing section 101 is determined in accordance with a present zooming ratio. It is assumed here that the captured image area is a rectangle that is Xmax in width and Ymax in height.

In a case where the document capturing mode is selected by a user, the captured image area determining section 110 determines, based on the captured image captured by the image-capturing section 101 and displayed on the display section 105, whether the rectangular captured object is within the captured image area. Further, the captured image area determining section 110 causes image data representing the captured image displayed on the display section 105 to be stored in the storage section 108 as output target image data at a designated timing. Details of the captured image area determining section 110 will be described later.

The image processing section 103 carries out at least A/D converting processing on the output target image data stored in the storage section 108 by the image-capturing section 101.

The communication section 104 has a serial transfer/parallel transfer function based on USB (Universal Serial Bus) 1.1 or USB 2.0 and a wireless data communication function. The communication section 104 transmits the output target image data to the image forming apparatus 200 or the image display apparatus 300 in accordance with a transmission instruction inputted by a user.

The display section 105 is, for example, constituted by a liquid crystal display. The input section 106 has a plurality of buttons and accepts data input etc. by a user.

The recording medium access section 107 reads out, from a recording medium, a program for carrying out each processing of the mobile terminal apparatus 100.

The storage section 108 stores therein the program for carrying out each processing of the mobile terminal apparatus 100, model information of the mobile terminal apparatus 100, user information, and data needed for execution of the processing. The user information is information for identifying a user of the mobile terminal apparatus 100. The user information is, for example, a user ID, a password, or the like. Moreover, the storage section 108 stores therein the output target image data obtained by capturing by the document capturing mode and accompanying information (e.g. output processing information (described later), file name).

The control section 109 controls each section of the mobile terminal apparatus 100. Upon input of an instruction to select the document capturing mode to the input section 106, the control section 109 causes the display section 105 to display a screen prompting the user to input an instruction to select the type of output processing of the image forming apparatus 200 (e.g. printing processing, filing processing, e-mail sending processing) and a setting condition (e.g. a printing condition such as the number of printing, an address of a filing destination server, an e-mail destination address) for execution of the selected output processing. Then, the control section 109 obtains output processing information indicative of the type of output processing and the setting condition for the output processing.

The control section 109 appends a file name and the output processing information to the output target image data stored in the storage section 108.

Upon input of a transmission instruction to the input section 106, the control section 109 causes the communication section 104 to execute transmitting processing of transmitting the output target image data stored in the storage section 108 to the image forming apparatus 200 or the image display apparatus 300. Together with the output target image data, the communication section 104 transmits, to the image forming apparatus 200 or the image display apparatus 300, the file name and output processing information that are associated with the output target image data and model information and the user information that are stored in the storage section 108.

Figure 3:
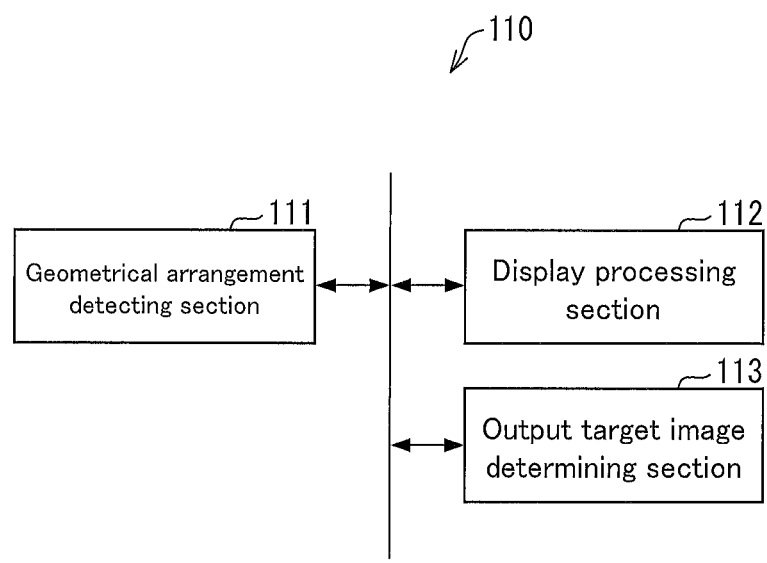
FIG. 3 is a block diagram showing a configuration of a captured image area determining section of the mobile terminal apparatus.

(3) Captured Image Area Determining Section (3-1) Configuration of Captured Image Area Determining Section Next, the following describes a detailed configuration of the captured image area determining section 110 of the mobile terminal apparatus 100. FIG. 3 is a block diagram illustrating an internal configuration of the captured image area determining section 110. As illustrated in FIG. 3, the captured image area determining section 110 includes a geometrical arrangement detecting section 111, a display processing section 112, and an output target image determining section 113.

The geometrical arrangement detecting section 111 extracts groups of edge pixels that form a boundary between a captured object and a background assuming that the captured object has a rectangular shape, and thus detects geometrical arrangement (geometrical distortion) of the captured object.

The display processing section 112 causes a contour line representative of a contour of the captured object to be displayed on a captured image displayed on the display section 105 in such a manner that the contour line overlaps the groups of edge pixels detected by the geometrical arrangement detecting section 111. This allows a user to easily check by the contour line whether the captured object is within the captured image area or not.

Moreover, the display processing section 112 determines, based on the geometrical arrangement of the captured object, whether the captured object is within the captured image area or not, and causes the display section 105 to display a result of the determination. This allows a user to more easily check by the result of the determination whether the captured object is within the captured image area or not. In a case where the captured object is not within the captured image area, the user can change a direction and a position of the mobile terminal apparatus 100 so that the captured object is within the captured image area.

The output target image determining section 113 determines, as output target image data, image data representing the captured image displayed on the display section 105 at a designated timing, and causes the output target image data to be stored in the storage section 108.

(3-2) Processing of Captured Image Area Determining Section

Figure 4:
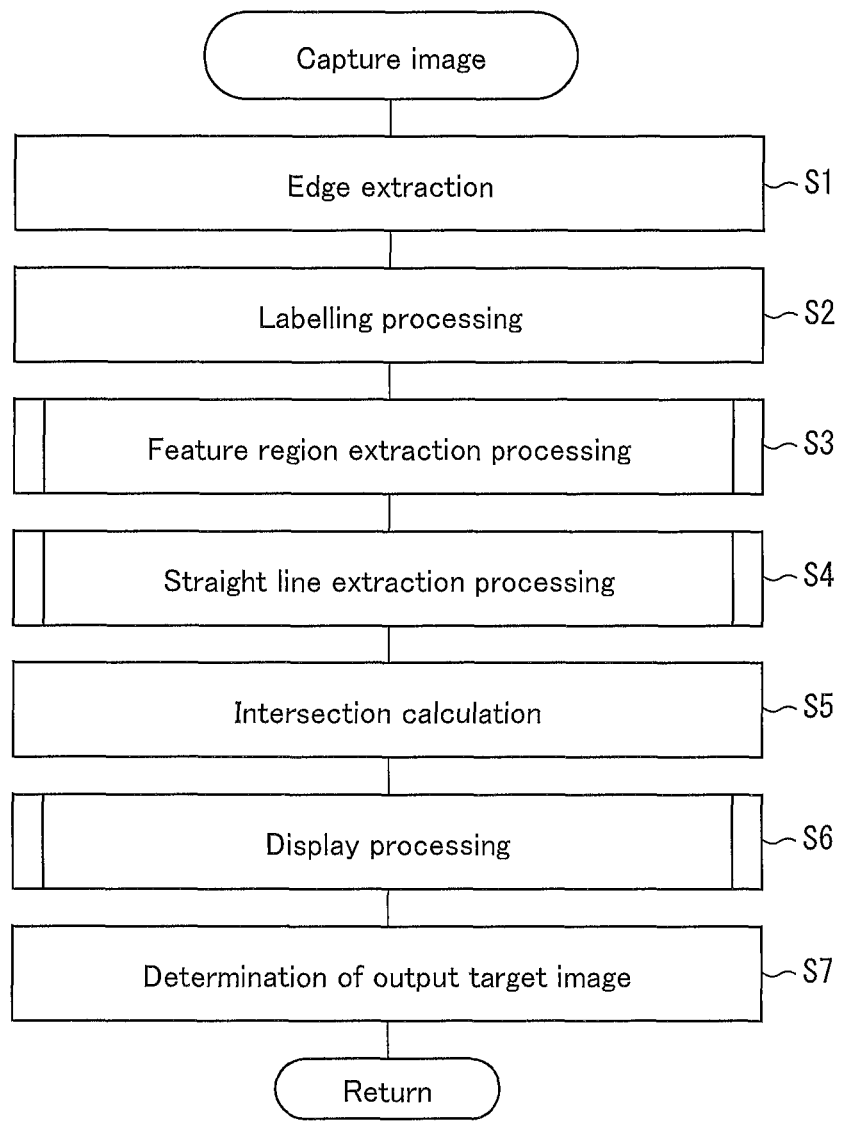
FIG. 4 is a flow chart showing an example of processes carried out by the captured image area determining section.

The following describes an example of specific processing of the captured image area determining section 110. FIG. 4 is a flow chart showing an example of the processing of the captured image area determining section 110.

(Step 1 (S1))

First, the geometrical arrangement detecting section 111 extracts edge pixels from a captured image that is captured by the image-capturing section 101 and is being displayed on the display section 105. Then, the geometrical arrangement detecting section 111 generates an edge image in which edge pixels are indicated by "1" and non-edge pixels are indicated by "0".

The edge pixels are extracted, for example, by applying a Canny filter to a luminance image captured by the image-capturing section 101. The Canny filter is a filter for detecting a thinned edge with the use of a Gaussian filter and a Sobel filter. Note that an image size may be reduced for speed-up of processing. Furthermore, for improvement of accuracy of detection of edge pixels, smoothing may be performed before the filtering processing or morphology conversion such as expansion and contraction may be performed after the filtering processing.

FIG. 5 shows an edge image extracted from a luminance image. The upper part of FIG. 5 shows the luminance image, and the lower part of FIG. 5 shows the edge image.

(Step S2 (S2))

Next, the geometrical arrangement detecting section 111 carries out labelling processing of giving different labels to respective regions of connected edge pixels (connected edge regions).

Figure 6:
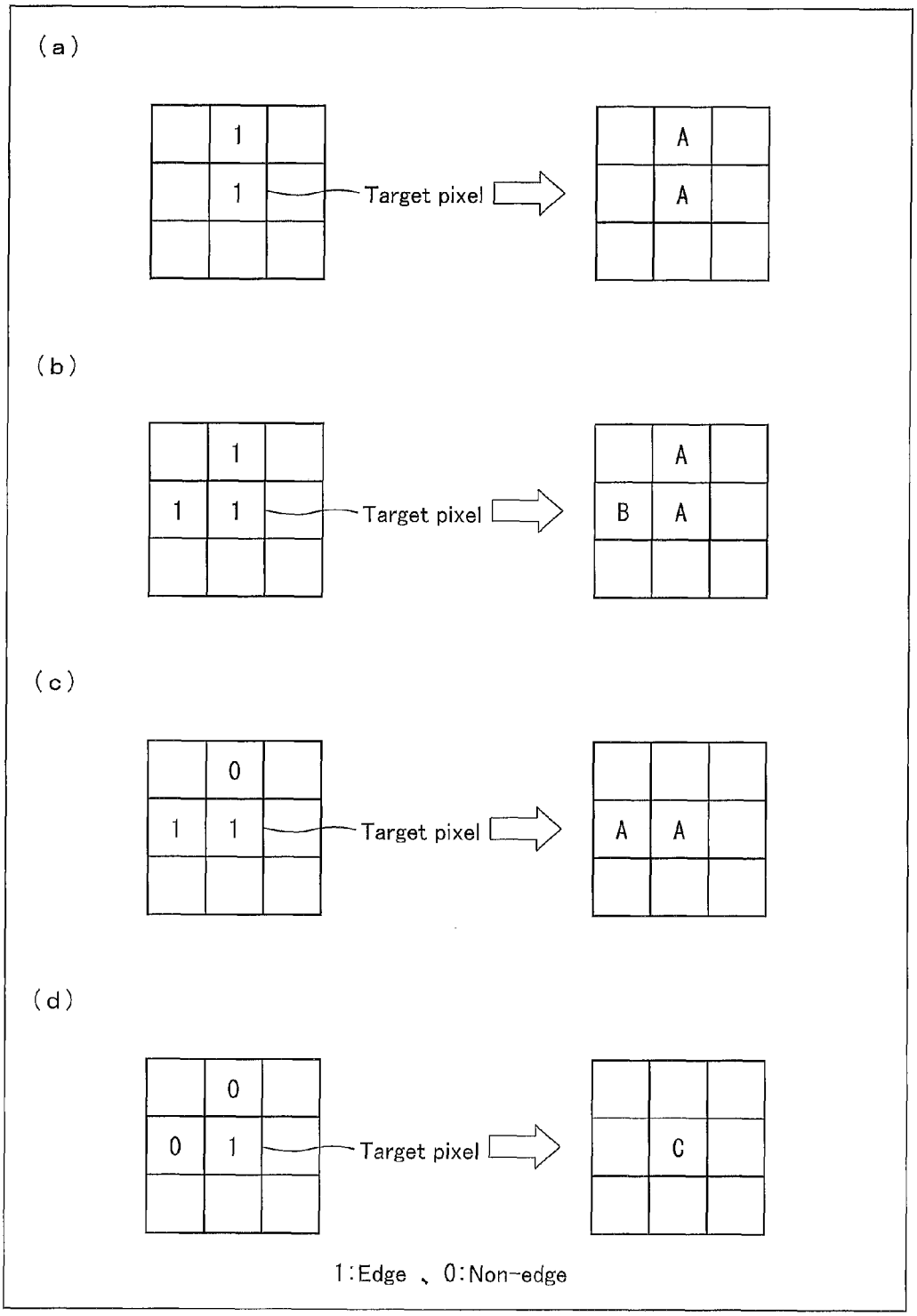
FIG. 6 shows a method of labelling of a connected edge region.

The geometrical arrangement detecting section 111 carries out the labelling by the following method as shown in FIG. 6:

(I) In a case where a target pixel is an edge pixel and where an upper adjacent pixel is an edge pixel that has been given a label, the target pixel is given the same label ((a) of FIG. 6).

(II) In a case where a left adjacent pixel is an edge pixel that has been given a label different from the upper adjacent pixel, the target pixel is given the same label as the label of the upper adjacent pixel ((b) of FIG. 6).

(III) In a case where the upper adjacent pixel is a non-edge pixel and the left adjacent pixel is an edge pixel, the target pixel is given the same label as the left adjacent pixel ((c) of FIG. 6).

(IV) In a case where both of the upper adjacent pixel and the left adjacent pixel are a non-edge pixel, the target pixel is given a new label ((d) of FIG. 6).

(V) All of the edge pixels are labelled.

(VI) In a case where there is a pixel given a plurality of labels, the pixel is given a single label in accordance with the above rule.

(Step 3 (S3))

Next, the geometrical arrangement detecting section 111 extracts, from the connected edge regions that have been labelled, a candidate of a region (hereinafter referred to as a feature region) including the boundary between the captured object and the background (S3).

The captured object is generally captured in such a manner that it occupies a large part of the captured image area with its center close to the center of the captured image area. Accordingly, the boundary between the captured object and the background has its center in the vicinity of the center of the captured image area and is long in length in a lateral direction (width direction) and a longitudinal direction (height direction) of the captured image area. The geometrical arrangement detecting section 111 extracts, as a feature candidate, a connected edge region that satisfies the following condition A.

Condition A: Assume that an upper left corner of the captured image area is an origin, a rightward direction (width direction) is an x axis, a downward direction (height direction) is a y axis, an x coordinate of a right end of the captured image area is Xmax, and a y coordinate of a lower end of the captured image area is Ymax. In this case, a length of a connected edge region in the width direction is ¼ or larger than the width (i.e., Xmax) of the captured image area, a length of the connected edge region in the height direction is ¼ or larger than the height (i.e., Ymax) of the captured image area, an x coordinate of a center of the connected edge region is Xmax/4 or larger and 3×Xmax/4 or smaller, and a y coordinate of the center of the connected edge region is Ymax/4 or larger and 3×Ymax/4 or smaller.

Figure 7:
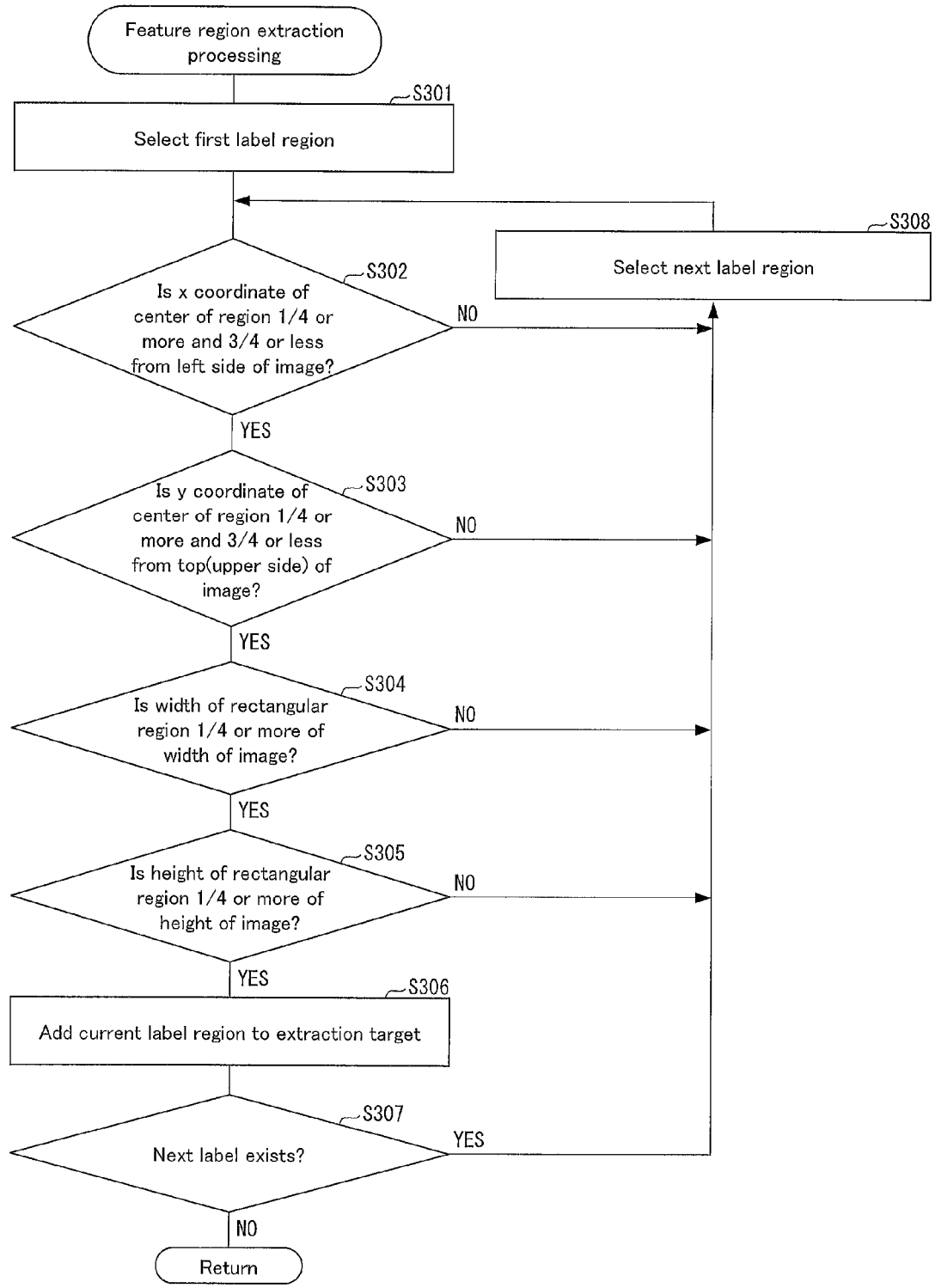
FIG. 7 is a flow chart showing an example of processing of extracting a feature region which is a candidate for a connected edge region that serves as a boundary between a captured object and a background.

FIG. 7 is a flow chart showing a detailed example of processing of the feature region extraction processing (S3). As shown in FIG. 7, first, the geometrical arrangement detecting section 111 selects one of the connected edge regions that have been labelled in S2 (S301). Then, the geometrical arrangement detecting section 111 specifies, for the selected connected edge region, a length in the width direction, a length in the height direction, and an x coordinate and a y coordinate of a center. Specifically, the length in the width direction is obtained by subtracting the smallest x coordinate from the largest x coordinate of edge pixels constituting the connected edge region, the length in the height direction is obtained by subtracting the smallest y coordinate from the largest y coordinate of the edge pixels, an average of the largest x coordinate and the smallest x coordinate is obtained as the x coordinate of the center, and an average of the largest y coordinate and the smallest y coordinate is obtained as the y coordinate of the center.

Next, the geometrical arrangement detecting section 111 determines whether or not the x coordinate of the center is Xmax/4 or larger and 3×Xmax/4 or smaller (S302).

In the case of Yes in S302, the geometrical arrangement detecting section 111 determines whether or not the y coordinate of the center is Ymax/4 or larger and 3×Ymax/4 or smaller (S303).

In the case of Yes in S303, the geometrical arrangement detecting section 111 determines whether or not the length of the connected edge region in the width direction is Xmax/4 or larger (S304).

In the case of Yes in S304, the geometrical arrangement detecting section 111 determines whether or not the length of the connected edge region in the height direction is Ymax/4 or larger (S305).

In the case of Yes in S305, the selected connected edge region is extracted as a feature region (S306). Then, the geometrical arrangement detecting section 111 checks whether or not there is an unselected connected edge region, and in a case where there is an unselected connected edge region, the geometrical arrangement detecting section 111 selects the unselected connected edge region (S308).

Meanwhile, in the case of No in any of S302 to S305, the process in S308 is carried out without extracting the selected connected edge region as a feature region.

Then, the connected edge region selected in S308 is subjected to the processes in S302 and the subsequent steps. In this way, a connected edge region that satisfies the condition A can be extracted as a feature region. The geometrical arrangement detecting section 111 generates feature region image data in which only pixels belonging to the extracted feature region are edge pixels and remaining pixels are non-edge pixels.

Figure 8:
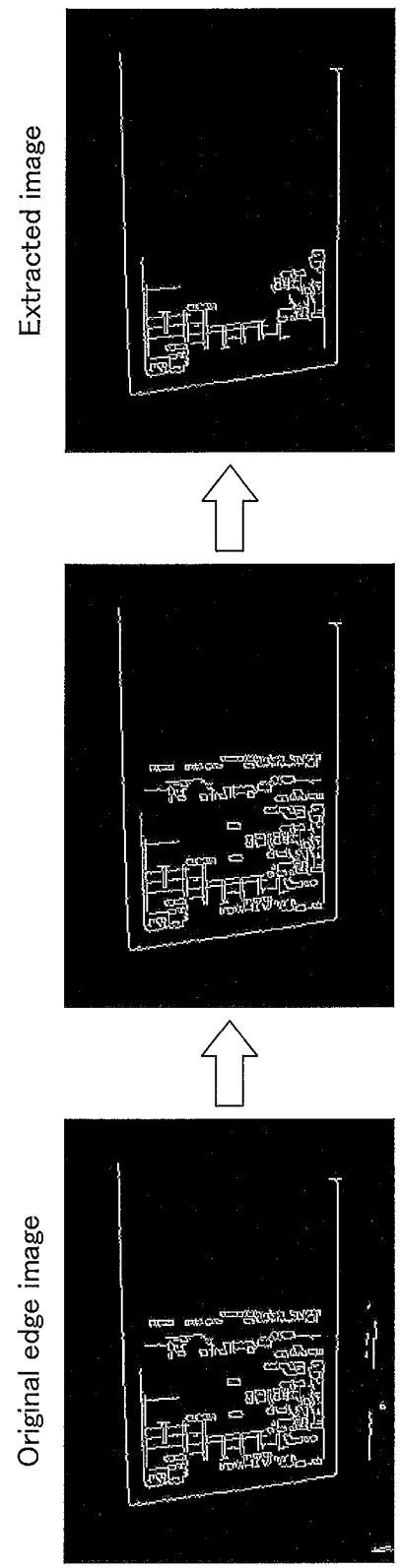
FIG. 8 shows how feature regions are extracted from an edge region including a large number of connected edge regions.

FIG. 8 shows how a feature region is extracted from an edge image including a large number of connected edge regions. In FIG. 8, the left image is the edge image. The middle image is an image showing a state in which connected edge regions having a center whose coordinate is located on an end side of the captured image area have been removed. The right image is an image that shows only the extracted feature region as a result of removal of connected edge regions whose lengths in the width direction and the height direction are short from the middle image by the processes in S304 and S305. That is, the right image is an image represented by the feature region image data.

As shown in FIG. 8, as a result of the process in S3, a feature region, which is a candidate of edge pixels that form the boundary between the rectangular captured object and the background, is extracted. However, as shown in FIG. 8, in some images, edge pixels that are not pixels forming the boundary between the captured object and the background are extracted as a feature region.

(Step 4 (S4))

In view of this, the geometrical arrangement detecting section 111 carries out processing (straight line extraction processing) of extracting, from the feature region, groups of edge pixels arranged in a shape of a line segment which groups form upper, left, right, and lower sides of a rectangle which is a boundary between the rectangular captured object and the background and specifying approximate straight lines to the extracted groups of edge pixels (S4).

It is highly likely that the upper side is located in an upper half of the captured image (i.e. an area where the y coordinate ranges from 0 to Ymax/2) and is parallel to the width direction of the captured image area. It is highly likely that the left side is located in a left half of the captured image (i.e. an area where the x coordinate ranges from 0 to Xmax/2) and is parallel to the height direction of the captured image area. It is highly likely that the right side is located in a right half of the captured image (i.e. an area where the x coordinate ranges from Xmax/2 to Xmax) and is parallel to the height direction of the captured image area. It is highly likely that the lower side is located in a lower half of the captured image (i.e., an area where the y coordinate ranges from Ymax/2 to Ymax) and is parallel to the width direction of the captured image area.

In view of this, in each of such areas where the upper, left, right, and lower sides are highly likely to be located, a group of edge pixels which includes the largest number of edge pixels arranged in a specific direction in a shape of a line segment having a predetermined length or longer is extracted from the feature region image data as the group of edge pixels arranged in a shape of a line segment that forms a boundary between the rectangular captured object and the background. Then, approximate straight lines to the extracted groups of edge pixels are specified.

Figure 9:
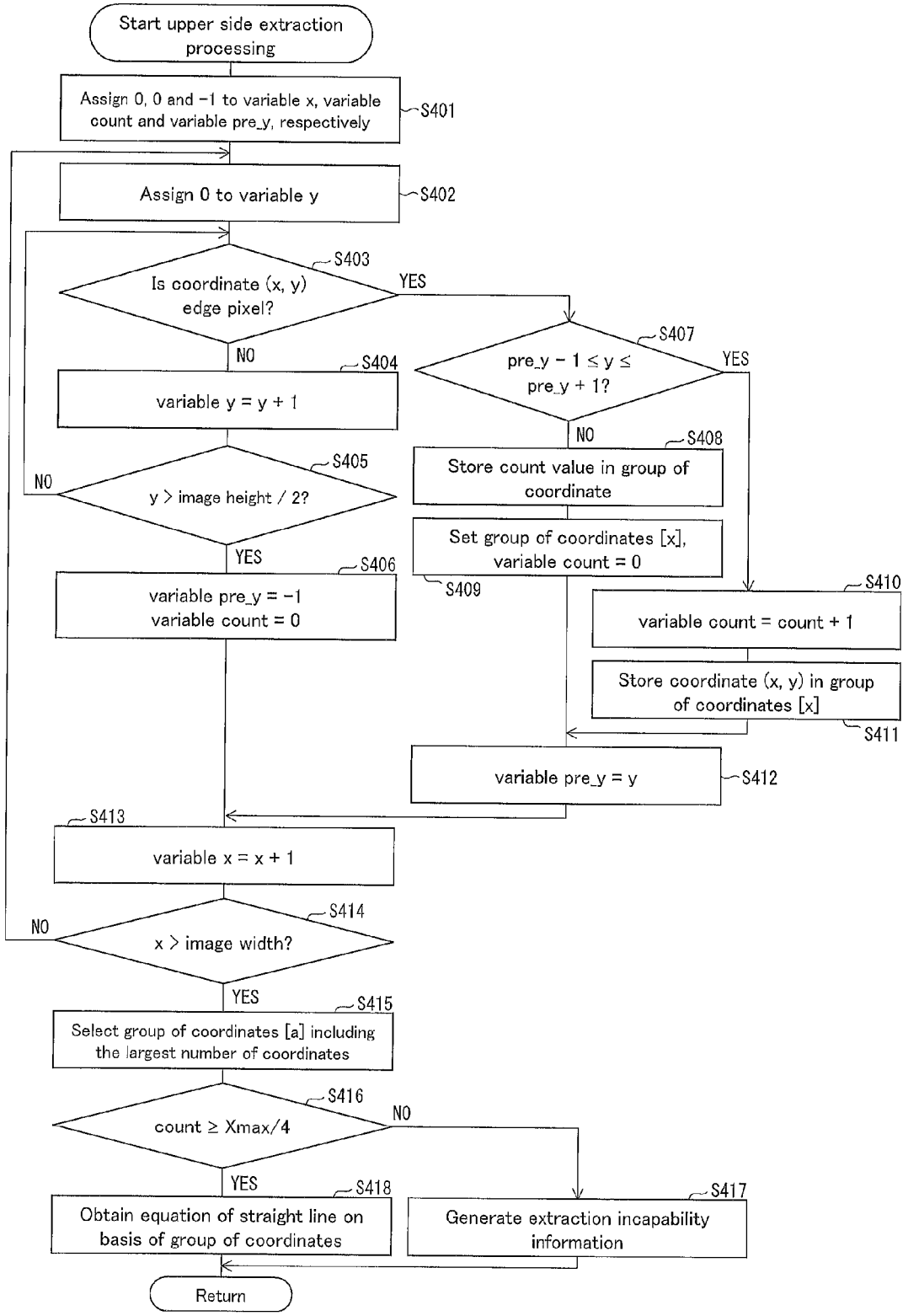
FIG. 9 is a flow chart showing an example of straight line extraction processing of extracting an approximate straight line to a group of edge pixels that serves as an upper side of the boundary between the rectangular captured object and the background.

FIG. 9 is a flow chart showing a flow of processing of specifying an approximate straight line to a group of edge pixels that forms the upper side in the processing of S4 shown in FIG. 4.

First, the geometrical arrangement detecting section 111 sets the following: variable x=0, variable count=0, and variable pre_y=−1 (S401). Next, the geometrical arrangement detecting section 111 sets the following: variable y=0 (S402).

Then, the geometrical arrangement detecting section 111 checks whether a pixel indicated by a coordinate (x, y) is an edge pixel in the feature region image data (S403). In a case of No in S403, the variable y is changed to y+1 (S404). Subsequently, the geometrical arrangement detecting section 111 checks whether the changed variable y is larger than ½ of the height (i.e. Ymax) of the captured image area (S405). In the case of No in S405, the process in S403 is carried out again.

By repeating the processes in S403 to S405, in the feature region image data, an edge pixel is search for in the downward direction along the y axis from the coordinate (0, 0) to a coordinate which is ½ of the height of the captured image area. When an edge pixel is found for the first time, Yes is selected in S403. In the case of Yes in S403, the geometrical arrangement detecting section 111 checks whether the following is satisfied (S407):

$$\text{pre\_y}-1 \leq y \leq \text{pre\_y}+1$$

In a case where S407 is not satisfied, the geometrical arrangement detecting section 111 causes the value of the variable count to be stored in a previously set group of coordinates (S408). Then, the geometrical arrangement detecting section 111 sets a new group of coordinates [x] and sets the variable count to 0 (S409). Meanwhile, in a case where S407 is satisfied, the geometrical arrangement detecting section 111 adds 1 to the variable count (S410), and causes the coordinate (x, y) to be stored in a most recently set group of coordinates (S411). Then, after S409 or S411, the geometrical arrangement detecting section 111 sets the variable pre_y to y (S412).

Meanwhile, in a case where no edge pixel is found as a result of the search in the downward direction along the y axis (No in S405), the geometrical arrangement detecting section 111 sets the following: variable count=0 and variable pre_y=−1 (S406).

After S406 or S412, the geometrical arrangement detecting section 111 adds 1 to the variable x (S413). Subsequently, the geometrical arrangement detecting section 111 checks whether the changed variable x is larger than the width (i.e. Xmax) of the captured image area (S414). In the case of No in S414, the process in S402 is carried out again.

For example, an edge pixel is searched for in the downward direction along the y axis while keeping x=0, and a coordinate (0, y0) of the first edge pixel found is recorded. Next, an edge pixel is searched for in the downward direction along the y axis from the coordinate (1, 0), and a coordinate (1, y1) of the first edge pixel found is recorded. In a case where y0−1≤y1≤y0+1, it is determined that these two points are connected in a specific direction, the variable count is increased by 1 in S409, and the coordinate (1, y1) is stored in the group of coordinates 101. Satisfying y0−1≤y1≤y0+1 means that the two points are continuous in the specific direction within a predetermined angular range from the width direction of the captured image area.

Assume that after coordinates up to a coordinate (k, yk) are stored in the group of coordinate [0], a coordinate (k+1, y(k+1)) of the first edge pixel found as a result of search in the downward direction along the y axis from a coordinate (k+1, 0) does not satisfy yk−1≤y(k+1)≤yk+1. In this case, the value k of the variable count is stored in the group of coordinate [0] in S408. Moreover, in S409, a new group of coordinate [k+1] is set, and the variable count is reset to 0.

The aforementioned processes are repeated until x becomes equal to the width (i.e. Xmax) of the captured image area. Subsequently, the geometrical arrangement detecting section 111 selects a group of coordinates that includes the largest number of coordinates, i.e., a group of coordinates for which the value of count is largest (S415). Then, the geometrical arrangement detecting section 111 checks whether or not the number of coordinates (i.e. the value of count) included in the selected group of coordinates is Xmax/4 or larger (S416). In the case of No in S416, in which case the group of edge pixels is too short as the upper side that forms the boundary between the captured object and the background, the geometrical arrangement detecting section 111 generates information (extraction incapability information) indicating that a straight line that forms the upper side could not be extracted (S417).

Meanwhile, in the case of Yes in S416, the geometrical arrangement detecting section 111 obtains an equation for the approximate straight line on the basis of a plurality of coordinates included in the selected group of coordinates according to a least-square method (S418). In the case of Yes in S416, the group of coordinates that includes the largest number of coordinates is a group of edge pixels arranged in a shape of a line segment having a length of Xmax/4 or larger in a direction within a predetermined angular range from the width direction of the captured image area. It is therefore highly likely that this group of edge pixels represents the upper side that forms the boundary between the captured object and the background.

For example, in a case where (6, 120), (7, 120), (8, 121), (9, 122), and (10, 121) are stored in the group of coordinates that includes the largest number of coordinates, the geometrical arrangement detecting section 111 can obtain the following equation according to the least-square method:

$$y=0.4x+117.6$$

The straight lines that form the four sides are extracted by carrying out similar processes also with respect to the lower, right, and left sides. Note that, in the case of the lower side, the variable y=Ymax is set in S402 of FIG. 9. Moreover, in S404, 1 is subtracted from the variable y, and in S405, it is determined whether or not the changed variable y is smaller than ½ of the height (i.e. Ymax) of the captured image area.

Figure 10:
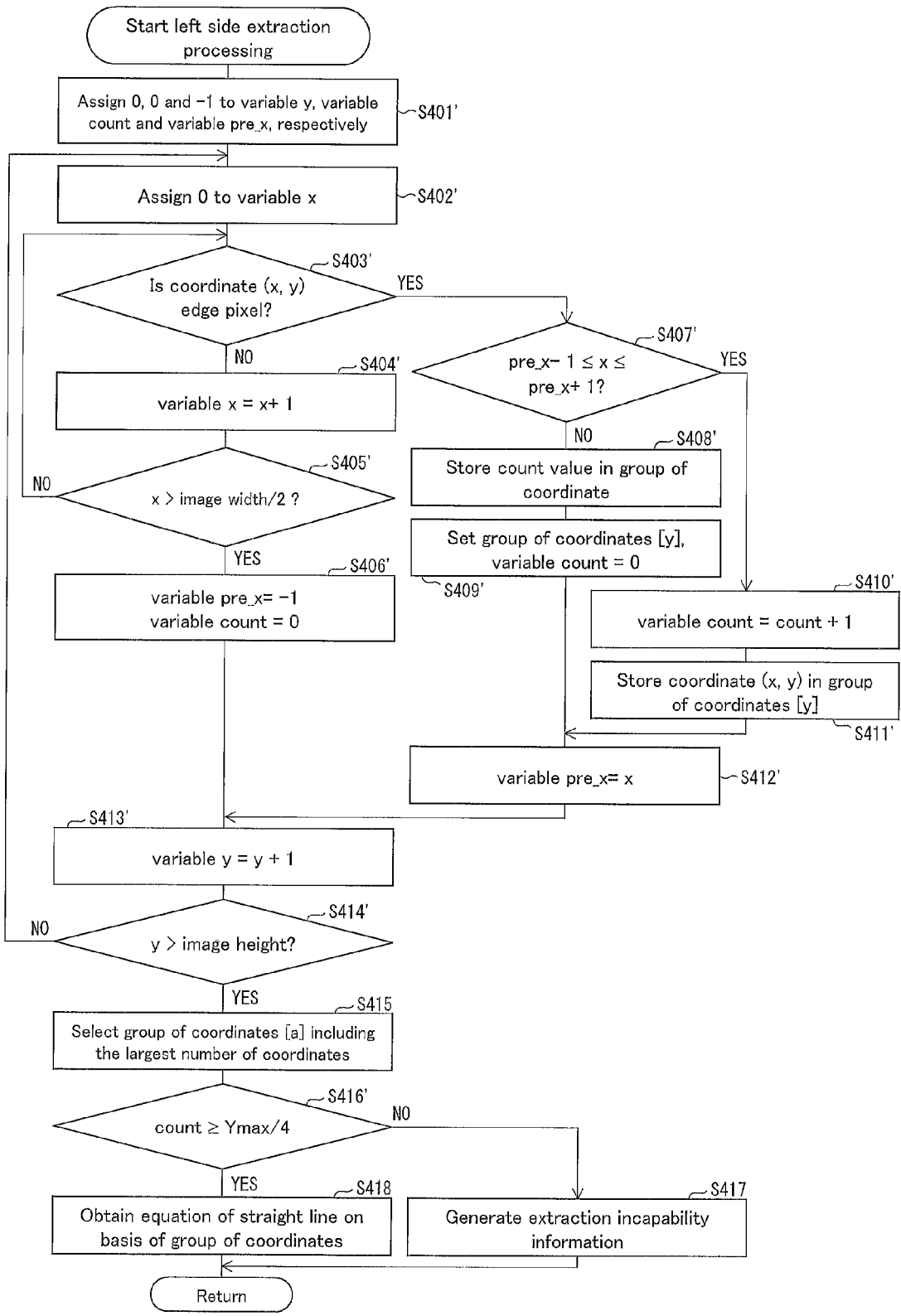
FIG. 10 is a flow chart showing an example of straight line extraction processing of extracting an approximate straight line to a group of edge pixels that serves as a left side of the boundary between the rectangular captured object and the background.

In the case of the left side, it is only necessary to carry out the processes in FIG. 10. The processes in FIG. 10 are ones obtained by exchanging x and y in the processes in FIG. 9. This is because it is highly likely that the left side is located in the left half of the captured image area and is parallel to the height direction of the captured image area. According to FIG. 10, in S418, an equation for the straight line is obtained on the basis of a group of edge pixels arranged in a line segment having a length of Ymax/4 or larger in a direction within a predetermined angular range from the height direction of the captured image area. It is highly likely that this group of edge pixels represents the left side that forms the boundary between the captured object and the background.

In the case of the right side, variable x=Xmax is set in S402' of FIG. 10. Moreover, in S404', 1 is subtracted from the variable x, and in S405', it is determined whether or not the changed variable x is smaller than ½ of the width (i.e. Xmax) of the captured image area.

Figure 11:
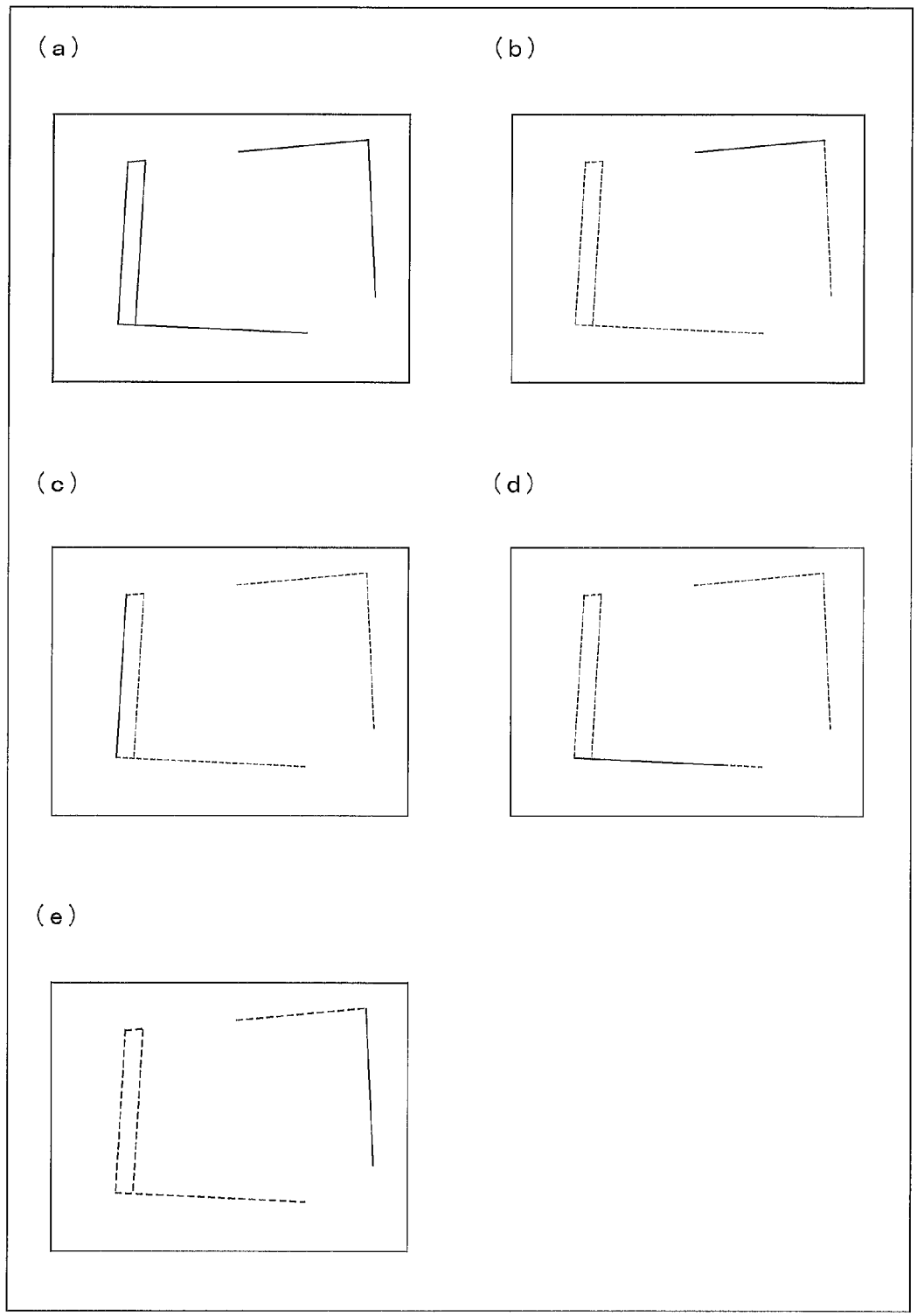
FIG. 11 shows an example of extraction of groups of edge pixel arranged in a shape of a line segment which groups constitute upper, left, right, and lower sides of a quadrangle that serves as the boundary between the rectangular captured object and the background.

FIG. 11 shows an example of extraction (detection), from a feature region, of groups of edge pixels arranged in a shape of a line segment which groups constitute upper, left, right, and lower sides of a rectangle which serves as a boundary between a rectangular captured object and a background. (a) of FIG. 11 is an image showing all the feature regions. (b) of FIG. 11 is an image in which a group of edge pixels that has been extracted as the upper side of the rectangle which serves as the boundary between the rectangular captured object and the background is indicated by a solid line. (c) of FIG. 11 is an image in which a group of edge pixels that has been extracted as the left side of the rectangle which serves as the boundary between the rectangular captured object and the background is indicated by a solid line. (d) of FIG. 11 is an image in which a group of edge pixels that has been extracted as the lower side of the rectangle which serves as the boundary between the rectangular captured object and the background is indicated by a solid line. (e) of FIG. 11 is an image in which a group of edge pixels that has been extracted as the right side of the rectangle which serves as the boundary between the rectangular captured object and the background is indicated by a solid line.

In this way, the geometrical arrangement detecting section 111 generates equations for an upper side straight line, a left side straight line, a right side straight line, and a lower side straight line assuming that an approximate straight line to the group of edge pixels that has been extracted as the upper side is the upper side straight line, an approximate straight line to the group of edge pixels that has been extracted as the left side is the left side straight line, an approximate straight line to the group of edge pixels that has been extracted as the right side is the right side straight line, and an approximate straight line to the group of edge pixels that has been extracted as the lower side is the lower side straight line.

(Step 5 (S5))

After completion of the extraction of the straight lines for the four sides in S4, the geometrical arrangement detecting section 111 obtains coordinates of intersections on the basis of the equations obtained in S4 (S5).

In a case where the equations for the straight lines corresponding to the four sides could be obtained in S4, the geometrical arrangement detecting section 111 can easily obtain a coordinate of an intersection of two straight lines. Specifically, the geometrical arrangement detecting section 111 obtains a coordinate of an intersection of the left side straight line and the upper side straight line, a coordinate of an intersection of the upper side straight line and the right side straight line, a coordinate of an intersection of the right side straight line and the lower side straight line, and a coordinate of an intersection of the lower side straight line and the left side straight line as a coordinate of an upper left vertex, a coordinate of an upper right vertex, a coordinate of a lower right vertex, and a coordinate of a lower left vertex, respectively. Then, the geometrical arrangement detecting section 111 supplies extraction result information including the coordinates of these four vertexes to the display processing section 112.

Figure 12:
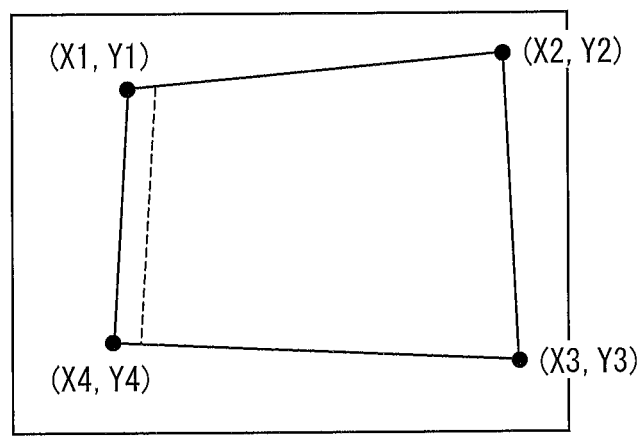
FIG. 12 shows an example of how intersections of approximate straight lines to the groups of edge pixels are calculated.

FIG. 12 shows an example of how the coordinates of the four vertexes are obtained. In FIG. 12, a coordinate of an upper left vertex (X1, Y1), a coordinate of an upper right vertex (X2, Y2), a coordinate of a lower right vertex (X3, Y3), and a coordinate of a lower left vertex (X4, Y4) are obtained.

In a case where equations for straight lines corresponding to only three sides could be obtained in S4, the geometrical arrangement detecting section 111 obtains an equation for a straight line corresponding to a remaining one side assuming that the straight line is a line passing along an end of the captured image area. Specifically, x=0 is used as an equation for the straight line corresponding to the remaining one side in a case where the left side could not be extracted, x=Xmax is used as an equation for the straight line corresponding to the remaining one side in a case where the right side could not be extracted, y=0 is used as an equation for the straight line corresponding to the remaining one side in a case where the upper side could not be extracted, and y=Ymax is used as an equation for the straight line corresponding to the remaining one side in a case where the lower side could not be extracted. Then, the geometrical arrangement detecting section 111 obtains coordinates of four vertexes with the use of the equation for the straight line.

Note, however, that intersections with the straight line passing along the end of the captured image area are obtained as provisional vertex coordinates. For example, in a case where the right side could not be extracted, the coordinate of the upper right vertex and the coordinate of the lower right vertex are obtained as provisional vertex coordinates.

Then, the geometrical arrangement detecting section 111 generates extraction result information including the coordinates of the four vertexes, information indicating that only three sides could not be extracted, and extraction incapability information indicating a side that could not be extracted, and then supplies the extraction result information to the display processing section 112. Note that the provisional vertex coordinates are accompanied by information indicating that they are provisional vertex coordinates.

In a case where equations for straight lines corresponding to three or four sides could not be obtained in S4, the geometrical arrangement detecting section 111 generates extraction result information including that a boundary between a captured object and a background could not be properly extracted, and supplies the extraction result information to the display processing section 112.

(Step 6 (S6))

Subsequently, the display processing section 112 carries out display processing based on the extraction result information as follows.

The display processing section 112 causes a rectangular line connecting the coordinates of the four vertexes indicated by the extraction result information to be displayed on the captured image as a contour line of the captured object.

In a case where the extraction result information includes the coordinates of the four vertexes and includes no extraction incapability information, the display processing section 112 determines whether or not the coordinates of the four vertexes are within the captured image area. In a case where all of the coordinates of the four vertexes are within the captured image area, the display processing section 112 causes the display section 105 to display information (e.g. "OK") indicating that the captured object is within the captured image area.

In a case where coordinates of three vertexes are within the captured image area and a coordinate of one vertex is outside the captured image area, the display processing section 112 causes the display section 105 to display first missing information indicating that part (one corner) of the captured object cannot be captured.

In a case where the extraction result information includes the coordinates of the four vertexes and includes extraction incapability information, the display processing section 112 determines whether or not the coordinates of the four vertexes are within the captured image area. In a case where all of the coordinates of the four vertexes are within the captured image area, the display processing section 112 causes the display section 105 to display second missing information indicating that part (one side) of the captured object cannot be captured.

In cases other than the above cases, the display processing section 112 may leave the screen of the display section 105 as it is or may cause the display section 105 to display information (e.g. "Please adjust a direction of the camera so that a captured object is within the captured image area.") prompting a user to change a direction of the image-capturing section 101.

Figure 13:
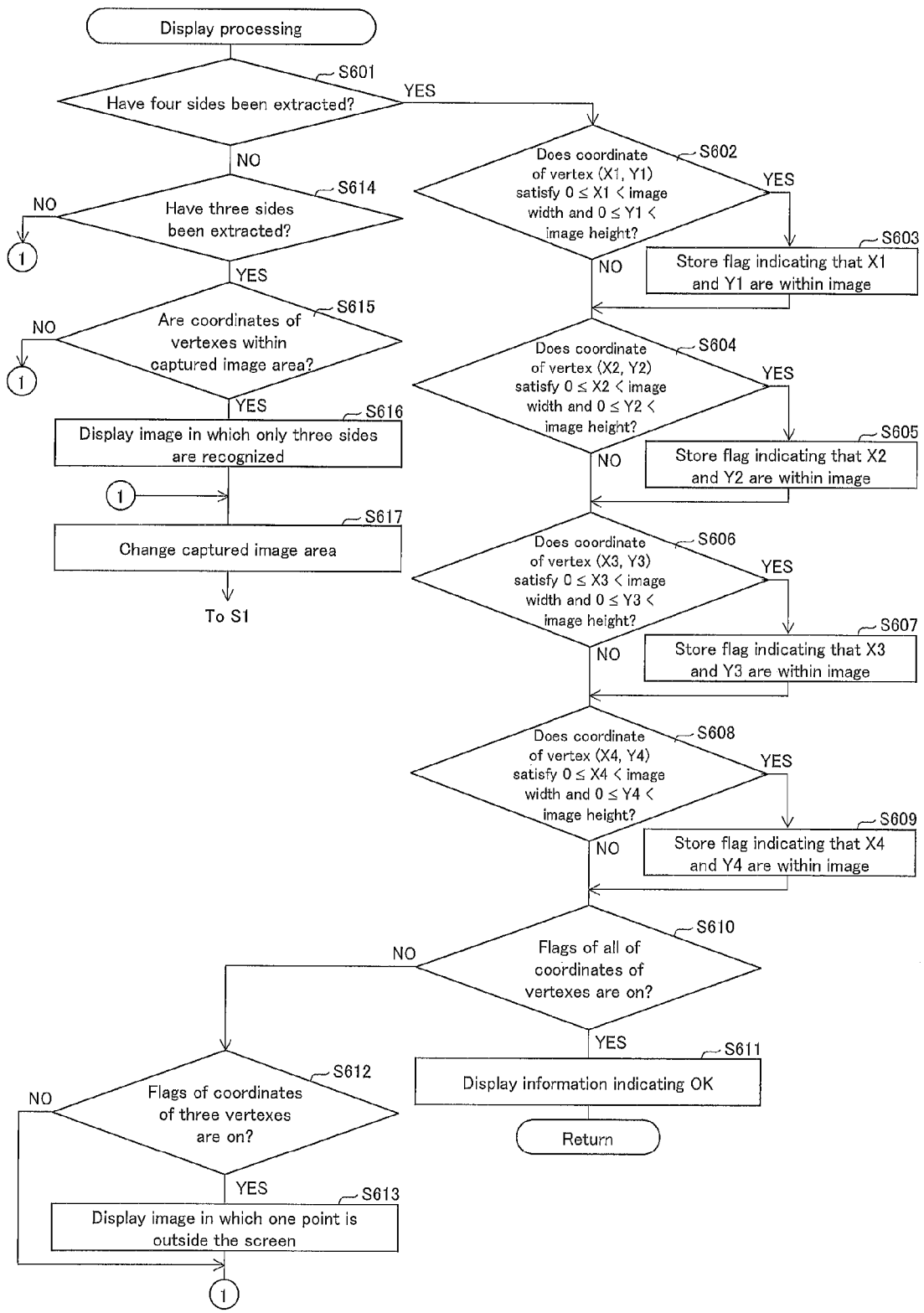
FIG. 13 is a flow chart showing an example of processing carried out by the display processing section.

FIG. 13 is a flow chart showing details of the process in S6. First, the display processing section 112 determines whether all of the four sides that serve as the boundary between the rectangular captured object and the background have been extracted (S601). The display processing section 112 determines that all of the four sides have been extracted in a case where the extraction result information includes the coordinates of the four vertexes and includes no extraction incapability information.

In a case where all of the four sides have been extracted (Yes in S601), the display processing section 112 determines whether the coordinate (X1, Y1) of the upper left vertex indicated by the extraction result information is within the captured image area or not (S602). Specifically, the display processing section 112 determines whether or not both of $0 \leq X1 \leq Xmax$ and $0 \leq Y1 \leq Ymax$ are satisfied. In a case where both of these are satisfied, the display processing section 112 determines that the coordinate of the upper left vertex is within the captured image area.

In a case where the coordinate of the upper left vertex is within the captured image area, the display processing section 112 generates a flag indicating that the coordinate (X1, Y1) of the upper left vertex is within the captured image area and records the flag (S603). Meanwhile, in a case where the coordinate of the upper left vertex is outside the captured image area, a next process is carried out.

The display processing section 112 carries out processes similar to the processes in S602 and S603 also with respect to the coordinate (X2, Y2) of the upper right vertex, the coordinate (X3, Y3) of the lower right vertex, and the coordinate (X4, Y4) of the lower left vertex (S604 to S609).

Then, the display processing section 112 checks whether a flag is recorded for the coordinates of all of the vertexes (S610). In a case where a flag is recorded for the coordinates of all of the vertexes (Yes in S610), the display processing section 112 determines that the captured object is within the captured image area with no missing part. Then, the display processing section 112 causes a rectangular line connecting the coordinates of the four vertexes indicated by the extraction result information to be displayed on the captured image as a contour line of the captured object. The coordinates of the vertexes are intersections of approximate straight lines to the groups of edge pixels arranged in a shape of a line segment which groups have been detected by the geometrical arrangement detecting section 111. Accordingly, the contour line is displayed in such a manner that it overlaps the groups of edge pixels. Further, the display processing section 112 causes the display section 105 to display information (e.g. "OK") indicating that the captured object is within the captured image area (S611). Together with this information, the display processing section 112 causes the display section 105 to display a shutter button for determining an output target image.

Figure 14:
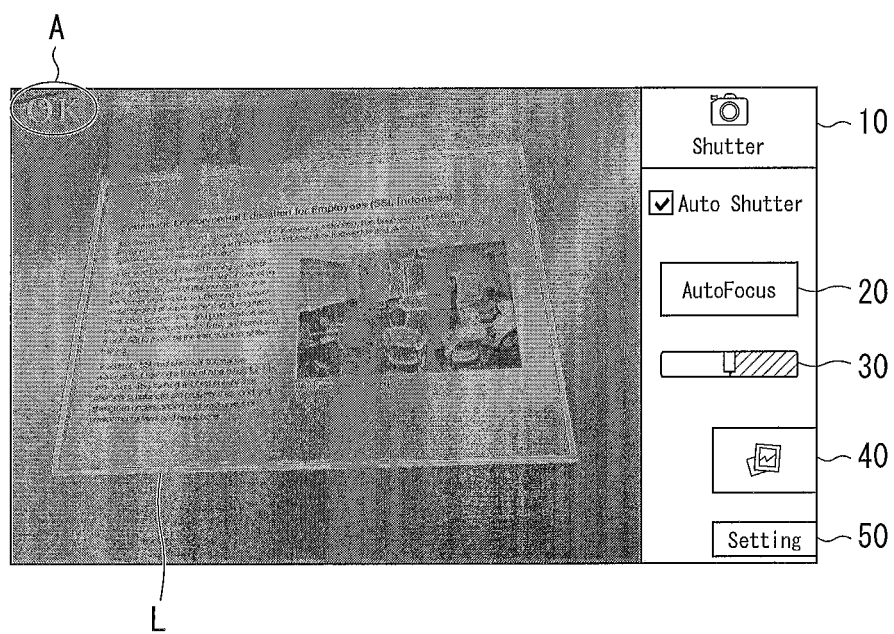
FIG. 14 shows an example of a screen on which information indicating that the captured object is within the captured image area is displayed.

FIG. 14 shows an example of a screen displayed on the display section 105 in S611. As shown in FIG. 14, a contour line L which is a quadrangular line connecting coordinates of vertexes is displayed on a boundary between a rectangular captured object and a background. This allows a user to easily confirm that the captured object is within the captured image area.

FIG. 14 shows a shutter button 10, an autofocus setting button 20, an exposure adjusting bar 30, an image reading button 40, and a condition setting button 50. The shutter button 10 is a button for determining, as an output target image, the captured image displayed on the display section 105. The autofocus setting button 20 is a button for autofocusing. The exposure adjusting bar 30 is a bar for adjusting exposure to light. The image reading button 40 is a button for processing, as a captured image, an image stored in advance. When the image reading button 40 is pressed, a list of stored images is displayed. When a user selects one of the stored images, the selected image is subjected to a next process (process carried out after the shutter is pressed) as an image captured by the image-capturing section 101. The condition setting button 50 is a button for setting various capturing conditions.

Meanwhile, in a case where a flag is stored for not all of the coordinates of the vertexes (No in S610), the display processing section 112 checks whether a flag is stored for coordinates of three vertexes (S612).

In the case of No in S612, i.e., in a case where only coordinates of two or less vertexes are within the captured image area, the display processing section 112 does not cause the display section 105 to display information (e.g. "OK") indicating that the captured object is within the captured image area. This allows a user to recognize that the captured object is not within the captured image area and to change a direction of the image-capturing section 101. After the direction of the image-capturing section 101 is changed (S617), the process in S1 is carried out again. That is, the processes in S1 and the subsequent steps are carried out again based on image data obtained after the direction of the image-capturing section 101 is changed.

In the case of Yes in S612, i.e., in a case where coordinates of three vertexes are within the captured image area, the display processing section 112 causes a rectangular line connecting the coordinates of four vertexes for display on the captured image as a contour line of the captured object. Furthermore, the display processing section 112 causes the display section 105 to display first missing information indicating that part (one corner) of the captured object cannot be captured (S613).

Figure 15:
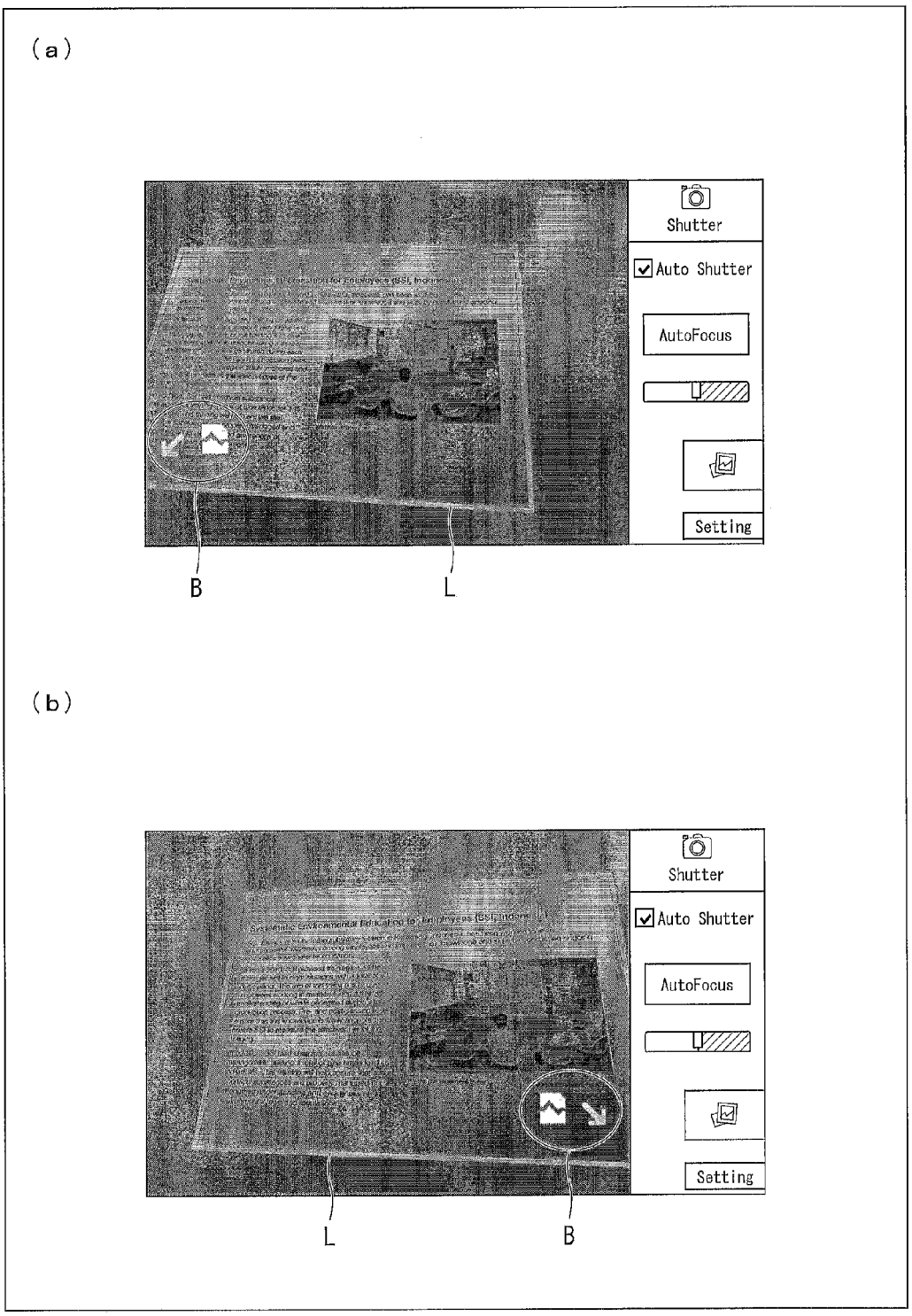
FIG. 15 shows an example of a screen on which first missing information is displayed.

(a) and (b) of FIG. 15 each show an example of a screen displayed on the display section 105 in S613. As shown in FIG. 15, the contour line L which is a quadrangular line connecting coordinates of vertexes is displayed on a boundary between a rectangular captured object and a background. This allows a user to easily confirm that the captured object is within the captured image area.

Furthermore, as the first missing information, a first icon B indicating that a corner is missing is displayed in the vicinity of a coordinate of a vertex located outside the captured image area. The display processing section 112 specifies, based on the coordinate of the vertex located outside the captured image area, a point in the captured image area which point is closest to the coordinate of the vertex located outside the captured image area, and causes the first icon B to be displayed within a predetermined distance from the specified point. The display processing section 112 causes the first icon B to be displayed so that the first icon B does not overlap the contour line L. This allows a user who has confirmed the first icon B to recognize that a corner in the vicinity of the first icon B is outside the captured image area. The user therefore can easily change a direction of the image-capturing section 101 so that the captured object is within the captured image area. After the direction of the image-capturing section 101 is changed (S617), the process in S1 is carried out again. That is, the processes in S1 and the subsequent steps are carried out based on image data obtained after the direction of the image-capturing section 101 is changed.

In the case of No in S601, the display processing section 112 determines whether only three sides out of the four sides that serve as the boundary between the rectangular captured object and the background have been extracted (S614). The display processing section 112 determines that only three sides have been extracted, in a case where the extraction result information includes coordinates of four vertexes and extraction incapability information.

In the case of Yes in S614, the display processing section 112 determines whether coordinates of two vertexes, except for provisional coordinates of vertexes, indicated by the extraction result information are within the captured image area (S615). In a case where the extracted three sides are the upper, left, and right sides, the coordinates of two vertexes except for provisional coordinates of vertexes are a coordinate of an upper left vertex, which is an intersection of the upper side and the left side, and a coordinate of an upper right vertex, which is an intersection of the upper side and the right side. In a case where the extracted three sides are the upper, left, and lower sides, the coordinates of two vertexes except for provisional coordinates of vertexes are a coordinate of an upper left vertex, which is an intersection of the upper side and the left side, and a coordinate of a lower left vertex, which is an intersection of the left side and the lower side. In a case where the extracted three sides are the left, lower, and right sides, the coordinates of two vertexes except for provisional coordinates of vertexes are a coordinate of a lower left vertex, which is an intersection of the lower side and the left side, and a coordinate of a lower right vertex, which is an intersection of the lower side and the right side. In a case where the extracted three sides are the upper, right, and lower sides, the coordinates of two vertexes except for provisional coordinates of vertexes are a coordinate of an upper right vertex, which is an intersection of the upper side and the right side, and a coordinate of a lower right vertex, which is an intersection of the lower side and the right side. The process in S615 is similar to the processes in S602 to S609.

In the case of No in S614 or S615, the display processing section 112 does not cause the display section 105 to display information (e.g. "OK") indicating that the captured object is within the captured image area. This allows a user to recognize that the captured object is not within the captured image area. The user therefore changes the direction of the image-capturing section 101. After the direction of the image-capturing section 101 is changed (S617), the process in S1 is carried out again.

Meanwhile, in the case of Yes in S615, the display processing section 112 causes a quadrangular line connecting the coordinates of the four vertexes except for a line between two provisional vertex coordinates to be displayed on the captured image as a contour line of the captured object. Then, the display processing section 112 causes the display section 105 to display second missing information indicating that part (one side) of the captured object cannot be captured (S616).

Figure 16:
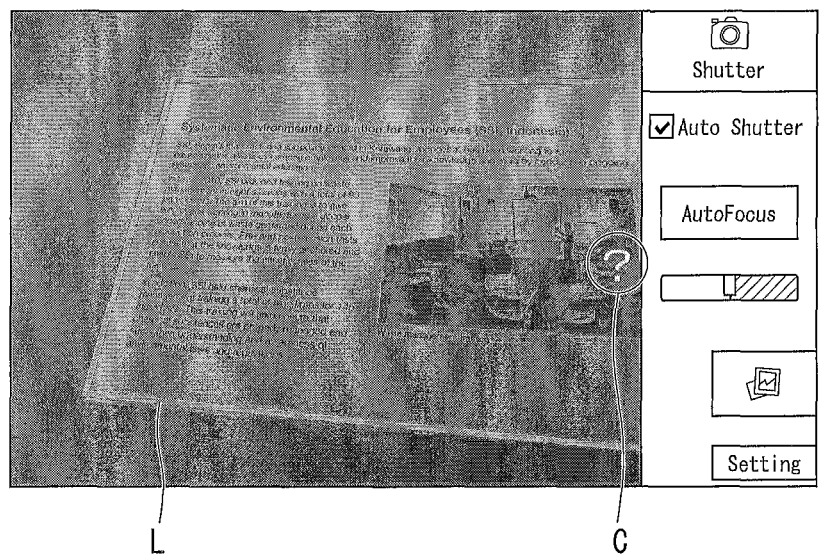
FIG. 16 shows an example of a screen on which second missing information is displayed.

FIG. 16 shows an example of a screen displayed on the display section 105 in S616. As shown in FIG. 16, the contour line L is displayed on a boundary between a rectangular captured object and a background. This allows a user to easily recognize that the captured object is within the captured image area.

Moreover, as the second missing information, a second icon C indicating that one side of the rectangular captured object is missing is displayed in the vicinity of the side located outside the captured image area. Note that the display processing section 112 causes the second icon C to be displayed within a predetermined range from a side of the frame of the captured image area which side corresponds to the side indicated by the extraction incapability information. For example, in a case where the extraction incapability information indicates a right side, the second icon C is displayed in the vicinity of a right side (i.e., a line represented by x=Xmax) of the outer frame of the captured image area. This allows a user who has confirmed the second icon C to easily recognize that the side in the vicinity of the second icon C is outside the captured image area. The user can therefore easily change the direction of the image-capturing section 101 so that the captured object is within the captured image area. After the direction of the image-capturing section 101 is changed (S617), the process in S1 is carried out again. That is, the processes in S1 and the subsequent steps are carried out based on image data obtained after the direction of the image-capturing section 101 is changed.

Note that the display processing section 112 preferably causes the first missing information and the second missing information to be displayed in a color different from that of the contour line L. This allows a user to easily confirm the first missing information and the second missing information.

(Step 7 (S7))

Finally, the output target image determining section 113 determines output target image data, which is image data to be subjected to output processing. Specifically, the output target image determining section 113 detects a timing at which the shutter button 10 was operated in a state in which the information (e.g. "OK") indicating that the captured object is within the captured image area and the shutter button 10 are displayed on the display section 105, as shown in FIG. 14. The output target image determining section 113 determines, as a designated timing, the timing at which the shutter button 10 was operated, and determines, as the output target image data, image data representative of a captured image displayed on the display section 105 at the designated timing.

Note that the output target image determining section 113 is configured to be capable of accepting an operation of the shutter button 10 only when information indicating that the captured object is within the captured image area is displayed.

(3-3) Another Example of Processing of Geometrical Arrangement Detecting Section (1)

Figure 37:
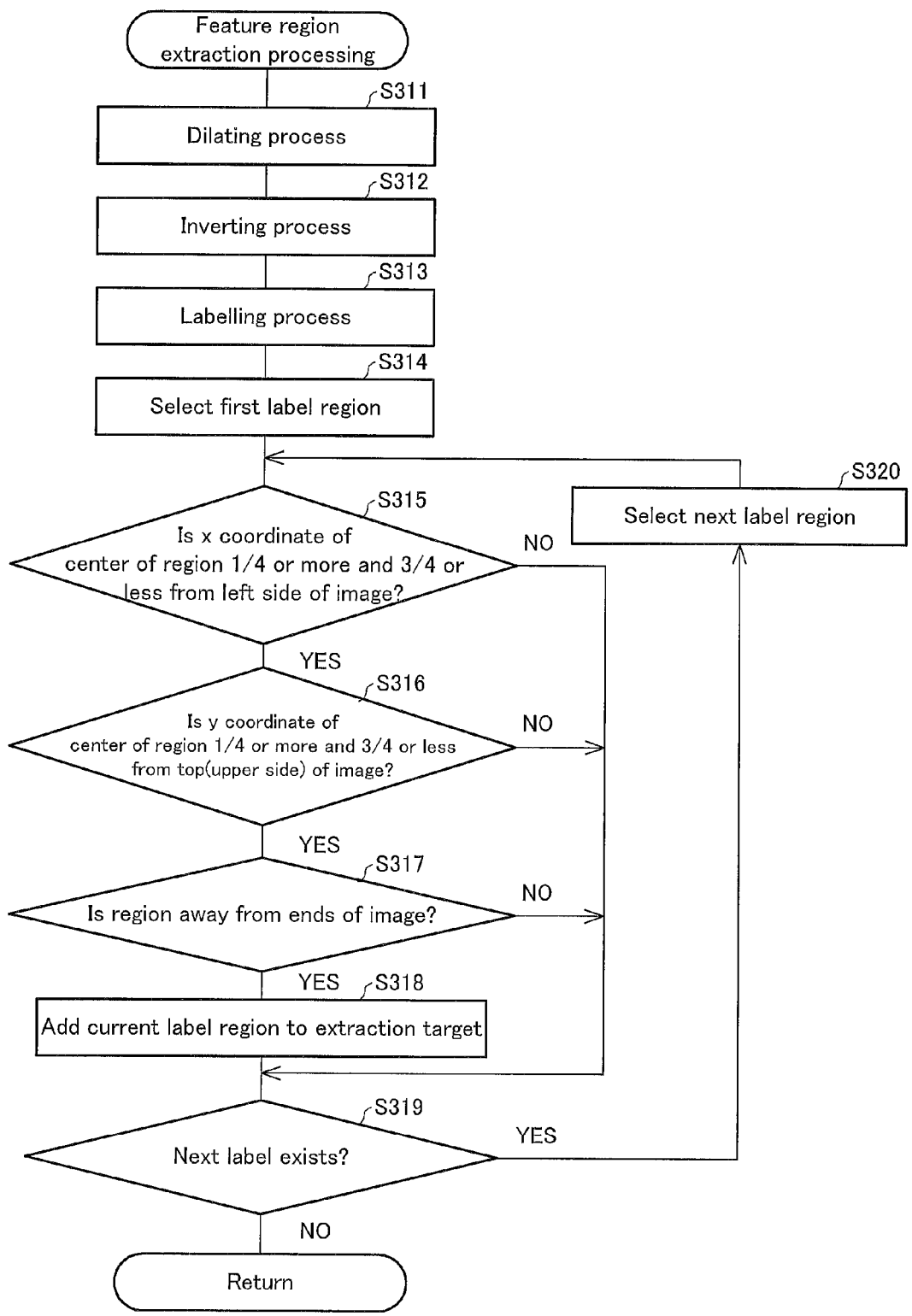
FIG. 37 is a flow chart showing a modification of the feature region extraction processing (S3).
Figure 38:
FIG. 38 shows how feature region are extracted from a captured image by the feature region extraction processing shown in FIG. 37.

The geometrical arrangement detecting section 111 may omit the process in S2 and extract a candidate of a region (feature region) including a boundary between a captured object and a background by carrying out, in S3, the processes such as the ones in FIG. 37. FIG. 37 is a flow chart showing feature region extraction processing (S3) in the present modification. FIG. 38 shows how the feature region is extracted by the feature region extraction processing of the present modification.

First, the geometrical arrangement detecting section 111 obtains an edge image (see (2)) extracted in S1 from a captured image (see (1)), as shown in FIG. 38. Then, the geometrical arrangement detecting section 111 carries out a single-stage dilating process on the extracted edge image (S311). The single-stage dilating process is a process in which in a case where a target pixel is an edge, four pixels (pixels located on the upper, left, lower, and right sides of the target pixel) around the target pixel are determined as edges. (3) of FIG. 38 shows an edge image obtained after the dilating process. As is clear from (3) of FIG. 38, the edge part has dilated.

Next, the geometrical arrangement detecting section 111 inverts the edge image (S312). That is, the geometrical arrangement detecting section 111 converts edge pixels to non-edge pixels and converts non-edge pixels to edge pixels. (4) of FIG. 38 shows an edge image obtained after the inverting process. As shown in (3) and (4) of FIG. 38, a region that is in contact with ends of the image (ends of the captured image area) obtained by the dilating process of increasing the number of connections between edge regions and the subsequent inverting process can be regarded as a background.

Subsequently, the geometrical arrangement detecting section 111 carries out, with respect to the edge image obtained after the inverting process, labelling processing of giving different labels to regions of connected edge pixels (connected regions) (S313). The labelling processing can be one similar to that in S2.

The geometrical arrangement detecting section 111 selects one of the connected regions to which the labels have been given in S313, and specifies x and y coordinates of a center of the selected connected region (S314). Specifically, the geometrical arrangement detecting section 111 calculates, as the x coordinate of the center, an average of a maximum x coordinate and a minimum x coordinate and calculates, as the y coordinate of the center, an average of a maximum y coordinate and a minimum y coordinate.

Next, the geometrical arrangement detecting section 111 determines whether or not the x coordinate of the center is Xmax/4 or larger and 3×Xmax/4 or smaller (S315).

In the case of Yes in S315, the geometrical arrangement detecting section 111 determines whether or not the y coordinate of the center is Ymax/4 or larger and 3×Ymax/4 or smaller (S316).

In the case of Yes in S316, the geometrical arrangement detecting section 111 determines whether or not the connected region is away from the ends (limits) of the image (S317). Specifically, the geometrical arrangement detecting section 111 determines whether or not the maximum x coordinate of the selected connected region coincides with an x coordinate (image width−1) of the right end of the image, whether or not the minimum x coordinate coincides with an x coordinate (0) of the left end of the image, whether or not the maximum y coordinate coincides with a y coordinate (image height−1) of the lower end of the image, and whether the minimum y coordinate coincides with a y coordinate (0) of the upper end of the image. In a case where at least one of these is Yes, it is determined that the connected region is in contact with an end of the image (is not away from an end of the image), whereas in a case where all of these are No, it is determined that the connected region is away from the ends of the image.

In the case of Yes in S317, the geometrical arrangement detecting section 111 extracts the selected connected region as the feature region (S318). Then, the geometrical arrangement detecting section 111 checks whether there is an unselected connected region (S319). Meanwhile, in the case of No in any of S315, S316 and S317, the geometrical arrangement detecting section 111 checks whether there is an unselected connected region (S319) without extracting the selected connected region as the feature region.

Then, in a case where there is an unselected connected region, the geometrical arrangement detecting section 111 selects one unselected connected region (S320). Meanwhile, in a case where there is no unselected connected region, the geometrical arrangement detecting section 111 finishes the feature region extraction processing, and carries out the processing in S4 of FIG. 4 in which it detects groups of edge pixels arranged in a shape of a line segment which groups are highly likely to represent the boundary between the captured object and the background.

(5) of FIG. 38 shows connected regions that have been judged No in S315 or S316. Each of the connected regions shown in (5) of FIG. 38 is a region whose coordinate of the center is close to an end of the image, and is therefore highly likely to be a background part other than the rectangular captured object or a small region drawn on an end part of the captured object. Therefore, the connected regions shown in (5) of FIG. 38 are not extracted as the feature region.

(6) of FIG. 38 shows connected regions that have been judged No in S317. Each of the connected regions shown in (6) of FIG. 38 is a region that is in contact with an end of the image, and is therefore highly likely to be a background part other than the captured object. Therefore, the connected regions shown in (6) of FIG. 38 are not extracted as the feature region.

(7) of FIG. 38 shows a region excluding the regions of (5) and (6) from the image shown in (4). That is, (7) of FIG. 38 shows a region extracted as the feature region. As is clear from (7) of FIG. 38, a region including the boundary between the captured object and the background is extracted as the feature region.

(3-4) Another Example of Processing of Geometrical Arrangement Detecting Section (2)

The geometrical arrangement detecting section 111 may obtain equations of straight lines corresponding to groups of edge pixels arranged in a shape of a line segment which groups form the boundary between the captured object and the background by carrying out the following processes instead of the processes in S2 to S4.

Specifically, the geometrical arrangement detecting section 111 detects, from captured image data, groups of edge pixels arranged in a shape of a line segment (straight line recognition), and regards the detected groups of edge pixels as the boundary between the captured object and the background.

Figure 17:
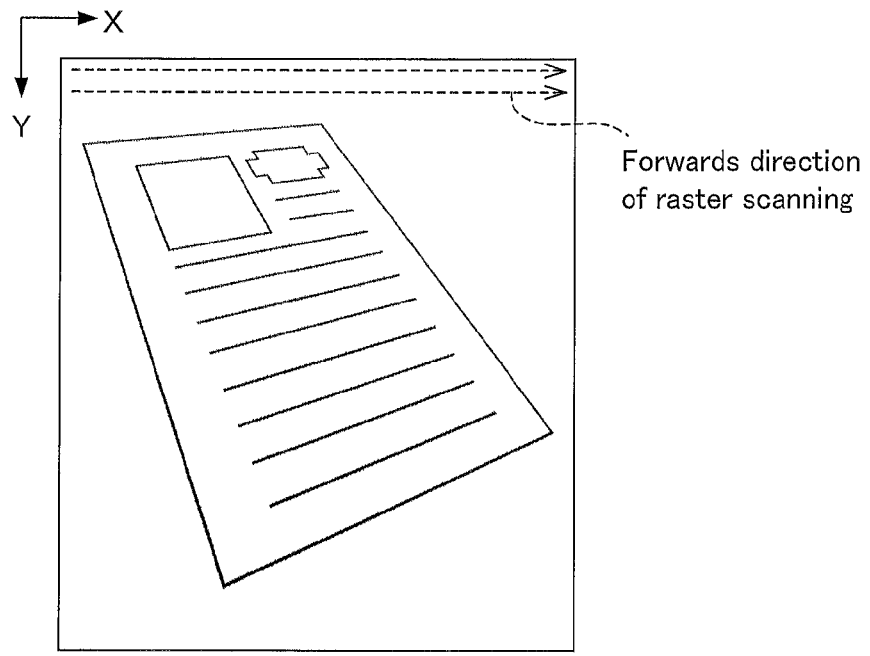
FIG. 17 shows an example of detection of geometrical distortion of an image by the geometrical arrangement detecting section.

First, the geometrical arrangement detecting section 111 carries out raster scanning on image data that is captured by the image-capturing section 101 and is displayed on the display section 105. It is assumed here that a forward direction of the raster scanning is an X direction and a direction perpendicular to the X direction is a Y direction (see FIG. 17). It is also assumed that an upper left corner of the captured image is an origin.

The geometrical arrangement detecting section 111 scans 1 line, and if there exists no edge, scans a next line shifted by a predetermined amount in the Y direction. Note that an interval between adjacent lines just need be constant, and need not necessarily be 1 pixel.

Figure 18:
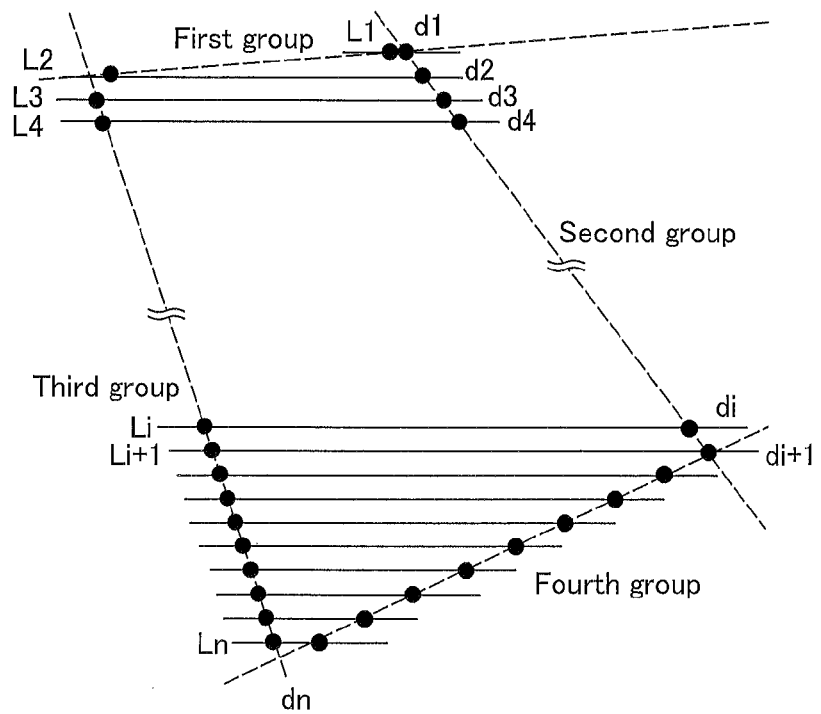
FIG. 18 shows an example of processing of detecting edges of the captured object in the image.

Then, the geometrical arrangement detecting section 111 determines, as $L_1$ (the first line), a line in which an edge is detected for the first time by the raster scanning. As shown in FIG. 18, the geometrical arrangement detecting section 111 stores, in a first group (a first group of edge pixels), a coordinate of a point that has been judged the first edge in the forward direction and classifies, into a second group (a second group of edge pixels), a coordinate of a point that has been judged the second edge on the same line. The geometrical arrangement detecting section 111 goes on to scan a next line and detect edges. Then, the geometrical arrangement detecting section 111 calculates, for each line $L_i$, a difference (a distance di) between an X coordinate of a point judged the first edge in the forward direction and an X coordinate of a point judged the second edge in the forward direction, and then makes the following judgment.

It is assumed that the X coordinate of the first edge in the line $L_i$ is $X_{i1}$ (X coordinate classified in the first group) and the X coordinate of the second edge in the line $L_i$ is $X_{i2}$ (X coordinate classified in the second group). A detection method is as follows.

(a) Coordinates $X_{11}$ and $X_{12}$ of the first line ($L_1$) are not changed.

(b) For an i-th line which is the second or subsequent line, a distance $d_{i1}$ ($=X_{i1}-X_{(i-1)1}$) between coordinates and a distance $d_{i2}$ (similarly calculated) between coordinates are calculated. In the following description, which discusses $d_{i1}$, the suffix "1" is omitted. Note, however, that the same applies to $d_{i2}$.

(c) For an i-th line which is the third or subsequent line, $dd_i=abs\{(d_i)-d_{i-1}\}$ is calculated. If $dd_i \leq th_1$ (≈small value close to 0), a coordinate $X_i$ is classified into the same group. If not ($dd_i > th_1$), the coordinate $X_i$ is classified into a different group (a third group (a third group of edge pixels) or a fourth group (a fourth group of edge pixels)).

(d) Only in a case where i=4, a process of determining a group of $X_2$ is carried out as an initial process as follows:
  i) $dd_3 \leq th_1$ and $dd_4 \leq th_1 \rightarrow X_2$: same group
  ii) $dd_3 > th_1$ and $dd_4 \leq th_1 \rightarrow X_2$: different group
  iii) $dd_3 \leq th_1$ and $dd_4 > th_1 \rightarrow X_2$: same group
  iv) $dd_3 > th_1$ and $dd_4 > th_1 \rightarrow X_2$: same group Once the coordinate $X_i$ is classified into a different group (the third group or the fourth group), there is no need to check increase and decrease in $dd_i$.

By carrying out such a process on the whole image, edge pixels belonging to the groups are extracted. Then, coordinates of edge pixels are subjected, for each group of edge pixels, to collinear approximation by a method such as a method of least squares to obtain a straight line approximate to the edge pixels belonging to the group of edge pixels. In a case where an average of square sums of distances between the approximate straight line obtained for each group of edge pixels and the edge pixels included in the group of edge pixels is not more than a predetermined threshold value, the geometrical arrangement detecting section 111 determines that the group of edge pixels is arranged in a shape of a line segment, and can go on to carry out the subsequent process. The geometrical arrangement detecting section 111 can thus detect groups of edge pixels arranged in a shape of a line segment which groups are estimated to be the boundary between the captured object and the background. The geometrical arrangement detecting section 111 can determine, as straight lines corresponding to the four lines that serve as the boundary between the captured object and the background, the approximate lines obtained for the respective detected groups of edge pixels.

Figure 19:
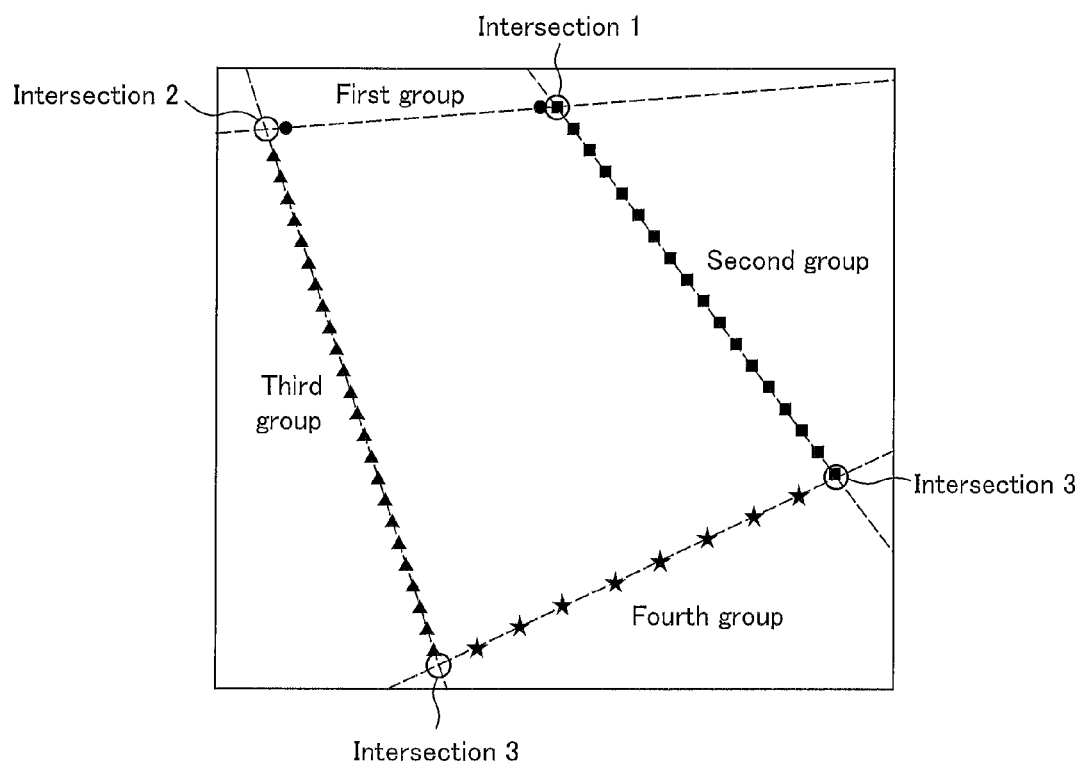
FIG. 19 shows an example of edge detection in a raster direction of the image.

FIG. 19 shows edge points extracted by the raster scanning and classified into four groups of edge pixels by the above processes. In FIG. 19, the circles represent edge pixels belonging to the first group, the rectangles represent edge pixels belonging to the second group, the triangles represent edge pixels belonging to the third group, the stars represent edge pixels belonging to the fourth group, and the dashed lines represent the approximate straight lines, obtained by the method of least squares, for the respective groups of edge pixels.

The aforementioned classifying process may be carried out on the image rotated by 90 degrees. This makes it possible to extract groups of edge pixels of a document that is ideally disposed in parallel with horizontal/vertical directions of the image. That is, before the rotation, edges in the vertical direction can be detected by the raster scanning. Meanwhile, after the rotation, groups of edge pixels that were horizontal before the rotation (edges that are vertical after the rotation) can be detected. This makes it possible to extract also edges parallel to the vertical direction/horizontal directions. If a sufficient amount of information (e.g. three or more intersections for each group) could be obtained before the rotation, it is only necessary to use only the information obtained before the rotation. If only one or less intersection is obtained for any of the groups, it is naturally impossible to obtain an equation of a straight line. Therefore, in such a case, intersections obtained after the rotation may be used.

Alternatively, it is also possible to formulate a straight line by (i) carrying out again a coordinate conversion with respect only to found coordinates of an intersection, (ii) finding a corresponding group from regions in which the respective groups are distributed, and (iii) integrating information on the intersections. Namely, the straight line can be formulated by integrating coordinates of intersections, which belong to an identical group, out of (i) coordinates of intersections which coordinates are found by the image which has not been rotated and (ii) coordinates of intersections which coordinates are obtained by carrying out a coordinate conversion with respect to intersections found by the image which has been rotated.

Note that it is possible to extract an edge point in accordance with the following method. Pixel values, obtained in a small window which has a width of at least one pixel, are compared as they are (a sum or an averages of the pixel values are compared in a case where the width is not less than two pixels). In a case where pixel values of adjacent windows have a difference of not less than a given value, an edge point can be determined. Note that in order to prevent the background or an edge of a text within the captured object from being mistakenly detected, only groups of edge pixels that have a predetermined length or longer may be detected as edges of the captured object. In this case, the predetermined length may be, for example, approximately 80% of a length of an outer frame side of the captured image area. As such a detection method, the technique described in Japanese Patent Application Publication, Tokukai, No. 2006-237757 can be used for example. Alternatively, it is also possible to prevent the background or an edge of a text within the captured object from being mistakenly detected by evaluating each group of coordinates or by carrying out a process (e.g. hough transform) for line segment detection. Furthermore, it is possible to prevent an edge of a text or a fine texture from being mistakenly detected by carrying out, as preprocessing, processing using a reduced image.

(3-5) Another Example of Processing of Geometrical Arrangement Detecting Section (3)

Each of the methods of (3-2), (3-3) and (3-4) for detecting groups of edge pixels continuous in a shape of a line segment which groups are highly likely to represent the boundary between the captured object and the background has a characteristic. For example, according to the detection method of (3-2), the geometrical arrangement detecting section 111 can detect, as the captured object, not only a text document but also a document with illustrations, a picture, and the like, but it is difficult to accurately detect groups of edge pixels which groups represent the boundary between the captured object and the background as for a captured image in which a pattern or an object is present around a captured object (a captured image in which the edge of the captured object and the edge of the background are connected by a Canny filter). According to the detection method of (3-3), the geometrical arrangement detecting section 111 can detect a document even in the case of a captured image in which a pattern or an object is present around a captured object, but sometimes cannot detect groups of edge pixels which groups represent the boundary between the captured object and the background as for a captured image such as a document with illustrations or a picture (a captured image in which an edge is broken apart by a Canny filter).

In view of such differences in characteristic among the detection methods (3-2), (3-3) and (3-4), the geometrical arrangement detecting section 111 may apply a plurality of detection methods to a single captured image. For example, the geometrical arrangement detecting section 111 carries out the detection methods (3-2), (3-3) and (3-4) in this order with respect to a single captured image, and employs extraction result information generated in a process by which three or four sides that serve as the boundary between the captured object and the background can be extracted for the first time.

In a case where both of the captured object and the mobile terminal apparatus 100 are stationary, there is almost no difference among captured images (frames for preview) continuously captured by the image-capturing section 101. Therefore, the geometrical arrangement detecting section 111 may apply one selected from the detection methods (3-2), (3-3) and (3-4) to each of the captured images continuously captured by the image-capturing section 101.

Figure 39:
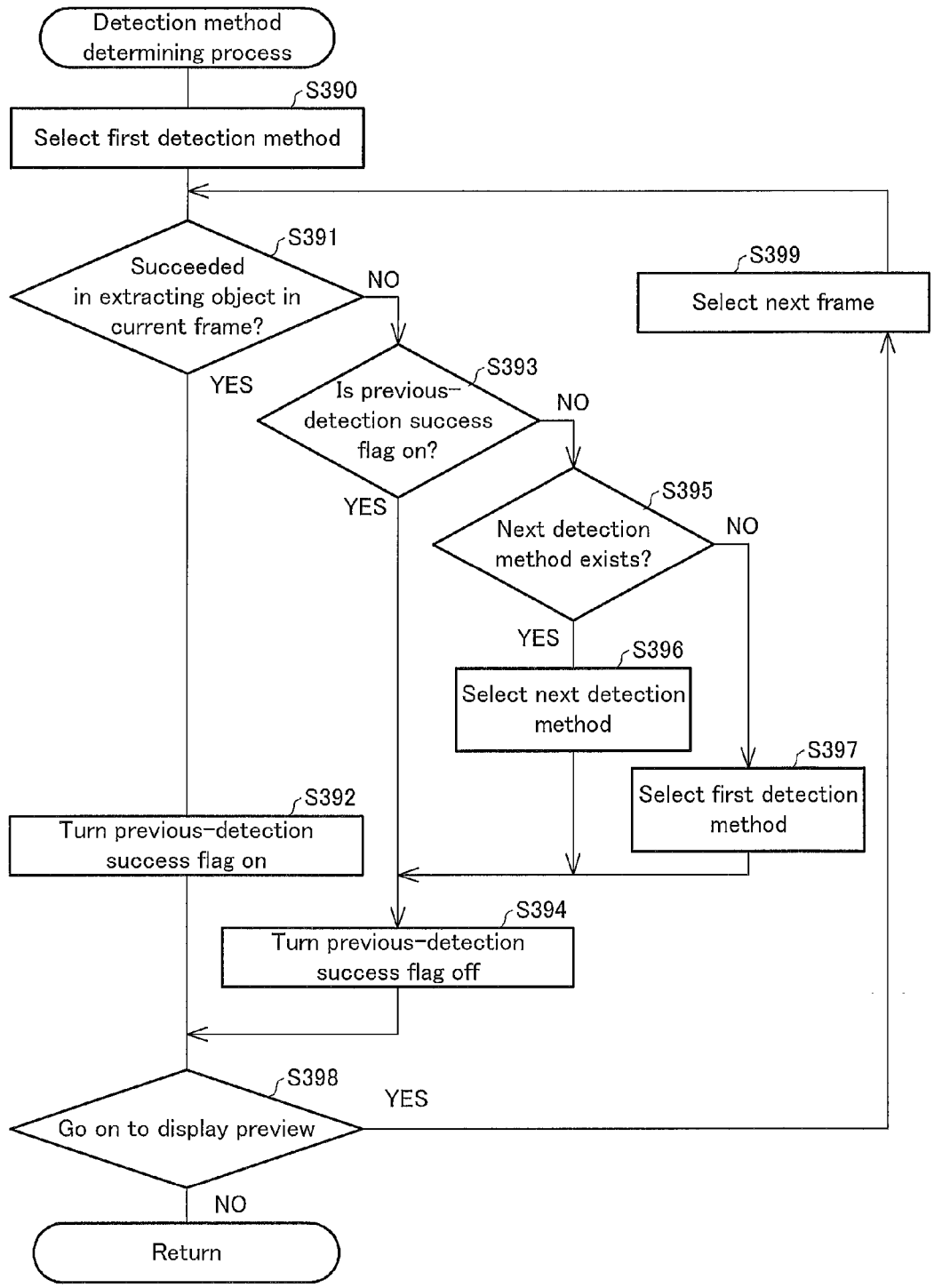
FIG. 39 is a flow chart showing processing of determining a detection method to be applied to a captured image.

FIG. 39 is a flow chart showing processing for determining a detection method to be applied to the captured image. The plurality of detection methods are given in advance selection numbers indicative of selection orders. First, the geometrical arrangement detecting section 111 selects a detection method given a selection number 1 (the first detection method), and generates extraction result information with use of the selected detection method (S390). For example, the geometrical arrangement detecting section 111 selects the detection method of (3-2).

Next, the geometrical arrangement detecting section 111 checks extraction result information for a current captured image (frame) and determines whether or not it succeeded in detecting the boundary between the captured object and the background (S391). The geometrical arrangement detecting section 111 need just determine that it failed in detection in a case where the extraction result information indicates that the boundary between the captured object and the background could not be properly extracted, and determine that it succeeded in detection in a case where the extraction result information indicates contrary.

In a case where the detection succeeded (Yes in S391), the geometrical arrangement detecting section 111 turns a previous-detection success flag on (S392). Then, the process in S398 is carried out.

Meanwhile, in a case where the detection failed (No in S391), the geometrical arrangement detecting section 111 checks whether the previous-detection success flag is on or not (S393). In a case where the previous-detection success flag is on (Yes in S393), the geometrical arrangement detecting section 111 turns the previous-detection success flag off (S394). Meanwhile, in a case where the previous-detection success flag is off (No in S393), the geometrical arrangement detecting section 111 checks whether there is a detection method given a next selection number (S395). In a case where there exists a next detection method (Yes in S395), this detection method is selected (S396). Meanwhile, in a case where there exists no next detection method (No in S395), the first detection method is selected (S397). Then, the process in S398 is carried out.

Next, the geometrical arrangement detecting section 111 checks in S398 whether it is necessary to continue displaying the captured image. For example, the geometrical arrangement detecting section 111 may judge that it is necessary to continue displaying the captured image, in a case where no instruction to terminate a document capturing mode is input.

In the case of Yes in S398, the geometrical arrangement detecting section 111 carries out the detection processing with respect to a next captured image (frame) by the selected detection method (S399). Then, the process in S391 is carried out again.

Figure 40:
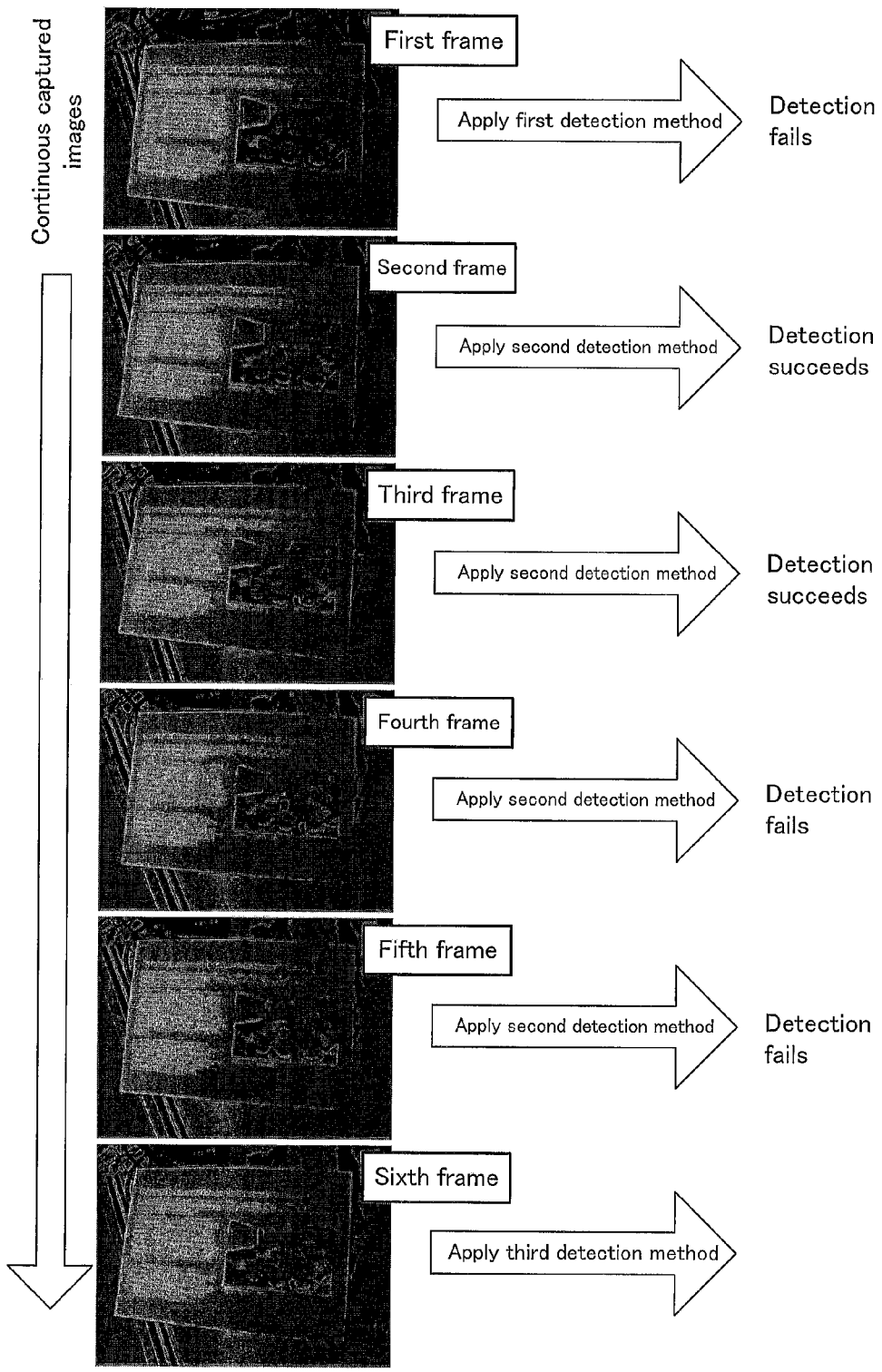
FIG. 40 shows an example of determination of a detection method according to the flow chart of FIG. 39.

FIG. 40 shows an example of how a detection method is determined according to the flow chart of FIG. 39. As shown in FIG. 40, the geometrical arrangement detecting section 111 generates, for the first captured image (the first frame), extraction result information by a detection method given a selection number 1 (the first detection method). Note that the previous-detection success flag is configured to be off at a timing at which the document capturing mode is started. Accordingly, in a case where detection failed, a detection method given a selection number 2 (the second detection method) is selected as a detection method for a next captured image (the second frame) in S396.

Then, the geometrical arrangement detecting section 111 generates, for the second captured image (the second frame), extraction result information by the second detection method. In a case where detection succeeds, the previous-detection success flag is turned on in S392.

Subsequently, in a case where detection succeeds for the third captured image (the third frame) by the second detection method, the second detection method is kept being selected because the detection succeeded. Accordingly, also for the fourth captured image (the fourth frame), detection processing is carried out by the second detection method. Even if the detection for the fourth captured image fails, the detection method is not changed. This is because the previous-detection success flag is on (Yes in S393). Accordingly, also for the fifth captured image (the fifth frame), detection processing is carried out by the second detection method. However, because the detection fails, the previous-detection success flag is switched off.

Subsequently, in a case where detection for the fifth captured image fails, a next detection method (i.e. the third detection method) is selected as a detection method for a next captured image (the sixth frame) in S396 because the previous-detection success flag is off.

As described above, in a case where extraction using the first detection method fails for the first frame, detection processing is carried out for the next second frame by the second detection method. In a case where detection using the second detection method fails for the fifth frame, detection processing is carried out for the next sixth frame by the third detection method. That is, in a case where detection processing for a captured image preceding a captured image to be processed fails, detection processing is carried out for the captured image to be processed by a detection method different from that used for the preceding captured image. This makes it possible to select an optimum detection method depending on a type of the captured image.

Note, however, that once detection succeeds, a detection method is not changed by just one failure of detection. The detection method is changed in a case where detection fails two times in a row as shown in FIGS. 39 and 40. This makes it possible to prevent a detection method being changed in a case where detection fails accidentally for some reasons such as shaking of a hand.

(3-6) Another Example of Processing of Display Processing Section

In S6 of (3-2), the display processing section 112 causes, for each captured image, a rectangular line connecting coordinates of four vertexes indicated by extraction result information generated from the captured image to be displayed on the captured image as a contour line of a captured object.

However, in a case where a contour line of a captured object is displayed for each of captured images that are continuously captured, there is a possibility that coordinates of four vertexes indicated by extraction result information largely change from one captured image to another due to factors such as arrangement of the captured object and the background and contrast, a state of illumination, and shaking of a hand. This causes large flickering of the contour line. In view of this, the display processing section 112 may carry out the following processing.

The display processing section 112 has a function of storing coordinates of four vertexes for display and a function of setting a frame skip flag indicating whether or not coordinates of four vertexes have been successfully detected for a previous captured image (frame). Note that the display processing section 112 sets the frame skip flag to off at a timing at which the document capturing mode is started. Note also that the display processing section 112 deletes the coordinates of the four vertexes for display at a timing at which the document capturing mode is terminated. Accordingly, when the document capturing mode is started, the frame skip flag that is off is stored and coordinates of the four vertexes for display are not stored in the display processing section 112.

Figure 41:
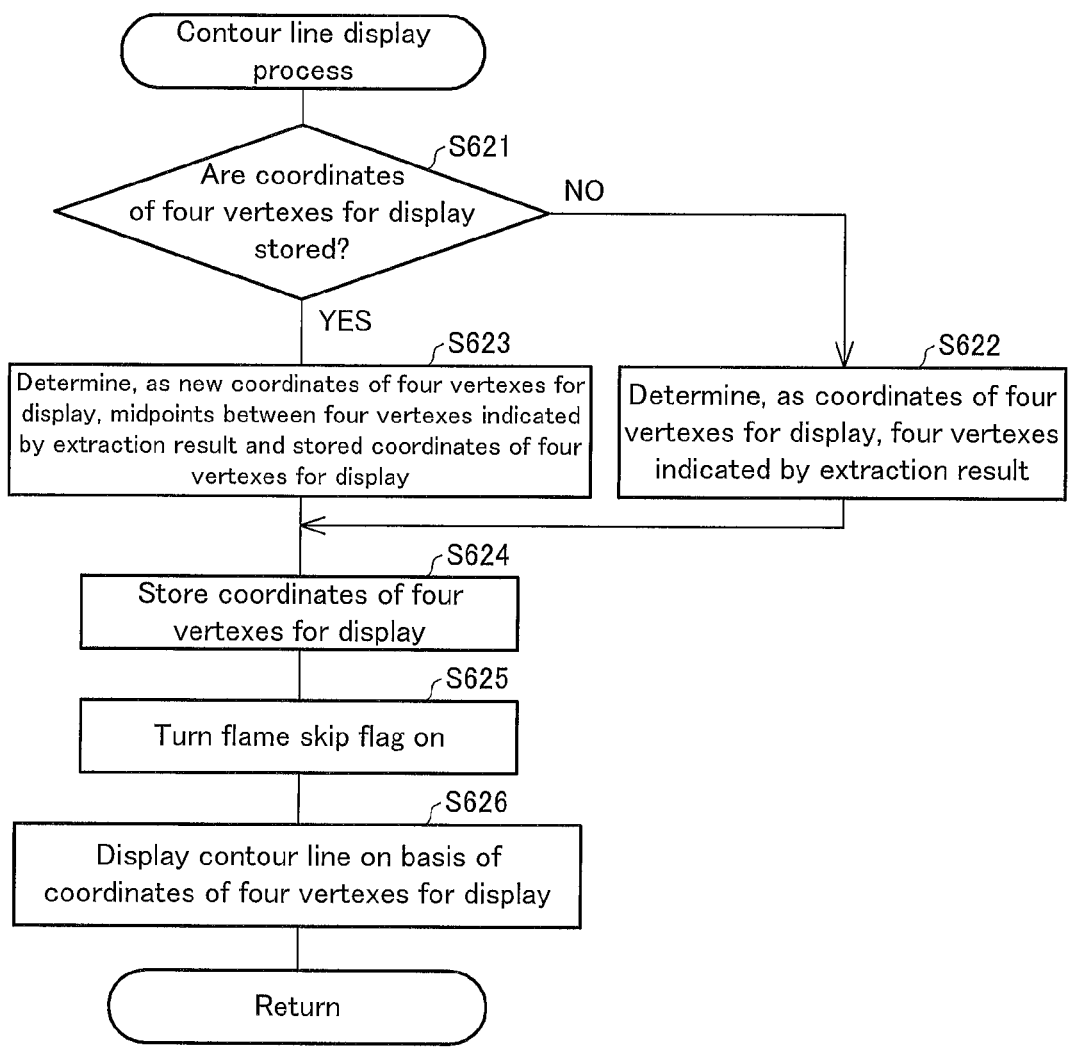
FIG. 41 is a flow chart showing an example of the process carried out in S611 shown in FIG. 13.

In S611 shown in FIG. 13, the display processing section 112 may carry out contour line display processing shown in FIG. 41. FIG. 41 is a flow chart showing an example of contour line display processing carried out in S611 in the present modification. Note that S611 is processing carried out in a case where all of coordinates of four vertexes are within a captured image area (in a case where flags of all of the coordinates of the vertexes are on (in the case of Yes in S610 of FIG. 13)).

First, the display processing section 112 checks whether the coordinates of the four vertexes for display are stored or not (S621). In a case where the coordinates of the four vertexes for display are not stored (No in S621), the display processing section 112 determines, as the coordinates of the four vertexes for display, coordinates of four vertexes indicated by extraction result information (S622). Meanwhile, in a case where the coordinates of the four vertexes for display are stored (Yes in S621), the display processing section 112 obtains, for upper left, upper right, lower left and lower right vertexes, midpoints between the coordinates of the four vertexes for display that are stored and coordinates of vertexes indicated by extraction result information and determines, as new coordinates of four vertexes for display, the obtained four midpoints (S623).

Subsequently, the display processing section 112 stores the determined new coordinates of the four vertexes for display (S624) and turns the frame skip flag on (S625). Then, the display processing section 112 causes a contour line of a captured object to be displayed on the basis of the coordinates of the four vertexes for display stored in S624 (S626).

According to the processing shown in FIG. 41, coordinates of four vertexes for display which are generated on the basis of extraction result information generated for a captured image of a previous frame are stored. Then, the coordinates of the four vertexes for display are updated to new ones, i.e., coordinates of midpoints between coordinates of four vertexes indicated by extraction result information generated for a captured image of a current frame and the coordinates of the four vertexes for display. A contour line is displayed on the basis of the coordinates of the midpoints. It is therefore possible to prevent flickering of the contour line even in a case where coordinates of four vertexes indicated by extraction result information largely change due to some factor among a plurality of continuously displayed captured images (frames).

Figure 42:
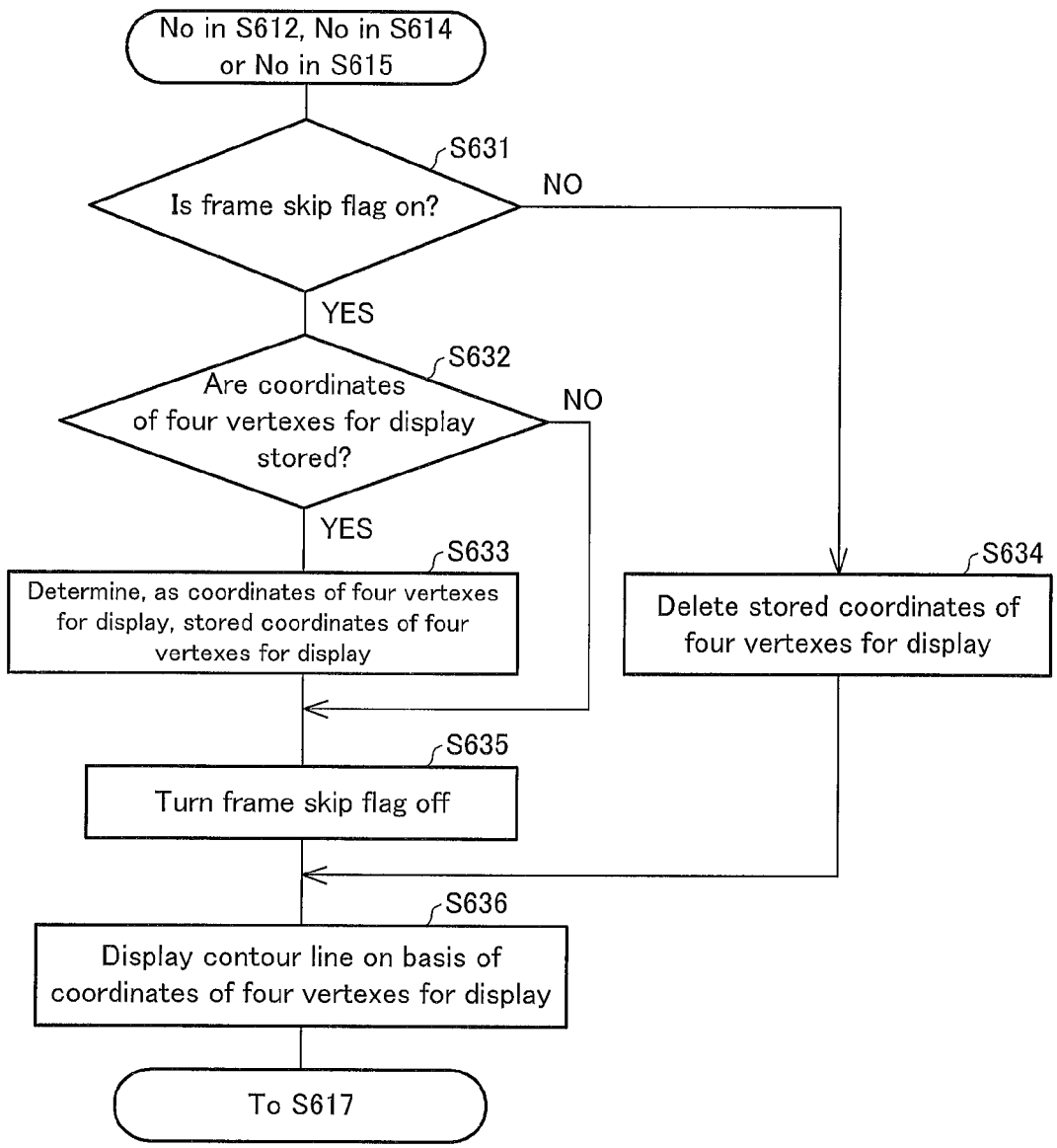
FIG. 42 is a flow chart showing an example of processing carried out in a case where No in S612, No in S614 or No in S615 in FIG. 13.

In the case of No in S612, No in S614, or No in S615 of FIG. 13 (in a case where coordinates of four vertexes indicated by extraction result information are not within an image), the display processing section 112 carries out the processing shown in FIG. 42.

First, the display processing section 112 checks whether the frame skip flag is on or not (S631). In a case where the frame skip flag is on (Yes in S631), the display processing section 112 checks whether coordinates of four vertexes for display are stored or not (S632). In a case where coordinates of four vertexes for display are stored (Yes in S632), the display processing section 112 maintains the coordinates of the four vertexes for display (S633) and proceeds to S635. Meanwhile, in a case where coordinates of four vertexes for display are not stored (No in S632), the display processing section 112 proceeds to S635. In S635, the display processing section 112 turns the frame skip flag off.

Meanwhile, in a case where the frame skip flag is off (No in S631), the display processing section 112 deletes stored coordinates of four vertexes for display (S634).

Subsequently, in S636, the display processing section 112 causes a contour line to be displayed on the basis of coordinates of four vertexes for display. Note, however, that in a case where coordinates of four vertexes for display are not stored, the contour line is not displayed. Then, the process in S617 of FIG. 13 is carried out again.

Figure 43:
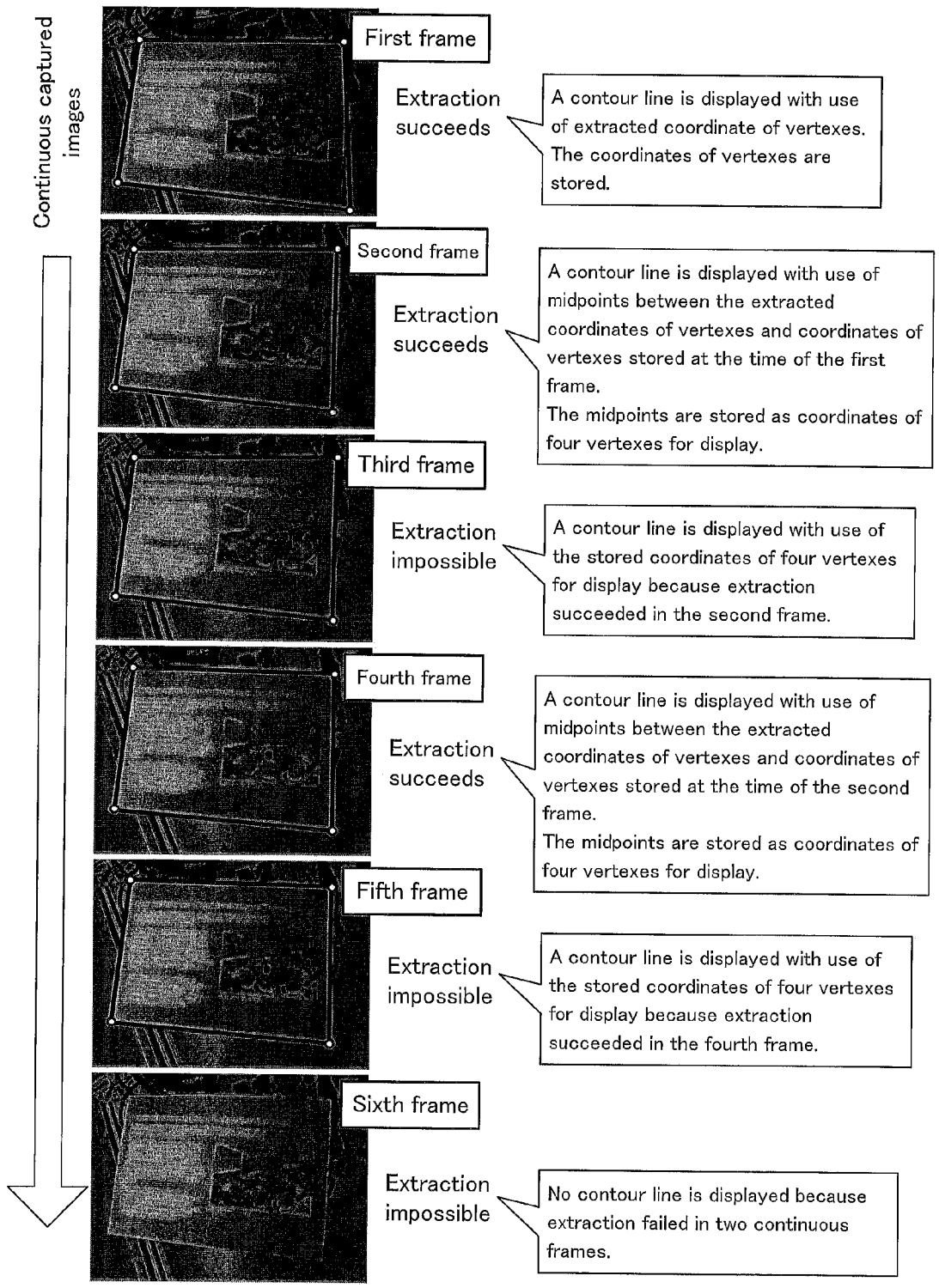
FIG. 43 shows an example of a screen of a display section obtained in a case where the display processing section operates in accordance with the processing of FIGS. 41 and 42.

FIG. 43 shows an example of a screen of the display section 105 obtained in a case where the display processing section 112 operates in accordance with the processing of FIG. 41 and FIG. 42. The processes in S1 to S6 are executed with respect to captured images (frames) that are continuously captured. FIG. 43 shows a display example of captured images of the first through sixth frames.

In the example of FIG. 43, since coordinates of four vertexes indicated by extraction result information generated for the first frame obtained immediately after activation of the document capturing mode are within a captured image area, these coordinates of the four vertexes are stored as coordinates of four vertexes for display in accordance with S622 of FIG. 41. Accordingly, a contour line using these coordinates of the four vertexes is displayed.

Further, since coordinates of four vertexes indicated by extraction result information generated for the second frame also are within the captured image area, midpoints between these coordinates of the four vertexes and the coordinates of the four vertexes for display that were stored at the time of the first frame are stored as new coordinates of four vertexes for display in accordance with S623 of FIG. 41. Accordingly, a contour line using these midpoints is displayed.

Next, assume that extraction result information generated for the third frame indicates that coordinates of four vertexes could not be properly extracted. In this case, the processing in FIG. 42 is executed. In the second frame, the frame skip flag is turned on, and the coordinates of the four vertexes for display are stored. Accordingly, a contour line is displayed on the basis of these coordinates of the four vertexes for display in accordance with S636. At this point, the frame skip flag is switched off.

In this manner, even if extraction of coordinates of four vertexes fails in 1 frame that is a middle one of continuously displayed captured images, the same contour line as that in the previous frame is displayed on the screen. It is therefore possible to suppress flickering.

Since the captured images are images that are continuously captured, generally, the position of the captured object does not change largely. However, there are cases where edges of a captured image only in a certain frame are not properly connected due to an illumination state and as a result it is determined that all of coordinates of four vertexes are outside the captured image area. There are also cases where the position of the captured object changes due to shaking of a hand or the like and as a result it is determined that all of coordinates of four vertexes are outside the captured image area. Even in such cases, it is possible to reduce flickering by continuously displaying coordinates of four vertexes displayed in a captured image of an immediately preceding frame (ignoring failure of extraction only for 1 frame).

Next, in a case where coordinates of four vertexes indicated by extraction result information generated for the fourth frame are within the captured image area, the flow of FIG. 41 is carried out, and in S623, midpoints between these coordinates of the four vertexes and the coordinates of the four vertexes for display stored in the second frame are stored as new coordinates of four vertexes. Then, a contour line is displayed with the use of these midpoints. At this timing, the frame skip flag is switched on.

Next, assume that extraction result information generated for the fifth frame indicates that coordinates of four vertexes could not be properly extracted. In this case, display processing similar to that for the third frame is executed.

Next, assume that extraction result information generated for the sixth frame indicates that coordinates of four vertexes could not be properly extracted. In this case, the processing of FIG. 42 is executed. Since the frame skip flag is switched off in the fifth frame, the stored coordinates of the four vertexes for display are deleted in S634. Accordingly, the display processing section 112 does not cause a contour line to be displayed. In this manner, in a case where extraction of coordinates of four vertexes fails in continuous two or more frames from a state where a contour line is displayed (the stage of the fourth frame), a contour line is no longer displayed. This allows a user to know that a captured object cannot be recognized.

In the example shown in FIG. 42 and FIG. 43, failure of extraction of coordinates of four vertexes for a captured image of 1 frame is ignored. Note, however, that failure of extraction for a plurality of frames may be ignored by counting the number of frames in which failure occurs with the use of a counter.

(4) Transfer of Output Target Image Data to Image Forming Apparatus

A user with the mobile terminal apparatus 100 comes close to the image forming apparatus 200 or the image display apparatus 300, operates the mobile terminal apparatus 100 so as to transmit output target image data to the image forming apparatus 200 or the image display apparatus 300 with the use of a short-range wireless communication method such as infrared communication. Specifically, the user inputs, to the input section 106 of the mobile terminal apparatus 100, an instruction to transmit the output target image data.

Upon receipt of the instruction to transmit the output target image data, the control section 109 specifies the output target image data stored in the storage section 108. Then, the control section 109 causes the communication section 104 to execute processing of transmitting the output target image data to the image forming apparatus 200 or the image display apparatus 300. Note that the communication section 104 transmits, together with the output target image data, a file name associated with the output target image data, output processing information, and model information and user information that are stored in the storage section 108.

(5) Configuration of Image Forming Apparatus

Next, the following describes a configuration of the image forming apparatus 200 of the present embodiment. In the present embodiment, the image forming apparatus 200 is a multifunction printer that has functions of a scanner, a printer, a copying machine, and the like.

Figure 20:
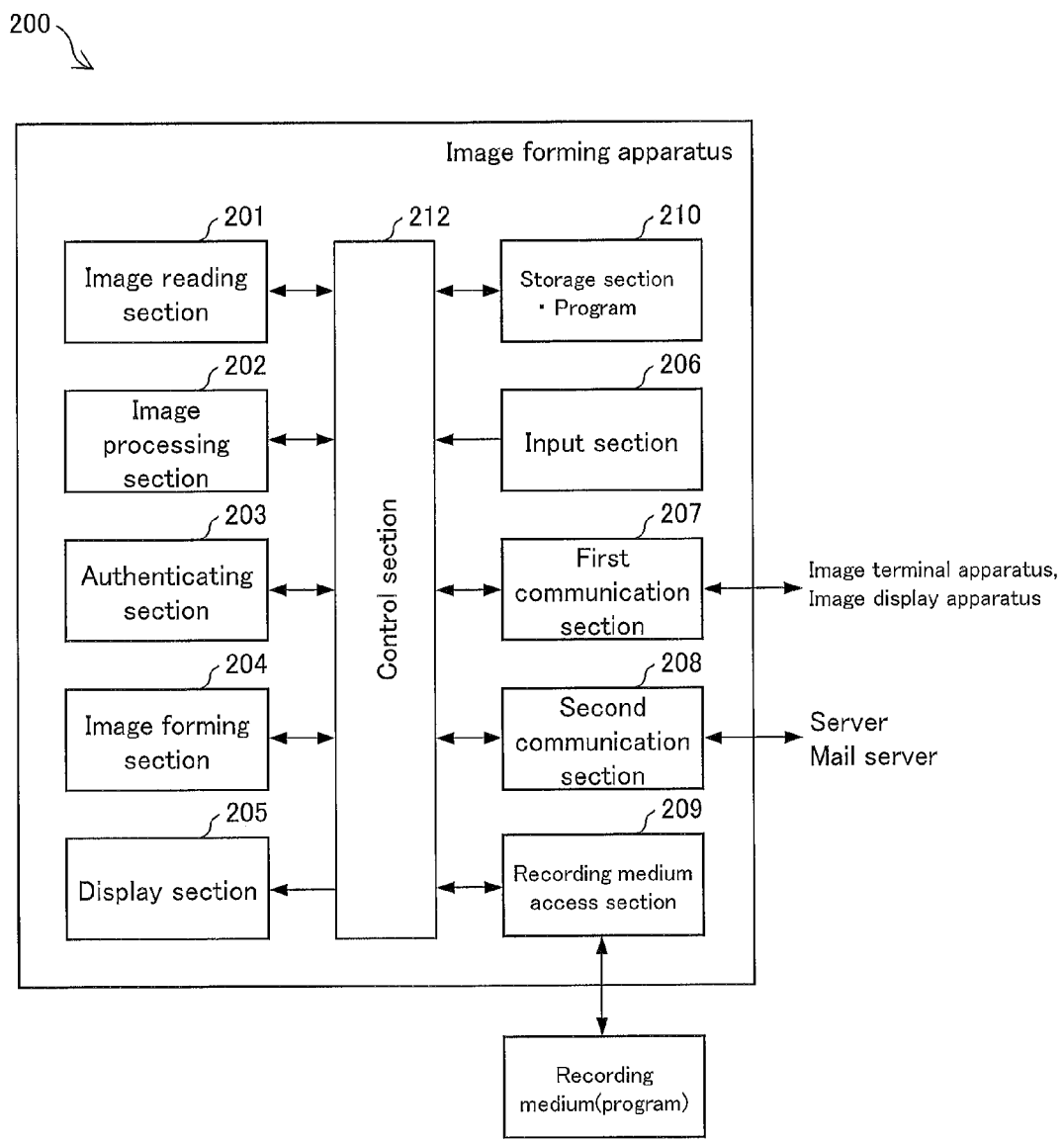
FIG. 20 is a block diagram showing a configuration of an image forming apparatus of the embodiment of the present invention.

FIG. 20 is a block diagram showing a configuration of the image forming apparatus 200. The image forming apparatus 200 includes an image reading section 201, an image processing section 202, an authenticating section 203, an image forming section 204, a display section 205, an input section 206, a first communication section 207, a second communication section 208, a recording medium access section 209, a storage section 210, and a control section 212.

The image reading section 201, which is for reading a document, has a scanner section provided with a CCD (Charge Coupled Device). The image reading section 201 converts light reflected from a document into an electrical signal (analog image signal) separated into R, G and B, and outputs this electrical signal.

The image processing section 202 is for carrying out predetermined image processing with respect to image data. In the present embodiment, the image processing section 202 carries out predetermined image processing with respect to output target image data received from the mobile terminal apparatus 100 or the image display apparatus 300 so as to generate corrected image data. Details of the image processing in the image processing section 202 will be described later.

The authenticating section 203 authenticates a user when the processing of outputting the output target image data received from the mobile terminal apparatus 100 or the image display apparatus 300 is carried out. Specifically, the authenticating section 203 authenticates a user by comparing the user information received from the mobile terminal apparatus 100 and user information (user ID and password) inputted to the input section 206. The authenticating section 203 sends a result of the authentication to the control section 212.

The image forming section 204 forms an image on a recording sheet such as paper with the use of a method such as an electrophotographic printing method or an inkjet method. That is, the image forming section 204 executes, as one of the output processing, printing processing of printing an image represented by the corrected image data onto recording paper such as a recording sheet or an OHP sheet.

The display section 205 is, for example, made up of a liquid crystal display etc. The input section 206 is a section to which data is inputted, for example, by pressing a touch panel on the liquid crystal display or a button.

The first communication section 207 has functions of serial transfer, parallel transfer based on a standard such as USB1.1 or USB2.0, and wireless data communication. The first communication section 207 receives, from the mobile terminal apparatus 100 or the image display apparatus 300, the output target image data together with the file name, the mode information of the mobile terminal apparatus 100, the user information, and the output processing information.

The second communication section 208 has functions of (a) data communication utilizing a wireless technique based on any one of IEEE802.11a, IEEE802.11b, and IEEE802.11g, each of which is a standard of wireless LAN, (b) data communication, via a LAN cable, with a network having a function of a communication interface utilizing Ethernet (Registered Trademark), and (c) data communication utilizing a wireless technique based on any one of IEEE802.15.1 (so-called Bluetooth (Registered Trademark)), an infrared communication standard such as IrSimple, and a communication method such as Felica (Registered Trademark), each of which is a wireless communication standard.

The second communication section 208 executes, as output processing, filing processing of storing, in a server, the corrected image data that has been subjected to the predetermined image processing in the image processing section 202 or e-mail sending processing of sending an e-mail to which the corrected image data that has been subjected to the predetermined image processing is attached.

The recording medium access section 209 reads out a program from a recording medium in which the program is recorded. The storage section 210 is a section in which the program for causing each section to execute processing is stored.

The control section 212 controls each section of the image forming apparatus 200. Specifically, when the first communication section 207 receives the output target image data from the mobile terminal apparatus 100 or the image display apparatus 300, the control section 212 supplies the output target image data to the image processing section 202 and then causes the image processing section 202 to execute the image processing. Moreover, the control section 212 supplies, to the authenticating section 203, the user information attached to the output target image data, and then causes the authenticating section 203 to execute the authenticating processing. Upon receipt of an authentication result indicating successful authentication from the authenticating section 203, the control section 212 causes any of the sections to execute processing on the basis of output processing information attached to the output target image data. Specifically, in a case where the output processing information indicates the printing processing, the control section 212 causes the image forming section 204 to execute printing based on the corrected image data generated by the image processing section 202. Meanwhile, in a case where the output processing information indicates the filing processing or the e-mail sending processing, the control section 212 causes the second communication section 208 to execute the filing processing or the e-mail sending processing based on the corrected image data generated by the image processing section 202.

(6) Image Processing in Image Processing Section

Next, the following describes details of the image processing executed by the image processing section 202. Note that the following description discusses image processing carried out on the output target image data received from the mobile terminal apparatus 100 or the image display apparatus 300 although the image processing section 202 carries out image processing also on image data read by the image reading section 201.

Figures 21, 22:
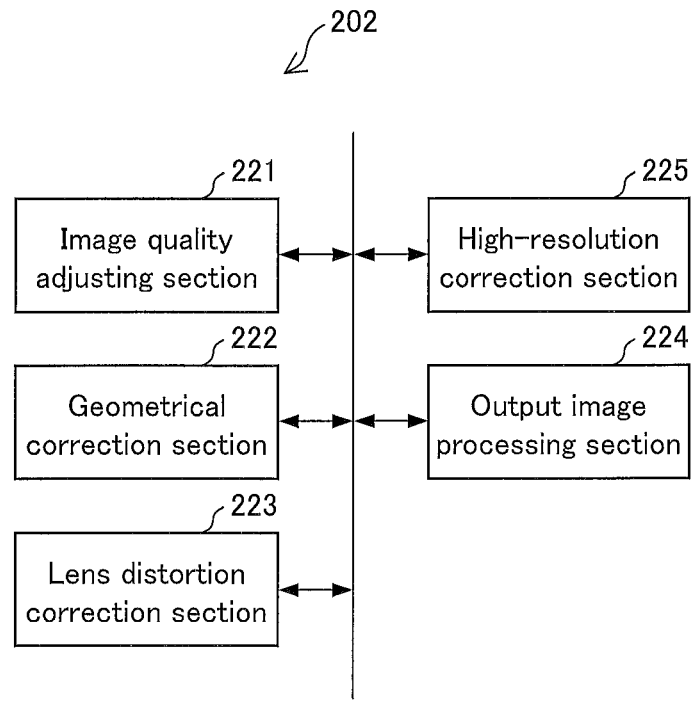
FIG. 21 is a block diagram showing a configuration of an image processing section of the image forming apparatus.
FIG. 22 shows an example of a look-up table created for adjustment of a color balance of the image.

FIG. 21 is a block diagram showing an internal configuration of the image processing section 202. As shown in FIG. 12, the image processing section 202 includes an image quality adjusting section 221, a geometrical correction section (mapping generating section) 222, a lens distortion correction section 223, a high-resolution correction section 225, and an output image processing section 224. The following describes specific processing carried out by these sections.

(6-1) Image Quality Adjusting Section

The image quality adjusting section 221 corrects color balance and contrast of the output target image data. The image quality adjusting section 221 calculates a maximum value and a minimum value of each color channel of the received output target image data, creates a look-up table in which the maximum value and the minimum value are made uniform, and applies the look-up table to each color channel. Specifically, the image quality adjusting section 221 just need create, as the look-up table, a table as shown in FIG. 22 in which MN is increased by increments of (MX−MN)/255 where MX is a maximum value of a certain channel, MN is a minimum value of the channel, and data is 8-bit data. Then, the image quality adjusting section 221 converts each pixel value in accordance with the created table. In this way, the color balance is corrected.

The image quality adjusting section 221 corrects contrast in s similar manner. Note that the look-up tables to be applied to respective color channels may be identical to each other if it is unnecessary to change the color balance.

Note that other known techniques may be used to correct color balance and contrast.

(6-2) Lens Distortion Correction Section

The lens distortion correction section 223 executes correction of lens distortion with respect to the output target image data.

The lens distortion correction section 223 carries out the following processing with respect to the output target image data. Specifically, the lens distortion correction section 223 sequentially detects edge pixels of a captured object in a captured image by raster scanning in a similar manner to the processing described in (3-3) above. Then, the lens distortion correction section 223 carries out curve approximation of the detected edge pixels, and then carries out lens distortion correction on the basis of the equation of the obtained curve.

Figure 23:
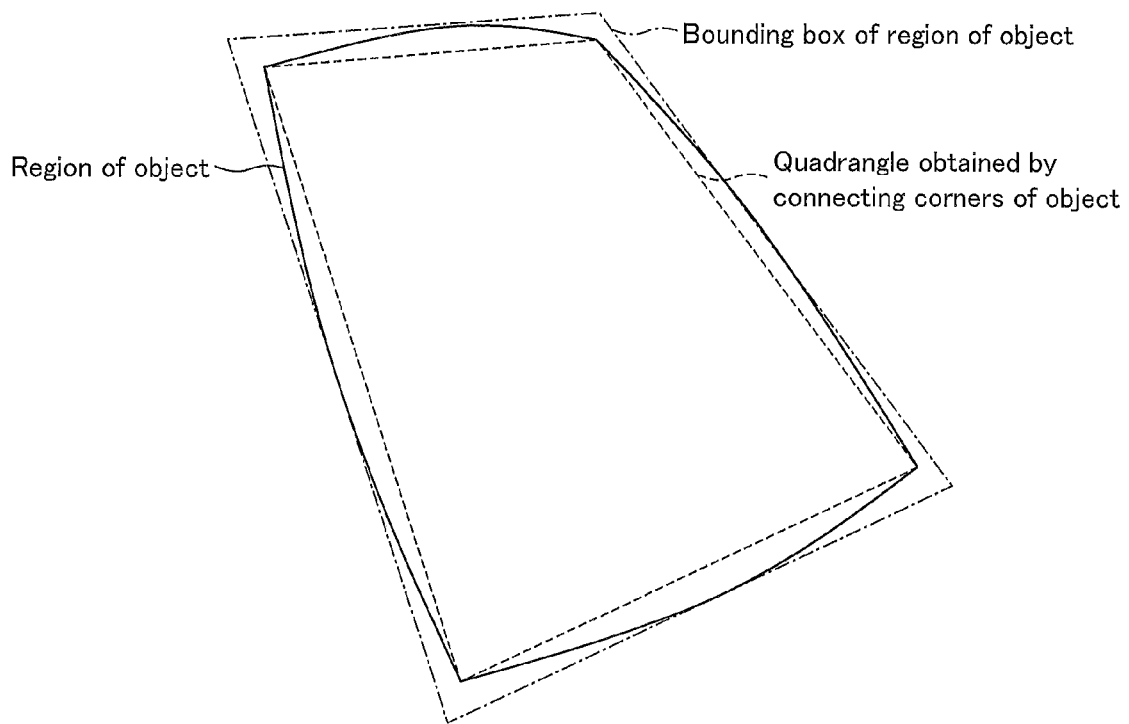
FIG. 23 shows an example of correction of lens distortion of the image.

Specifically, the lens distortion correction section 223 detects edge pixels of a detected captured object, and classifies the edge pixels into four groups of edge pixels that correspond to four sides of a boundary between the captured object and a background in a similar manner to the processing described in (3-3) above. Then, the lens distortion correction section 223 carries out quadratic curve approximation with respect to the edge points each belonging to any of the groups as indicated by the solid line in FIG. 23. The quadratic curves obtained for the four groups correspond to the four sides of the captured object. Moreover, the lens distortion correction section 223 calculates intersections of the four quadratic curves which intersections correspond to corners of a region surrounded by the four quadratic curves. Next, the lens distortion correction section 223 finds a bound box (indicated by the dashed-dotted line in FIG. 23) that circumscribes the quadratic curves obtained for the respective sides and is similar to a quadrangle (indicated by the dotted line in FIG. 23) obtained by connecting the four intersections. Then, the lens distortion correction section 223 converts positions of pixels within a region of the captured object in the captured image so that the found bound box is located on the edge pixels of the corrected object. This conversion may be calculated based on a vector from a reference point (e.g. center of gravity of the region of the captured object). In this way, it is possible to correct lens distortion caused by the image-capturing section 101 of the mobile terminal apparatus 100.

A method for correcting lens distortion is not limited to the aforementioned method, and can be a known method.

(6-3) Geometrical Correction Section

The geometrical correction section 222 corrects distortion of a rectangular captured object, such as a poster or manuscript paper, which distortion is caused by capturing the captured object from a direction different from a normal to a plane on which a document image is formed (i.e. distortion of a rectangular plane on which the document image is formed) and corrects skew of the captured object in image data.

Specifically, as with the geometrical arrangement detecting section 111, the geometrical correction section 222 finds equations of straight lines corresponding to groups of edge pixels that serve as a boundary between a rectangular captured object and a background on the basis of output target image data. Then, the geometrical correction section 222 specifies a quadrangular region (pre-corrected region) surrounded by the four straight lines, and cuts out the specified pre-corrected region.

Figure 24:
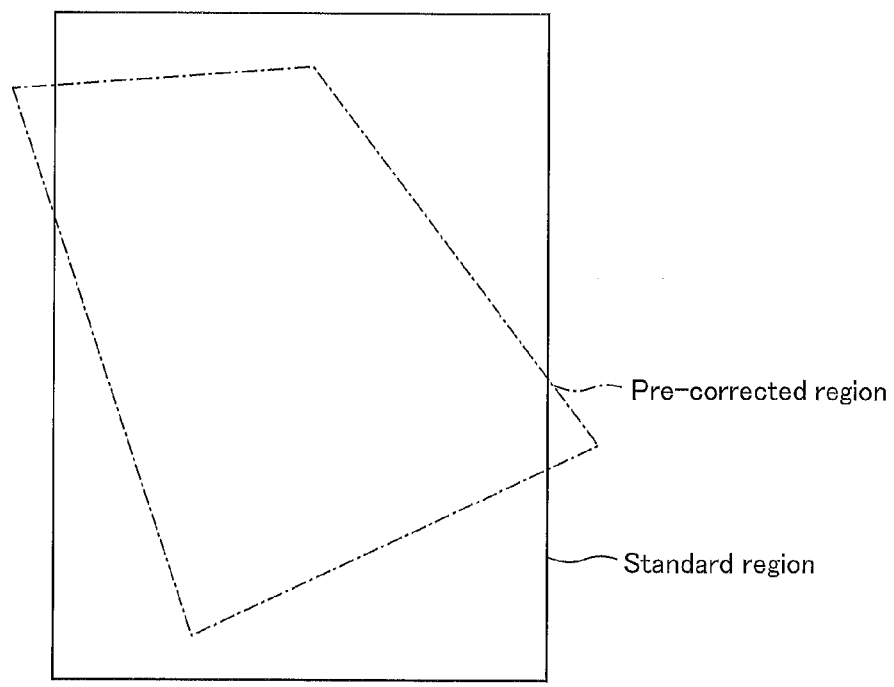
FIG. 24 shows an example of correction of geometrical distortion and skew of the image.

Next, the geometrical correction section 222 obtains a mapping for converting the specified rectangular pre-corrected region (indicated by the dashed-dotted line in FIG. 24) into a rectangular standard region (e.g. 7:10 in the case of A size and B size used for business documents; indicated by the solid line in FIG. 24) whose upper and lower sides are substantially parallel with a horizontal direction and which has a predetermined aspect ratio and a predetermined size as shown in FIG. 24. Note that the upper and lower sides of the standard region need not necessarily be completely parallel with the horizontal direction and may be tilted by a small angle within a predetermined range with respect to the horizontal direction (may be substantially parallel with the horizontal direction). Note that mapping means rules fx and fy for mapping conversion (coordinate conversion) from a coordinate (x1, y1) of each pixel of the pre-corrected region to a coordinate (x2, y2) of a corresponding pixel of the standard region, and is expressed by the following equations: x2=fx(x1, y1) and y2=fy(x1, y1). A known technique can be used as the mapping conversion. Note that the geometrical correction section 222 may carry out the conversion in conformity with an aspect ratio stored in advance in the storage section 210 or may carry out the conversion in conformity with an aspect ratio inputted to the input section 206. A size of the standard region may be one inputted to the input section 206 or may be one whose area is same as the pre-corrected region.

Next, the geometrical correction section 222 carries out the coordinate conversion with respect to the pre-corrected region that has been cut out from the output target image data in accordance with the mapping. This makes it possible to correct geometrical distortion and skew (this correction is hereinafter sometimes referred to as geometrical correction).

A method for the geometrical correction is not limited to the aforementioned method, and can be a known method.

(6-4) High-Resolution Correction Section

The high-resolution correction section 225 carries out high-resolution correction with respect to the output target image data. In the present embodiment, the high-resolution correction section 225 carries out the high-resolution correction on the basis of a single piece of output target image data.

As for a method for creating a high-resolution image from a single piece of image data, some methods are introduced in The Institute of Image Information and Television Engineers Journal Vol. 62, No. 2, pp. 181-189 (2008).

Typically, high-resolution correction can be executed by detecting an edge direction of an image pattern, carrying out interpolation in accordance with the direction, and carrying out a noise removal process for the purpose of removing influences of distortion caused by the interpolation, a noise component present in an input image, etc. The following describes this in detail.

Figure 25:
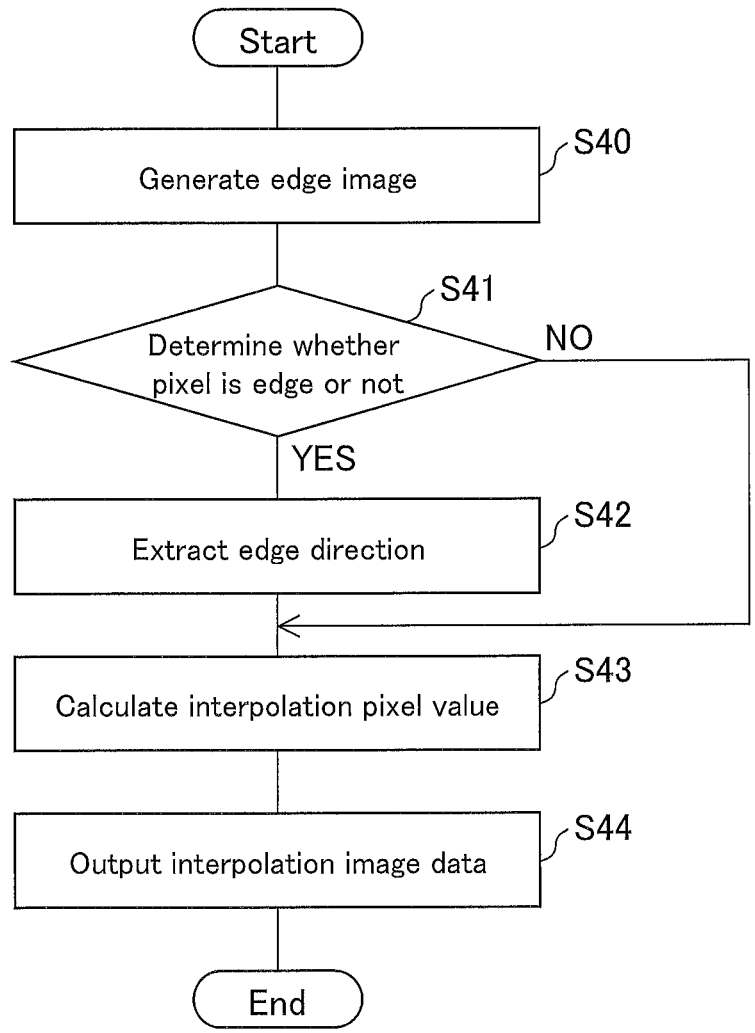
FIG. 25 is a flow chart showing an example of processing carried out by the high-resolution correction.
Figures 26, 27:
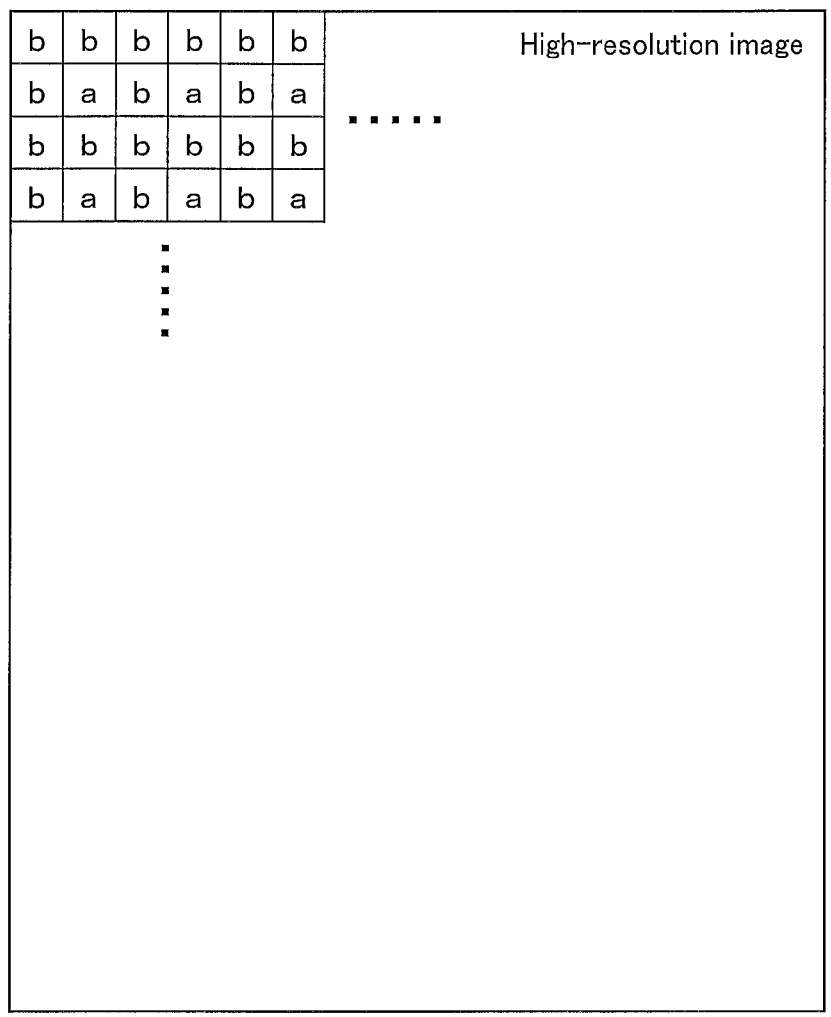
FIG. 26 shows reference pixels and interpolation pixels in high-resolution image data.
FIG. 27 shows an example of a first order differential filter.

FIG. 25 is a flow chart showing a flow of high-resolution correction in the present embodiment. The following describes an example in which 2-fold resolution conversion is carried out both in a lateral direction and in a longitudinal direction. In a case where 2-fold resolution conversion is carried out, assume that the number of pixels of output target image data to be corrected is n×m, the number of pixels of high-resolution image data obtained after the conversion is 2n×2m. Such high-resolution correction (2-fold resolution conversion) is executed as follows: It is assumed that each pixel of the output target image data is a reference pixel, a new pixel is generated as an interpolation pixel at a midpoint between adjacent reference pixels, and image data including both the reference pixels and the interpolation pixel is generated as high-resolution image data. FIG. 26 shows a relationship between reference pixels and interpolation pixels. In FIG. 26, a pixel "a" represents a reference pixel and a pixel "b" represents an interpolation pixel.

First, the high-resolution correction section 225 carries out edge extraction with respect to the output target image data. For example, the high-resolution correction section 225 carries out edge extraction with the use of a first order differential filter as shown in FIG. 27, and then carries out a binarizing process so as to generate binarized image data (S40). Note that a pixel given a pixel value 1 in the binarized image data is a pixel that is highly likely to be an edge.

Next, the high-resolution correction section 225 determines, on the basis of the binarized image data generated in S40, whether or not a target pixel in the captured image data is an edge (S41). Specifically, the high-resolution correction section 225 determines that the target pixel is an edge, in a case where a value of a pixel in the binarized image data corresponding to the target pixel is 1.

Note that the target pixel is a pixel to which attention is being drawn, out of pixels of the captured image data to which attention is drawn in any order.

In a case where the target pixel is an edge (Yes in S41), the high-resolution correction section 225 detects an edge direction with the use of a N×N (N>1) partial image that contains the target pixel (S42). Specifically, the high-resolution correction section 225 examines all reference pixels contained in the N×N partial image as to whether they are edge pixels or not. In a case where an upper left adjacent reference pixel and a lower right adjacent reference pixel are edge pixels, the high-resolution correction section 225 determines that an edge direction of the partial image is an upper left-lower right direction. Similarly, in a case where a left adjacent reference pixel and a right adjacent reference pixel are edge pixels, the high-resolution correction section 225 determines that the edge direction of the partial image is a left-right direction; in a case where an upper adjacent reference pixel and a lower adjacent reference pixel are edge pixels, the high-resolution correction section 225 determines that the edge direction of the partial image is an upper-lower direction; and in a case where an upper right adjacent reference pixel and a lower left adjacent reference pixel are edge pixels, the high-resolution correction section 225 determines that the edge direction of the partial image is an upper right-lower left direction.

In FIG. 28, the dotted line indicates the detected edge direction. Note that in FIG. 28, the pixels (1) to (9) are reference pixels and the pixel (5) is a target pixel. Note also that the pixels A, B and C are an interpolation pixel between the reference pixels (1) and (5), an interpolation pixel between the reference pixels (2) and (5), and an interpolation pixel between the reference pixels (4) and (5), respectively.

Next, the high-resolution correction section 225 calculates, by interpolation, a pixel value of the interpolation pixel A located on the upper left side of the target pixel, a pixel value of the interpolation pixel B located on the upper side of the target pixel, and a pixel value of the interpolation pixel C located on the left side of the target pixel in accordance with the edge direction detected in S42. In thus calculating the pixels values of the respective interpolation pixels, reference pixels along the edge direction are used.

In a case where the edge direction is the upper left-lower right direction, the reference pixels (1), (5) and (9) are edge pixels and a line connecting these pixels is an edge line as shown in (a) of FIG. 28. Then, the pixel value VA (in (a) of FIG. 28, "V" is omitted. The same applies also to the other pixel values mentioned below) of the interpolation pixel A that is on the edge line is calculated by the following equation with the use of pixel values of the reference pixel (1) (pixel value V(1)) and the reference pixel (5) (pixel value V(5)) each of which is on the edge line and is adjacent to the interpolation pixel A:

$$VA=(V(1)+V(5))/2.$$

Meanwhile, the interpolation pixels B and C that are not on the edge line are each interpolated with the use of reference pixels on a line that contains a reference pixel (closest reference pixel) closest to such an interpolation pixel out of reference pixels other than the reference pixels on the edge line and that is parallel with the edge direction. For example, in (a) of FIG. 28, as for the interpolation pixel B, a line that contains the reference pixel (2), which is the closest reference pixel, and that is parallel with the edge direction is a line connecting the reference pixels (2) and (6). An intersection of this line and a perpendicular line dropped from the interpolation pixel B to this line internally divides a line segment connecting the reference pixels (2) and (6). Accordingly, a pixel value VB of the interpolation pixel B is calculated by the following equation:

$$VB=(9 \times V(2)+4 \times V(6))/13$$

Similarly, the pixel value VC of the interpolation pixel C is calculated by the following equation with the use of a pixel value of the reference pixel (4), which is the closest reference pixel, and a pixel value of the reference pixel (8) on a line that contains the reference pixel (4) and that is parallel with the edge direction:

$$VC=(9 \times V(4)+4 \times V(8))/13$$

In a case where the edge direction is the left-right direction, the reference pixels (4), (5) and (6) are edge pixels and a line connecting these pixels is an edge line as shown in (b) of FIG. 28. The pixel value VC of the interpolation pixel C that is on the edge line is calculated by the following equation with the use of pixel values of the reference pixel (4) (pixel value V(4)) and the reference pixel (5) (pixel value V(5)) each of which is adjacent to the interpolation pixel C and is on the edge line:

$$VC=(V(4)+V(5))/2$$

Meanwhile, the interpolation pixels A and B that are not on the edge line are each interpolated with the use of reference pixels on a line that contains a reference pixel (closest reference pixel) closest to such an interpolation pixel out of reference pixels other than the reference pixels on the edge line and that is parallel with the edge direction. For example, in (b) of FIG. 28, as for the interpolation pixel A, a line that contains the reference pixel (1) or (2), which is the closest reference pixel, and that is parallel with the edge direction is a line connecting the reference pixels (1) and (2). An intersection of this line and a perpendicular line dropped from the interpolation pixel A to this line is present at a midpoint between the reference pixels (1) and (2). Accordingly, a pixel value VA of the interpolation pixel A is calculated by the following equation:

$$VA=(V(1)+V(2))/2$$

As for the interpolation pixel B, a line that contains the reference pixel (2), which is the closest reference pixel, and that is parallel with the edge direction is a line connecting the reference pixels (1), (2) and (3). An intersection of this line and a perpendicular line dropped from the interpolation pixel B to this line coincides with the reference pixel (2). Accordingly, a pixel value VB of the interpolation pixel B is set to the same value as the pixel value V(2) of the reference pixel (2).

In a case where the edge direction is the upper right-lower left direction, the reference pixels (3), (5) and (7) are edge pixels and a line connecting these pixels is an edge line as shown in (c) of FIG. 28. None of the interpolation pixels A, B and C is present on the edge line.

As for the interpolation pixel A, the reference pixels (1), (2) and (4) are the closest reference pixels. The reference pixels (2) and (4) are located on a line parallel with the edge direction, but the reference pixel (1) is not located on this line. Accordingly, the pixel value VA of the interpolation pixel A is calculated by the following equation with the use of pixel values of the reference pixels (1), (2) and (4), which are the closest reference pixels:

$$VA=(V(1)+V(2)+V(4))/3$$

Meanwhile, the interpolation pixels B and C are each interpolated with the use of reference pixels on a line that contains a reference pixel (closest reference pixel) closest to such an interpolation pixel out of reference pixels other than the reference pixels on the edge line and that is parallel with the edge direction. For example, in (c) of FIG. 28, as for the interpolation pixel B, a line that contains the reference pixel (2), which is the closest reference pixel, and that is parallel with the edge direction is a line connecting the reference pixels (1) and (4). An intersection of this line and a perpendicular line dropped from the interpolation pixel B to this line internally divides a line segment connecting the reference pixels (2) and (4). Accordingly, a pixel value VB of the interpolation pixel B is calculated by the following equation:

$$VB=(9\times V(2)+4\times V(4))/13$$

Similarly, the pixel value VC of the interpolation pixel C is calculated by the following equation with the use of a pixel value of the reference pixel (4), which is the closest reference pixel, and a pixel value of the reference pixel (2) on a line that contains the reference pixel (4) and that is parallel with the edge direction:

$$VC=(4\times V(2)+9\times V(4))/13$$

In a case where the edge direction is the upper-lower direction, the reference pixels (2), (5) and (8) are edge pixels and a line connecting these pixels is an edge line as shown in (d) of FIG. 28. The pixel value VB of the interpolation pixel B that is on the edge line is calculated by the following equation with the use of pixel values of the reference pixel (2) and the reference pixel (5) each of which is adjacent to the interpolation pixel B and is on the edge line:

$$VC=(V(2)+V(5))/2$$

Meanwhile, the interpolation pixels A and C that are not on the edge line are each interpolated with the use of reference pixels on a line that contains a reference pixel (closest reference pixel) closest to such an interpolation pixel out of reference pixels other than the reference pixels on the edge line and that is parallel with the edge direction. For example, in (d) of FIG. 28, as for the interpolation pixel A, a line that contains the reference pixel (1) or (4), which is the closest reference pixel, and that is parallel with the edge direction is a line connecting the reference pixels (1) and (4). An intersection of this line and a perpendicular line dropped from the interpolation pixel A to this line is present at a midpoint between the reference pixels (1) and (4). Accordingly, a pixel value VA of the interpolation pixel A is calculated by the following equation:

$$VA=(V(1)+V(4))/2$$

As for the interpolation pixel C, a line that contains the reference pixel (4), which is the closest reference pixel, and that is parallel with the edge direction is a line connecting the reference pixels (1), (4) and (7). An intersection of this line and a perpendicular line dropped from the interpolation pixel C to this line coincides with the reference pixel (4). Accordingly, a pixel value VC of the interpolation pixel C is set to the same value as the pixel value V(4) of the reference pixel (4).

Note that the storage section 210 stores therein in advance information on correspondence between edge directions and arithmetic expressions for calculating the pixel values of the interpolation pixels A, B and C. The high-resolution correction section 225 just need read out, from the storage section 210, an arithmetic expression corresponding to the edge direction detected in S42, and calculate the pixel values of the interpolation pixels A, B and C on the basis of the arithmetic expression read out.

Note that FIG. 28 shows only cases where the edge direction is linear. However, there are cases where an edge is curved in the N×N partial image. For example, there are cases where an edge is curved like the reference pixels (2)-(5)-(4) and cases where an edge is curved like the reference pixels (1)-(5)-(7). Even for such cases, the storage section 210 stores therein in advance information on correspondence between edge directions and arithmetic expressions for calculating the pixel values of the interpolation pixels A, B and C. For example, in the case where an edge is curved like the reference pixels (2)-(5)-(4), the storage section 210 stores therein a similar arithmetic expression to that of (c) of FIG. 28 as for the interpolation pixel A, a similar arithmetic expression to that of (b) of FIG. 28 as for the interpolation pixel B, and a similar arithmetic expression to that of (d) of FIG. 28 as for the interpolation pixel C. In the case where an edge is curved like the reference pixels (1)-(5)-(7), the storage section 210 stores therein a similar arithmetic expression to that of (a) of FIG. 28 as for the interpolation pixel A, a similar arithmetic expression to that of (a) of FIG. 28 as for the interpolation pixel B, and a similar arithmetic expression to that of (d) of FIG. 28 as for the interpolation pixel C. Similarly, the storage section 210 stores therein arithmetic expressions corresponding to other edge direction patterns.

The high-resolution correction section 225 thus calculates pixel values of interpolation pixels located around a reference pixel that has been determined to be an edge pixel.

Meanwhile, in a case where the target pixel is not an edge (No in S41), the high-resolution correction section 225 calculates, by a general interpolation calculation method (e.g. bilinear, bicubic), a pixel value of the interpolation pixel A, which is an adjacent pixel on the upper left side of the target pixel, a pixel value of the interpolation pixel B, which is an adjacent pixel on the upper side of the target pixel, and a pixel value of the interpolation pixel C, which is an adjacent pixel on the left side of the target pixel.

The high-resolution correction section 225 generates interpolation image data having both reference pixels and interpolation pixels by executing the processes in S41 to S43 on all of the reference pixels included in the single piece of image data (S44).

Then, the high-resolution correction section 225 carries out a process of improving image quality with respect to the generated interpolation image data. For example, the high-resolution correction section 225 generates high-resolution image data by applying a noise removal filter, a sharpening filter or the like to the interpolation image data. The sharpening filter is a conventional unsharp mask or a filter obtained by changing the central coefficient of the filter of FIG. 27 to 5. As the noise removal filter, a median filter is widely known. It is possible to use a more advanced technique such as a Bilateral filter [Proceedings of the 1998 IEEE International Conference on Computer Vision,], which achieves both an edge keeping capability and an improvement in image quality.

A method by which the high-resolution correction section 225 generates high-resolution image data is not limited to the aforementioned method, and the high-resolution correction section 225 may generate high-resolution image data from a single piece of captured image data with use of any of various methods described in The Institute of Image Information and Television Engineers Journal Vol. 62, No. 2, pp. 181 to 189 (2008).

(6-5) Output Image Processing Section

The output image processing section 224 executes a segmentation process, a color correction process, a black generation and under color removal process, a spatial filter process, and a halftone process when the output target image data is output. Note that these processes may be executed by known techniques.

(7) Flow of Process Carried Out by Image Forming Apparatus

Figure 29:
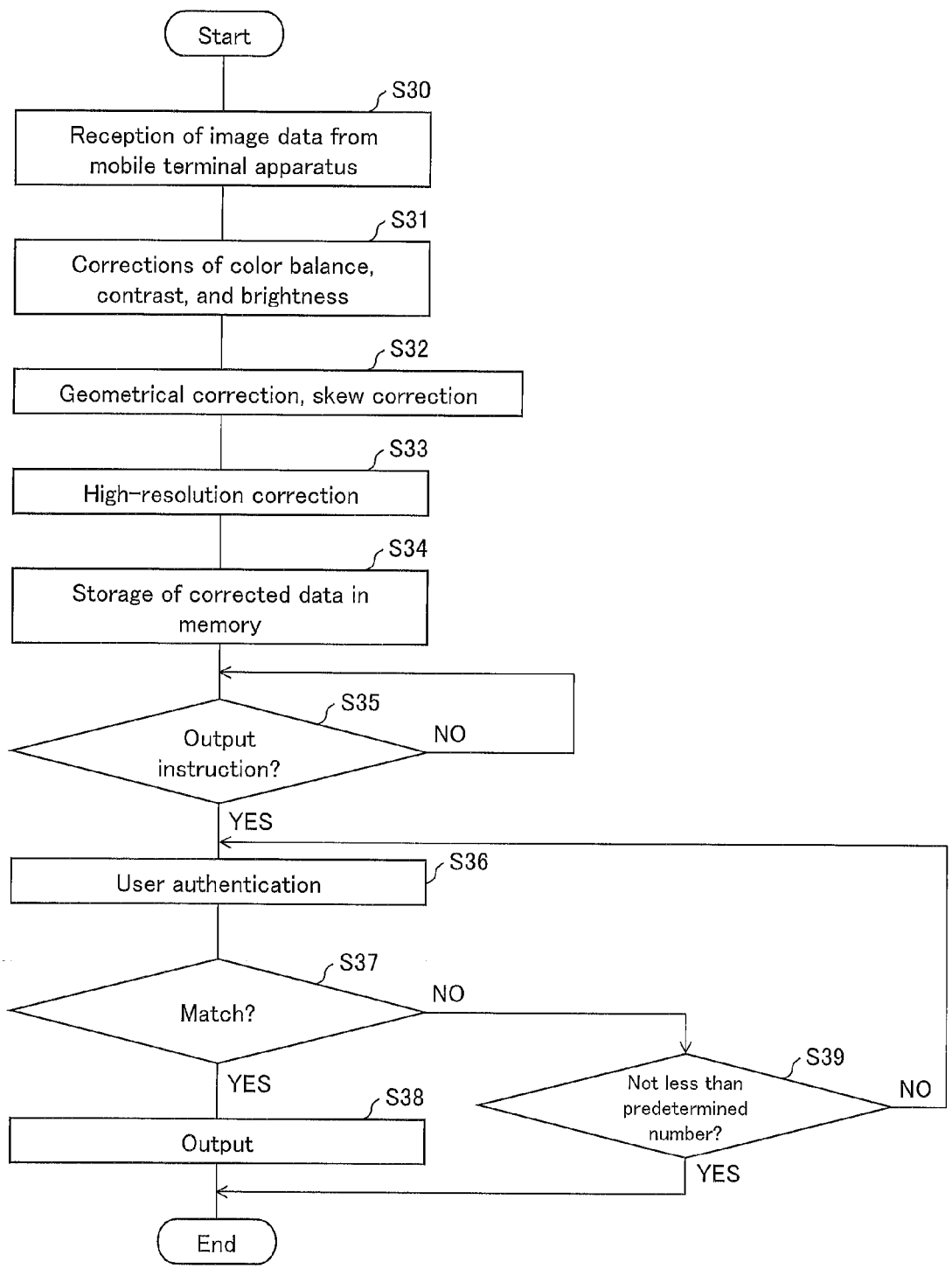
FIG. 29 is a flow chart showing an overall flow of processing carried out by the image forming apparatus.

The following description will discuss a flow of a process carried out by the image forming apparatus 200 in accordance with the present embodiment. FIG. 29 illustrates a flow of a process carried out by the image forming apparatus 200.

The first communication section 207 of the image forming apparatus 200 receives, from the mobile terminal apparatus 100, output target image data, model information, user information, and output processing information (S30).

As described in the item (6-1) for example, the image quality adjusting section 221 of the image processing section 202 corrects a color balance and a contrast of the received output target image data (S31). Subsequently, as described in the item (6-2), the lens distortion correction section 223 corrects lens distortion of the received output target image data.

Furthermore, the geometrical correction section 222 corrects geometrical distortion and skew of the output target image data (S32). Specifically, the geometrical correction section 222 specifies and cuts out a quadrangular region (pre-corrected region) surrounded by lines respectively corresponding to four sides constituting a boundary between a captured object and a background. Then, the geometrical correction section 222 obtains coordinates mapping for converting the cut-out quadrangular pre-corrected region into a rectangular standard region whose upper side and lower side are substantially parallel to a horizontal direction and which has a predetermined aspect ratio and size. Then, using the mapping, the geometrical correction section 222 carries out a mapping conversion process on image data of the cut-out pre-corrected region. Consequently, it is possible to output an image without a geometrical distortion.

Subsequently, the high-resolution correction section 225 subjects the image data, which has been subjected to the process in S32, to a high-resolution correction (S33). The high-resolution correction has been specifically described in the item (6-4).

Subsequently, the output image processing section 224 carries out image processes such as a segmentation process, color correction, a black generation and under color removal process, a spatial filter process, and a halftone process on high-resolution image data obtained as a result of the high-resolution correction in the high-resolution correction section 225. The output image processing section 224 appropriately switches the image processes according to types of output methods indicated by output processing information. Then, the output image processing section 224 causes corrected image data to be stored in the storage section 210 (S34). In this step, the output image processing section 224 causes the corrected image data to be stored in the storage section 210 in such a manner that the corrected image data is associated with user information and output processing information which have been received by the output image processing section 224 together with output target image data from which the corrected image data has been obtained.

Thereafter, the control section 212 determines whether an output instruction to output the output target image data is inputted to the input section 206 or not (S35). In a case where the output instruction is not inputted (NO in S35), the control section 212 waits until the output instruction is inputted.

On the other hand, in a case where the output instruction is inputted (YES in S35), the authentication section 203 causes the display section 205 to display a screen which requests a user to enter user information (e.g. user ID and password), and obtains user information from the input section 206. Then, the authentication section 203 carries out user authentication (S36). The authentication section 203 may obtain, by using a noncontact IC card reader/writer mounted on the image forming apparatus 200, user information from a noncontact IC card which a user possesses.

In the user authentication, the authentication section 203 compares the inputted user information with user information received from the mobile terminal apparatus 100, so as to determine whether the user information received from the mobile terminal apparatus 100 matches the inputted user information (S37). In a case where the user information received from the mobile terminal apparatus 100 matches the inputted user information (YES in S37), the control section 212 subjects the corrected image data, which has been stored in the storage section 210 in S34 and which corresponds to the user information, to the output process in accordance with the output processing information received from the mobile terminal apparatus 100 (S38).

For example, in a case where the output processing information is indicative of a printing process, the control section 212 causes the image forming section 204 to print an image indicated by the corrected image data. In a case where the output processing information is indicative of a filing process or an e-mail sending process, the control section 212 causes the second communication section 208 to carry out the filing process or the e-mail sending process on the corrected image data. Thereafter, the control section 212 ends the process.

On the other hand, in a case where the inputted user information does not match the user information received from the mobile terminal apparatus 100 (NO in S37), the authentication section 203 determines whether the number of authentication is not less than a predetermined number (S39). In this step, in a case where the number of authentication is less than the predetermined number (NO in S39), the authentication section 203 carries out the processes of S36 and S37 repeatedly, and in a case where the number of authentication is not less than the predetermined number (YES in S39), the authentication section 203 ends the flow without output.

(8) Modification

The captured image processing system of the present invention is not limited to the above embodiments, and may be modified in various manners. The following description will discuss specific modifications.

(8-1) Display of First Missing Information

A description was made above as to a case where the display processing section 112 specifies, based on coordinates of a vertex outside a captured image area, a point in the captured image area which is closest to the coordinates of the vertex, and the display processing section 112 causes the display section 105 to display first missing information in a range with a predetermined distance from the specified point. Alternatively, the display processing section 112 may cause the display section 105 to display first missing information in the vicinity of the vertex outside the captured image area.

Figure 30:
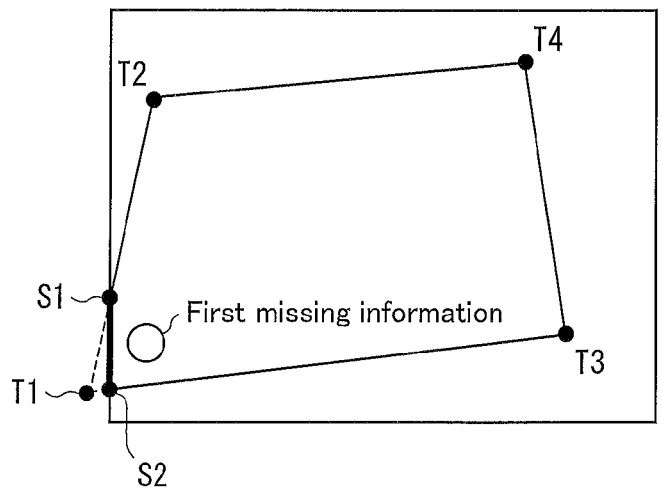
FIG. 30 shows a display example of the first missing information.

For example, as illustrated in FIG. 30, assume that out of vertexes of a quadrangle surrounded by four lines detected by the geometrical arrangement detecting section 111, a vertex outside the captured image area is referred to as a first vertex T1, two vertexes adjacent to the first vertex T1 are referred to as a second vertex T2 and a third vertex T3, and a vertex diagonally opposite to the first vertex T1 is referred to as a fourth vertex T4. Furthermore, assume that an intersection between (i) a line connecting the first vertex T1 and the second vertex T2 and (ii) a frame of the captured image area is referred to as a first intersection S1, and an intersection between (iii) a line connecting the first vertex T1 and the third vertex T3 and (iv) the frame of the captured image area is referred to as a second intersection S2. In this case, the display processing section 112 may cause the display section 105 to display first missing information in a range with a predetermined distance from a line segment connecting the first intersection S1 and the second intersection S2.

(8-2) Display of Second Missing Information

A description was made above as to a case where the display processing section 112 causes the display section 105 to display second missing information in a range with a predetermined distance from a side of a frame of a captured image area which side corresponds to a side indicated by extraction incapability information in extraction result information. Alternatively, the display processing section 112 may cause the display section 105 to display second missing information in the vicinity of a side outside a captured image area.

Figure 31:
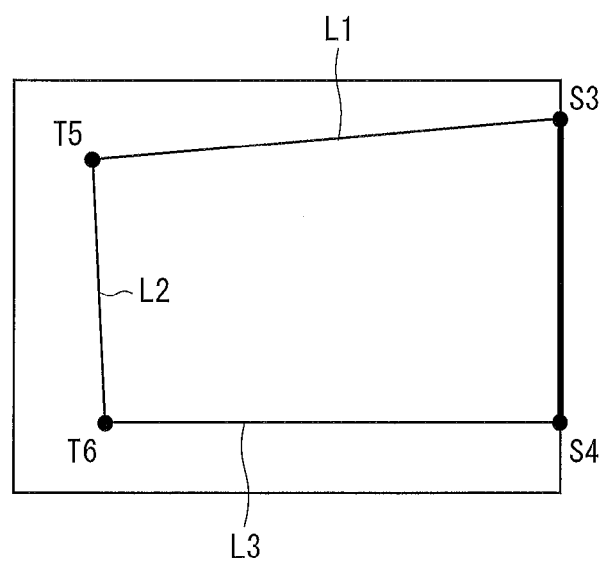
FIG. 31 shows a display example of the second missing information.

For example, as illustrated in FIG. 31, assume that lines corresponding to three line segments indicated by three groups of edge pixels detected by the geometrical arrangement detecting section 111 are referred to as a first line L1, a second line L2, and a third line L3, respectively, and a first intersection T5 between the first line L1 and the second line L2 and a second intersection T6 between the second line L2 and the third line L3 are within a captured image area, and an intersection which is between the first line L1 and the frame of the captured image area and which is farther from the first intersection T5 is referred to as a third intersection S3, and an intersection which is between the third line L3 and the frame of the captured image area and which is farther from the second intersection T6 is referred to as a fourth intersection S4. In this case, the display processing section 112 may cause the display section 105 to display second missing information in a range with a predetermined distance from a line segment connecting the third intersection S3 and the fourth intersection S4.

(8-3) Transmission of Output Target Image Data (8-3-1) First Modification

A description was made above as to a case where image data indicative of a whole of an image captured by the image-capturing section 101 is output target image data. In this case, the communication section 104 may transmit, together with the output target image data, equations indicative of lines corresponding to four groups of edge pixels, respectively, detected by the geometrical arrangement detecting section 111.

In this case, the geometrical correction section of the image forming apparatus cuts out, using the four equations indicative of lines which are added to the output target image data, a region surrounded by the lines from the output target image data. Then, the geometrical correction section obtains mapping for converting the cut-out image into a rectangular standard region whose upper and lower sides are substantially parallel to a horizontal direction and which has a predetermined aspect ratio and size (e.g. 7:10 in the case of A size and B size used for business documents; indicated by solid lines in FIG. 15). The geometrical correction section may carry out a geometrical correction on the cut-out image in accordance with the obtained mapping.

Alternatively, the communication section 104 may transmit, together with the output target image data, coordinates of four vertexes of a quadrangle surrounded by lines respectively corresponding to four groups of edge pixels detected by the geometrical arrangement detecting section 111.

Also in this case, the geometrical correction section 222 of the image forming apparatus 200 cuts out, from the output target image data, a quadrangular region defined by four vertexes whose coordinates are added to the output target image data. Then, the geometrical correction section obtains mapping for converting the cut-out image into a rectangular standard region. Then, the geometrical correction section may carry out a geometrical correction in accordance with the obtained mapping.

In a case where the quadrangle surrounded by lines respectively corresponding to four groups of edge pixels detected by the geometrical arrangement detecting section 111 is a rectangle, the communication section 104 may transmit, together with the output target image data, an angle (skew) formed by a lower side of the quadrangle and a lower side of a frame of a captured image area.

In this case, the geometrical correction section of the image forming apparatus cuts out, from the output target image data, a quadrangular region defined by four vertexes whose coordinates are added to the output target image data. Then, the geometrical correction section can correct the skew of the cut-out image by rotating the cut-out image by the angle added to the output target image data.

(8-3-2) Second Modification

The output target image determining section 113 may cut out, from a whole of an image captured by the image-capturing section 101, a quadrangular region surrounded by lines respectively corresponding to four groups of edge pixels detected by the geometrical arrangement detecting section 111, and determines image data indicative of the cut-out image as the output target image data. Then, the communication section 104 transmits the determined output target image data to the image forming apparatus.

In this case, the geometrical correction section of the image forming apparatus obtains mapping for converting the image indicated by the output target image data into a rectangular standard region whose upper and lower sides are substantially parallel to a horizontal direction and which has a predetermined aspect ratio and size (e.g. 7:10 in the case of A size and B size used for business documents; indicated by solid lines in FIG. 15). The geometrical correction section may carry out a geometrical correction on the image in accordance with the obtained mapping.

(8-3-3) Third Modification

As described in the item (8-3-2), the output target image determining section 113 may cut out, from a whole of an image captured by the image-capturing section 101, a quadrangular region surrounded by lines respectively corresponding to four groups of edge pixels detected by the geometrical arrangement detecting section 111, and determines image data indicative of the cut-out image as the output target image data.

Then, the communication section 104 may transmit, together with the determined output target image data, equations indicative of lines respectively corresponding to four groups of edge pixels detected by the geometrical position detection section 111.

In this case, the geometrical correction section of the image forming apparatus obtains, using the four equations indicative of lines which equations are added to the output target image data, mapping for converting a region surrounded by the lines into a rectangular standard region. Then, the geometrical correction section may carry out a geometrical correction on the output target image data in accordance with the obtained mapping.

Alternatively, the communication section 104 may transmit, together with the determined output target image data, coordinates of four vertexes of a quadrangle surrounded by lines respectively corresponding to four groups of edge pixels detected by the geometrical arrangement detecting section 111.

Also in this case, the geometrical correction section of the image forming apparatus obtains mapping for converting a quadrangular region defined by four vertexes whose coordinates are added to the output target image data into a rectangular standard region. Then, the geometrical correction section may carry out a geometrical correction on the output target image data in accordance with the obtained mapping.

In a case where the quadrangle surrounded by lines respectively corresponding to four groups of edge pixels detected by the geometrical arrangement detecting section 111 is a rectangle, the communication section 104 may transmit, together with the output target image data, an angle (skew) formed by a lower side of the quadrangle and a lower side of a frame of a captured image area.

In this case, the geometrical correction section of the image forming apparatus can correct the skew of the image indicated by the output target image data by rotating the image by the angle added to the output target image data.

(8-4) Determination by Output Target Image Determining Section

A description was made above as to a case where the output target image determining section 113 determines, as output target image data, image data indicative of a captured image displayed by the display section 105 at timing when a shutter button (reference sign 10 in FIG. 14) is operated while the display processing section 112 causes the display section 105 to display information indicating that a captured object is within a captured image area (e.g. "OK").

Alternatively, the output target image determining section 113 may have an automatic shutter function for automatically determining output target image data, instead of the operation on the shutter button 10.

That is, in a case where the automatic shutter function is effective, when the display processing section 112 causes the display section 105 to display, for predetermined number of captured images (frame images) sequentially captured by the image-capturing section 101, information indicating that a captured object is within a captured image area, the output target image determining section 113 determines, as output target image data, image data indicative of one of the predetermined number of captured images (frame images) (e.g. lastly captured image).

To be more specific, the output target image determining section 113 causes coordinates of four vertexes (excluding a provisional vertex coordinate), which are indicated by extraction result information outputted from the geometrical arrangement detecting section 111, of the predetermined number (e.g. 30) of captured images (frame images) sequentially captured by the image-capturing section 101 to be stored. In a case where a square of a difference among coordinates of each vertex of the predetermined number of captured images is less than a predetermined threshold, the output target image determining section 113 determines, as the output target image data, image data indicative of a captured image displayed by the display section 105.

The predetermined threshold is, for example, as follows.

$$(\text{Height of captured image area } Y\text{max} \times \tfrac{1}{16})^2 + (\text{width of captured image area } X\text{max} \times \tfrac{1}{16})^2$$

This allows determining output target image data without a user operating a shutter button. Accordingly, it is possible to prevent a captured object from being blurred or being out of a captured image area due to operation on the shutter button.

Figure 32:
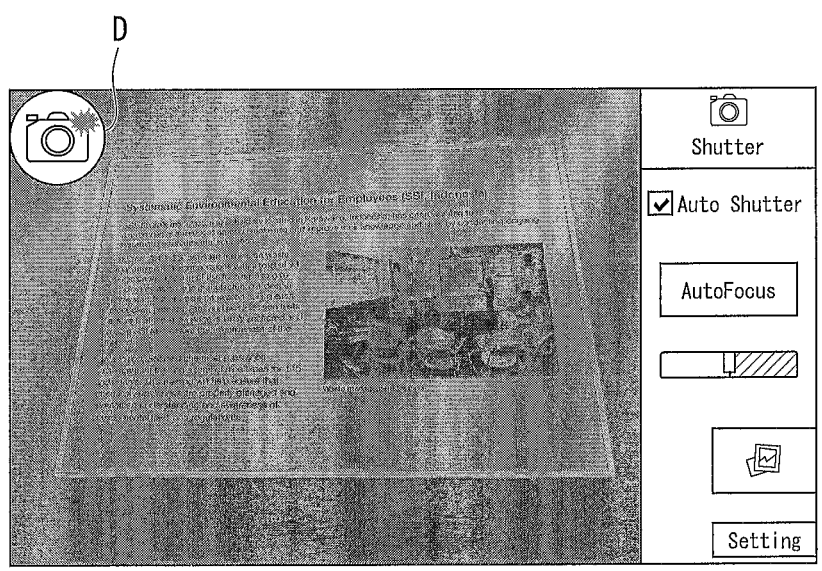

A user can switch between an on-state and an off-state of the automatic shutter function. The switching is made by operating a condition setting button 50 illustrated in FIG. 14. In a case where the automatic shutter function is effective and output target image data is determined by using the automatic shutter function, the output target image determining section 113 causes the display section 105 to display a third icon D indicating that output target image data is determined by using the automatic shutter function, as illustrated in FIG. 32.

(8-5) Switching Between on-State and Off-State of Contour Display Function

Figure 44:
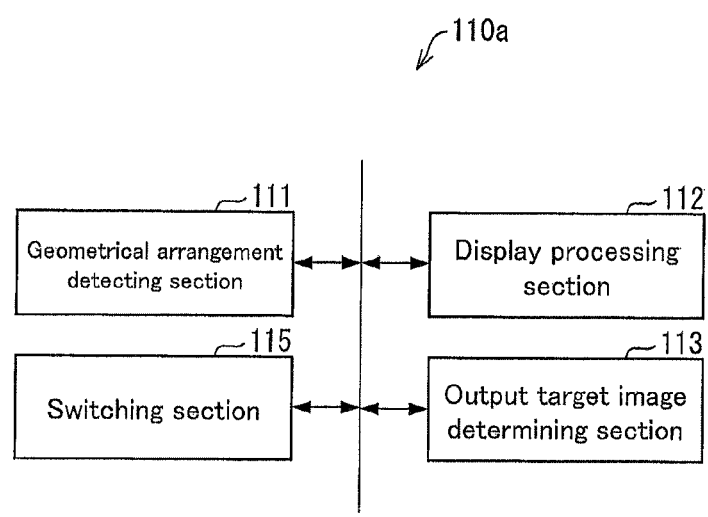
FIG. 44 is a block diagram showing a modification of the captured image area determining section.

FIG. 44 is a block diagram illustrating a modification of the captured image area determining section. As illustrated in FIG. 44, a captured image area determining section 110a in accordance with the present modification is different from the captured image area determining section 110 in that the captured image area determining section 110a includes a switching section 115.

The switching section 115 switches between an on-state and an off-state of a contour display function (document correction mode) of the geometrical arrangement detecting section 111 and the display processing section 112, in accordance with a user's input.

Figure 45:
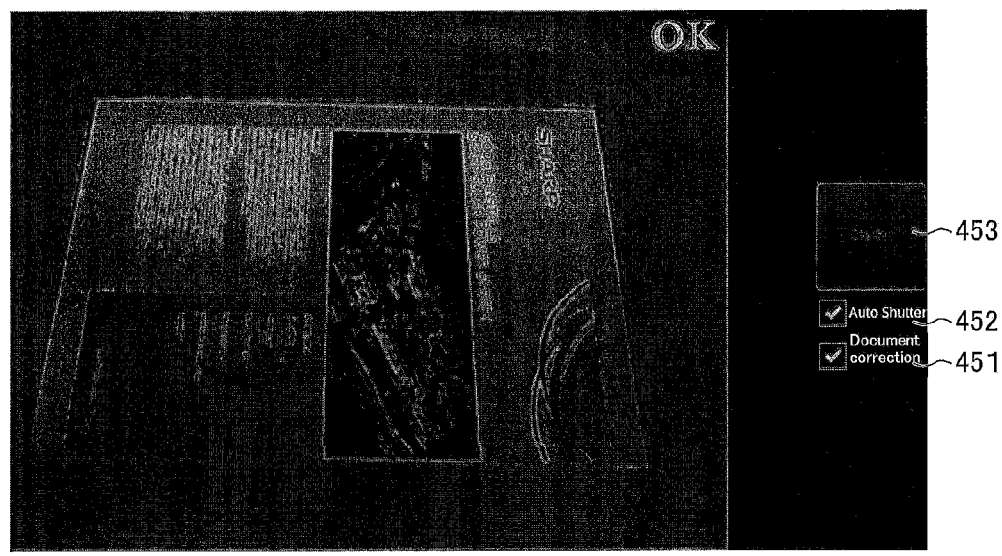
FIG. 45 shows an example of a screen including a checkbox for switching between on and off of a document correction mode.

As illustrated in FIG. 45, the switching section 115 causes the display section 105 to display a check box 451 for switching the on-state and the off-state of the document correction mode. In a case where an instruction to switch the document correction mode to be in the on-state is inputted, the switching section 115 causes the geometrical arrangement detecting section 111 and the display processing section 112 to operate, so that the processes of S1 to S6 in FIG. 4 are carried out. Consequently, a contour of the captured object is displayed in such a manner that the contour is superimposed on the captured image, making it easy for a user to check whether the captured object is within the captured image area.

On the other hand, in a case where an instruction to switch the document correction mode to be in the off-state is inputted, the switching section 115 does not cause the geometrical arrangement detecting section 111 and the display processing section 112 to operate, so that only a captured image is displayed.

Reception by the switching section 115 of the instruction to switch between the on-state and the off-state of the document correction mode may be made before starting capturing an image or while capturing an image.

Alternatively, the present modification may be combined with the modification described in the item (8-4). In this combination, only in a case where the document correction mode is in the on-state, the automatic shutter function can be set to "effective". That is, in the example illustrated in FIG. 45, a user can check a check box 452 for the automatic shutter function only in a case where a check box 451 for the document correction mode is checked (document correction mode is in the on-state).

(8-6) Editing View Function

The display processing section 112 of the mobile terminal apparatus 100 may have a function (corrected image preview function) for preview-displaying an image (correction-processed image) obtained by subjecting the output target image data determined by the output target image determining section 113 to an image correction process including geometrical correction and image quality-improving correction based on the contour.

In the present modification, the display processing section 112 has functions of the image quality adjustment section 221, the geometrical correction section 222, and the high-resolution correction section 225. When the display processing section 112 receives an instruction to carry out the corrected image preview function, the display processing section 112 reads out designated output target image data. The display processing section 112 causes the geometrical arrangement detecting section 111 to carry out the processes of S1 to S5 (FIG. 4) on a captured image indicated by the output target image data. The display processing section 112 carries out the image quality adjustment, the geometrical correction, and the high-resolution correction on an image of a region surrounded by a contour connecting four vertexes whose coordinates have been calculated in S5, so as to generate a correction-processed image, and the display processing section 112 causes the display section 105 to preview-display the correction-processed image.

Figure 46:
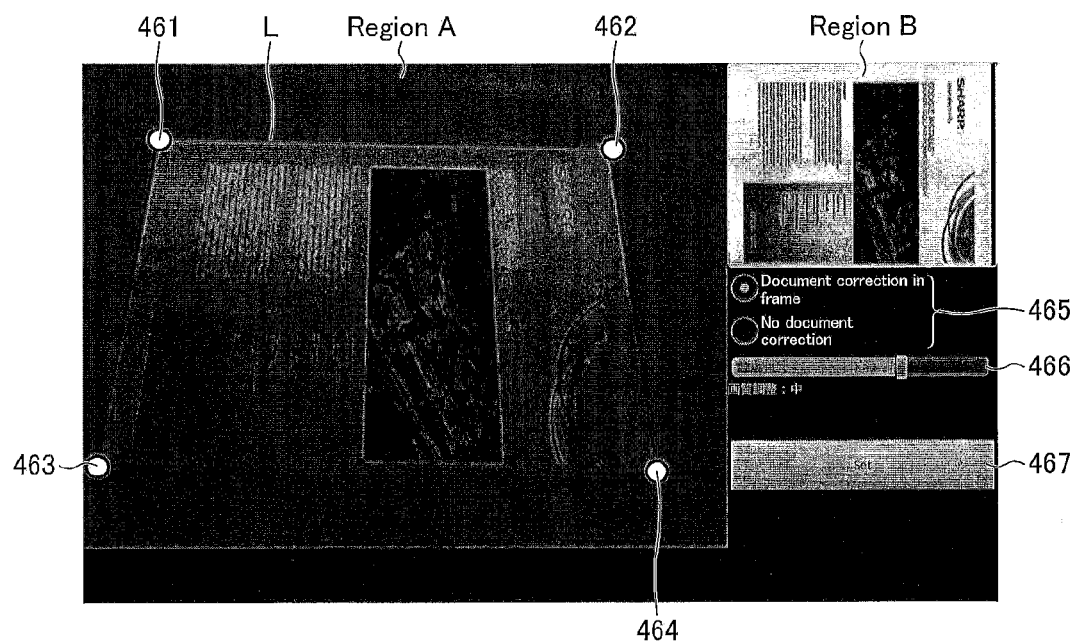
FIG. 46 shows an example of a screen on which a correction-processed image is displayed.

FIG. 46 illustrates an example of a screen on which the correction-processed image is displayed. As illustrated in FIG. 46, the display processing section 112 causes the display section 105 to display, at a region A, a captured image indicated by output target image data in such a manner that a contour is superimposed on the captured image, and display the correction-processed image at a region B.

The display processing section 112 may cause the display section 105 to display a correction-processed image before a shutter button is pressed.

The display processing section 112 may generate a correction-processed image by carrying out only the image quality adjustment and the geometrical correction on an image.

Furthermore, the display processing section 112 may receive an instruction to edit coordinates of four vertexes which are calculated by the geometrical arrangement detecting section 111, and generate a correction-processed image based on an image of a region surrounded by a contour connecting the edited coordinates of four vertexes. For example, as illustrated in FIG. 46, the display processing section 112 causes the display section 105 to display editing icons 461 to 464 respectively corresponding to four vertexes in the region A. When the display processing section 112 receives an instruction to change the positions of the editing icons 461 to 464, the display processing section 112 may edit coordinates of the four vertexes according to the changed positions of the editing icons 461 to 464 and determine the position of a contour.

In this case, similarly with the case described in the item (8-3-1), the communication section 104 transmits the edited coordinates of the four vertexes together with the output target image data. This allows a user to cause the image forming apparatus 200 to output a region surrounded by a desired contour.

As illustrated in FIG. 46, the display processing section 112 may cause the display section 105 to display a check box 465 for switching whether to display a correction-processed image in the region B or not. In this case, the display processing section 112 switches whether the correction-processed image is displayed in the region B in accordance with checking of the check box 465.

Furthermore, as illustrated in FIG. 46, the display processing section 112 may cause the display section 105 to display a bar 466 for changing the degree of the image quality correction. In this case, the display processing section 112 changes the degree of the image quality adjustment (contrast correction) in accordance with an input to the bar 466. For example, a user can change the degree of the image quality adjustment in four scales including "Not applied", "Mild", "Middle", and "Intensive" with use of the bar 466.

Furthermore, as illustrated in FIG. 46, the display processing section 112 may cause the display section 105 to display a registration button 467. Pressing the registration button 467 causes output target image data, coordinates of four vertexes, and the level of the image quality adjustment which are set at timing of pressing of the registration button 467 to be stored in the storage section 108 in such a manner that the output target image data, the coordinates of four vertexes, and the level of the image quality adjustment are associated with one another. When the communication section 104 transmits the output target image data to the image forming apparatus 200, the communication section 104 transmits, together with the output target image data, the coordinates of the four vertexes and the level of the image quality adjustment which are associated with the output target image data. In this case, the geometrical correction section 222 of the image forming apparatus 200 may cut out, from the output target image data, a quadrangular region defined by four vertexes whose coordinates are added to the output target image data, and carry out the geometrical correction on the cut-out image so that the cut-out image becomes a rectangular standard region. Furthermore, the image quality adjustment section 221 of the image forming apparatus 200 may carry out the image quality adjustment in accordance with the level of the image quality adjustment which is added to the output target image data. This allows a user to set a region and an image quality of an image to be outputted from the image forming apparatus 200.

The present modification may be combined with the modification described in the item (8-5). In this combination, in a case where the document correction mode is set to be in an on-state, the corrected image preview function is automatically put in an on-state. That is, in FIG. 45, when pressing of the shutter button 453 or the automatic shutter function determines output target image data, the display processing section 112 recognizes that an instruction to carry out the corrected image preview function is inputted automatically. Then, the display processing section 112 may carry out the corrected image preview function and cause the display section 105 to display the screen as illustrated in FIG. 46.

(8-7) Image Display Apparatus

The image display apparatus 300 may include the image processing section 202 included in the image forming apparatus 200. The image display apparatus 300 may carry out an output process which is a display process for displaying an image indicated by corrected image data obtained by subjecting output target image data to the geometrical correction and the high-resolution correction.

(8-8) Mobile Terminal Apparatus

In a case where an object is captured under a bad condition, there is a possibility that an image of the captured object is difficult to review even after an image forming apparatus has carried out an image process on the image. For example, in a case where an object is captured in a state where an image of the captured object has a relatively large geometrical distortion, the image is difficult to review even after the geometrical correction on the image.

In order to deal with this, the mobile terminal apparatus 100 may be arranged to determine whether output target image data is indicative of an image captured under a condition which enables the image process in the image forming apparatus to be effective, and urge a user to re-capture an image depending on the result of the determination.

Figure 33:
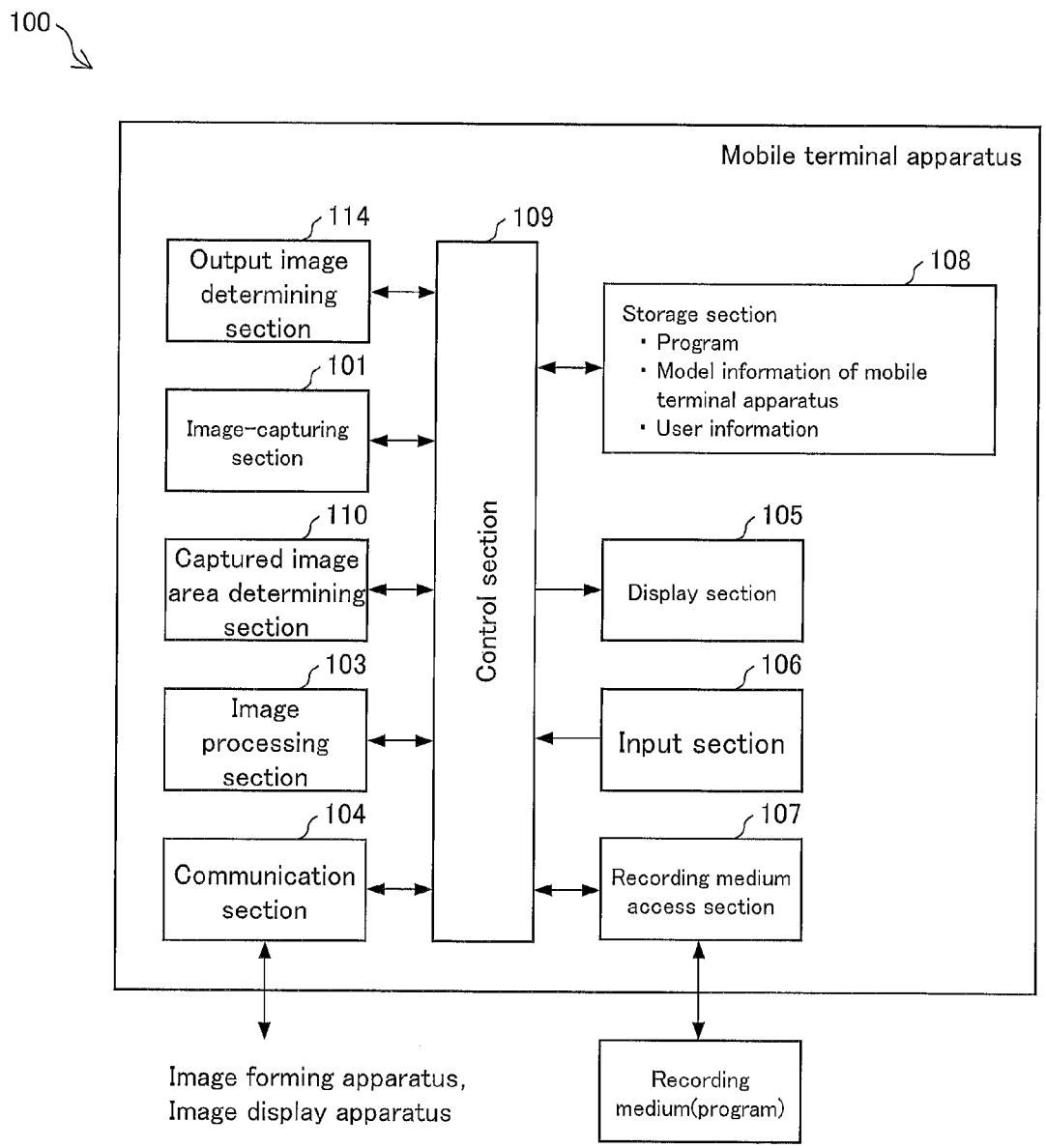
FIG. 33 is a block diagram showing a configuration of a mobile terminal apparatus of a modification.

FIG. 33 is a block diagram illustrating a configuration of the mobile terminal apparatus 100 in accordance with the present modification. As illustrated in FIG. 33, the mobile terminal apparatus 100 in accordance with the present modification is different from the mobile terminal apparatus illustrated in FIG. 2 in that the mobile terminal apparatus 100 includes an output image determining section 114.

The output image determining section 114 determines, in a case where the document capturing mode is selected, whether the output target image data determined by the captured image area determining section 110 is indicative of an image captured under a condition which enables the image process in the image forming apparatus to be effective. Examples of items to be determined by the output image determining section 114 are as follows.

(8-8-1) Determination of Skew

Figure 34:
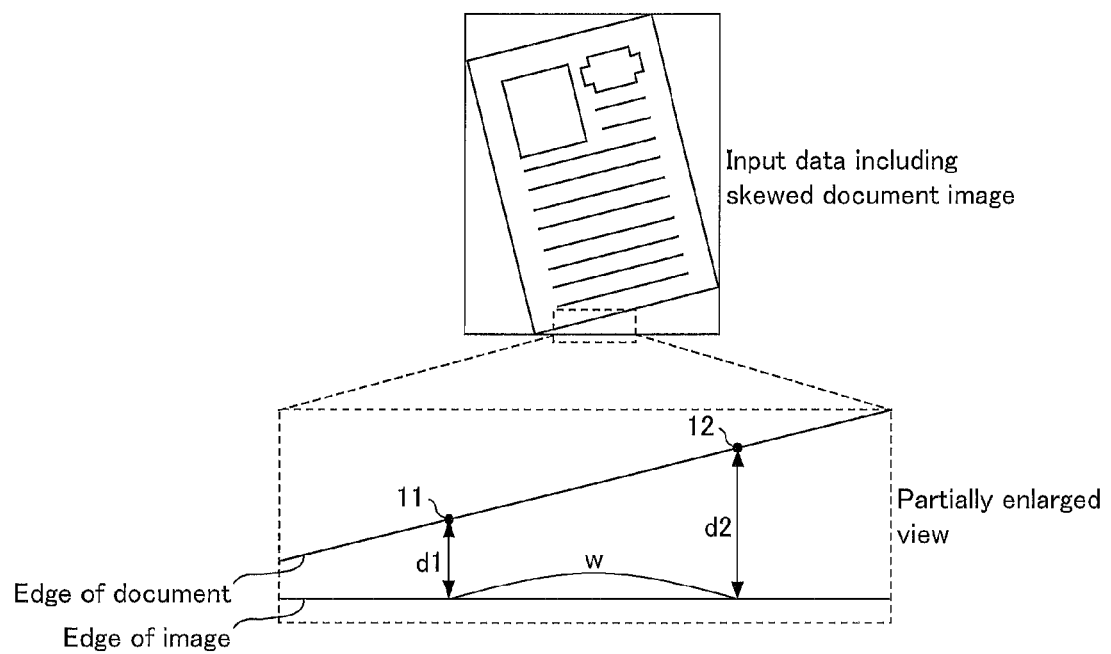
FIG. 34 shows an example of detection of skew of an image.

The output image determining section 114 selects, from the output target image data, two points on an edge between a captured object and a background. For example, as illustrated in FIG. 34, the output image determining section 114 selects two points 11 and 12 which are distanced leftward and rightward, respectively, in a lateral direction by w/2 from a center of sub-captured image data. Then, the output image determining section 114 calculates a distance $d_1$ between the selected point 11 and an end side of captured image data and a distance $d_2$ between the selected point 12 and the end side of the captured image data, thereby calculating a skew of the captured object in the captured image. In the example illustrated in FIG. 34, $\tan\theta=(d_2-d_1)/w$ where $\theta$ is an angle of skew. The output image determining section 114 calculates the value of $(d_2-d_1)/w$ and reads out an angle $\theta$ corresponding to the value from a table (see FIG. 35) etc. which has been prepared in advance.

The output image determining section 114 determines whether the detected angle $\theta$ is within a predetermined range (e.g. $-30°$ to $+30°$) or not, and outputs the result of the determination to the control section 109. The angle $\theta$ being within a predetermined range is one of conditions under which the process is carried out (process execution requirements).

(8-8-2) Determination of Geometrical Distortion

The output image determining section 114 specifies a quadrangle surrounded by lines respectively corresponding to four groups of edge pixels detected by the geometrical arrangement detecting section 111. Then, the output image determining section 114 calculates a ratio between facing sides of the specified quadrangle. Since there are two sets of facing sides, the output image determining section 114 determines a ratio in length with respect to each of the two sets.

In a case where a rectangular captured object is captured from a front, the captured object in a captured image is also rectangular, so that a ratio in length between facing sides of the captured object in the captured image is 1. On the other hand, in a case where a rectangular captured object is captured from a skew direction, the captured object in the captured image has a distorted quadrangular shape, so that a ratio in length between facing sides of the captured object in the captured image is different from 1. As an angle between a direction in which a captured object is captured and a direction normal to a plane where a document image which is the captured object is provided is larger, a difference between the ratio and 1 is larger. Accordingly, a ratio in length between facing sides can be considered as a feature indicative of a degree of geometrical distortion.

Thereafter, the output image determining section 114 determines whether both of the obtained two ratios are within a predetermined range (e.g. 0.5 to 2), and outputs the result of the determination to the control section 109. The predetermined range is predetermined as a correctable range in the image forming apparatus 200, and is stored in the storage section 108.

The output image determining section 114 may use, as another feature indicative of a degree of geometrical distortion, an angle formed by two lines including four intersections detected as above.

(8-8-3) Others

In addition to the above items to be determined, the output image determining section 114 may determine, for example, brightness, contrast, color balance, blurring (strong shaking of a hand) etc.

As for brightness, there is a case where overexposure (too bright) or underexposure (too dark) requires capturing an image again. Accordingly, the output image determining section 114 calculates, for example, the maximum value and the minimum value of pixel values of output target image data, and when the maximum value is not more than a certain threshold (e.g. 100 in 8 bit), the output image determining section 114 determines the output target image data as underexposure, and when the minimum value is not less than a certain threshold (e.g. 150 in 8 bit), the output image determining section 114 determines the output target image data as overexposure, and outputs the result of the determination to the control section 109.

As for contrast, when a difference between the maximum value and the minimum value of pixel values of the output target image data is not more than a predetermined threshold, the output image determining section 114 determines the output target image data as not having a sufficient contrast.

In determining brightness and contrast, the output image determining section 114 may determine brightness and contrast with respect to each color channel, or may use an average value (R+G+B/3) or a brightness value (0.299×R+0.587×G+0.114×B: in compliance with NTSC).

As for color balance, it is possible to grasp that a certain channel has excessive deviations by comparison of an average value, the maximum value, and the minimum value of each color channel (RGB). Accordingly, the output image determining section 114 calculates an average value (Ra, Ga, Ba) of values of individual color channels of a pixel whose brightness is equal to or close to the maximum brightness (maximum brightness to maximum brightness−5 or so), and in a case where a difference between the maximum value and the minimum value of each color channel is not less than a certain value [Max (Ra, Ga, Ba)−Min (Ra, Ga, Ba)>0.1×Max (Ra, Ga, Ba)], the output image determining section 114 determines the output target image data as not having sufficient color balance.

As for blurring (strong shaking of a hand, so-called motion blur), since an edge becomes less sharpened when blurring occurs, the output image determining section 114 generates an edge-enhanced image by using an edge extraction filter as illustrated in FIG. 27 and takes a histogram of the edge-enhanced image, and calculates a standard deviation value (second root of the variance). In a case where the standard deviation is not more than a predetermined threshold (e.g. 5), the output image determining section 114 determines that blurring occurs.

(8-8-4) Notification to User

The control section 109 receives the result of the determination from the output image determining section 114, and causes the display section 105 to display a message which urges a user to capture an image again, in accordance with the result of the determination.

For example, in a case where the control section 109 receives, from the output image determining section 114, a result of determination that the angle θ is not within the predetermined range, the control section 109 causes the display section 105 to display a message which urges a user to capture an image again in such a manner that a captured object is not skewed in a captured image.

In a case where the control section 109 receives, from the output image determining section 114, a result of determination that the feature indicative of the degree of geometrical distortion (ratio in length between facing sides of a captured object in a captured image) is not within the predetermined range, the control section 109 causes the display section 105 to display a message which urges a user to capture an image again in a direction normal to a plane where a document image is formed in a captured object.

(8-9) High-Resolution Correction

A description was made above as to a case where the high-resolution correction section 225 carries out a high-resolution correction on one output target image data. Alternatively, the high-resolution correction section may carry out a high-resolution correction on a plurality of output target image data. A method for such a high-resolution correction may be the method described in The Institute of Image Information and Television Engineers Journal, Vol. 62, No. 3, pp. 337 to 342 (2008).

In this case, the output target image determining section 113 causes a predetermined number of output target image data obtained by sequentially capturing images in a predetermined number (e.g. 2 to 15) with designated timing to be stored as a data set in the storage section 108. In general, sequentially captured images are substantially the same, but have slight misalignment due to camera shake.

Furthermore, in order to carry out a high-resolution correction on a plurality of output target image data, it is necessary for a predetermined number of image data, which number corresponds to a scale of resolution conversion, to be misaligned from each other in a predetermined amount. Accordingly, in the present modification, the output image determining section 114 of the mobile terminal apparatus 100 illustrated in FIG. 33 determines whether output target image data included in a data set includes a predetermined number of sub-captured image data different from each other in a predetermined amount, which data is necessary for carrying out a high-resolution correction in the image forming apparatus 200.

(8-9-1) Determination of Amount of Misalignment Between a Plurality of Images

Misalignment necessary for high-resolution correction which improves legibility of characters is misalignment between target image data in an amount less than one pixel (in decimal part). That is, misalignment in an amount in decimal part (less than one pixel), e.g. 0.3-0.7, is important. Misalignment in an amount in integer part is not considered for the high-resolution correction. For example, in a case where a plurality of images have misalignment in an amount corresponding to less than 1 pixel, such as 1.3 pixel and 2.3 pixel, it is possible to carry out a high-resolution correction on the plurality of images. In contrast, in a case where a plurality of images do not have misalignment in an amount corresponding to less than 1 pixel, such as 1 pixel and 2 pixel, it is impossible to carry out the high-resolution correction.

For example, in a case where scale of conversion is 2, the number of image data necessary for a high-resolution correction is 2, and an amount of misalignment between two image data is preferably less than 0.3-0.7 per pixel. For this purpose, in the storage section 108, there is stored beforehand information in which "2" which is a scale of resolution conversion, "2" which is the number of capturing images, and (process execution requirements "number of necessary image data: 2, amount of misalignment: 0.3-0.7" are associated with each other.

In a case where the scale of conversion is 4, the number of image data necessary for a high-resolution correction is 4. When regarding one of the image data as standard image data, an amount of misalignment between the standard image data and remaining three image data is preferably 0.2-0.3, 0.4-0.6, and 0.7-0.8, respectively, per pixel unit. For this purpose, in the storage section 108, there is stored beforehand information in which "4" which is a scale of resolution conversion, "4" which is the number of capturing images, and process execution requirements "number of necessary image data: 4, amount of misalignment: 0.2-0.3, 0.4-0.6, and 0.7-0.8" are associated with each other.

The control section 109 urges a user to select and enter a scale of resolution conversion, and sets process execution requirements, in accordance with the entered scale. The output image determining section 114 determines whether a data set includes output target image data which meets the set process execution requirements.

For convenience, the following description will discuss a case where 2 is selected as the scale of resolution conversion.

Initially, the output image determining section 114 selects any one of the output target image data, and selects a misalignment-detecting-use partial region from the output target image data (hereinafter first captured image). Since the misalignment-detecting-use partial region is used to calculate an amount of misalignment between the first captured image and remaining output target image data (hereinafter second captured image), the misalignment-detecting-use partial region is preferably a region where pixel values change greatly (region with a distinct pattern). Accordingly, the output image determining section 114 extracts the misalignment-detecting-use partial region through a method below.

The output image determining section 114 specifies a pixel existing at a center of gravity of the region of the captured object, and regards the pixel as a target pixel. Then, the output image determining section 114 selects a region of n×n pixels including the target pixel. The output image determining section 114 determines whether the selected region meets a selection requirement below. When the selected region meets the selection requirement, the output image determining section 114 regards the selected region as the misalignment-detecting-use partial region. On the other hand, when the selected region does not meet the selection requirement, the output image determining section 114 moves the selected region in accordance with a predetermined offset, and makes the same determination on the moved selected region. Thus, the output image determining section 114 extracts the misalignment-detecting-use partial region.

Examples of the selection requirement include two requirements below.

One of the examples is use of a value based on variance in the region. When a pixel value of an n×n pixel region near the target pixel is P(i), a variance value Variance (x) of the partial region is expressed by an Equation (1) below. The selection requirement herein is the variance value Variance (x) being not less than a predetermined threshold. For simplicity, only the numerator in the equation may be considered.

$$\text{Varience}(x) = \frac{n \times \sum_{i=0}^{n-1} [P(i)]^2 - \left[\sum_{i=0}^{n-1} P(i)\right]^2}{n \times n} \quad \text{Equation (1)}$$

The other of the examples is obtained as follows. An edge extraction filter such as a first order differential filter as illustrated in FIG. 27 is applied to an n×n pixel region near the target pixel, the region is binarized, and a sum is obtained. The selection requirement herein is the sum being not less than a predetermined threshold (e.g. not less than 5% of the number of pixels in the partial region).

Next, the output image determining section 114 cuts out, from the second captured image, a misalignment-detecting-use partial image b (m×m) (m>n) whose center is at substantially the same position as that of a misalignment-detecting-use partial image a (n×n) thus obtained of the first captured image. The misalignment-detecting-use partial image b is cut out in such a manner that coordinates of a central pixel in the misalignment-detecting-use partial image a of the first captured image are equal to those of a central pixel in the misalignment-detecting-use partial image b of the second captured image.

Thereafter, a region in the cut-out misalignment-detecting-use partial image b which region matches the misalignment-detecting-use partial image a most appropriately is obtained with sub-pixel precision. Such a region can be obtained by normalized correlation pattern matching using the misalignment-detecting-use partial image a as a template.

As an example of the normalized correlation pattern matching, correlation is calculated using a normalized correlation equation which is well known. In general, a correlation equation of two patterns Input (I) and Target (T) each consisting of N pixels can be expressed by an Equation (2) below. In the equation, α, β, and γ can be expressed respectively as follows.

$$S = \{\alpha/\sqrt{\beta \times \gamma}\} \quad \text{Equation (2)}$$

$$\alpha = N\Sigma(I \times T) - (\Sigma I) \times (\Sigma T)$$

$$\beta = N\Sigma(I \times I) - (\Sigma I) \times (\Sigma I)$$

$$\gamma = N\Sigma(T \times T) - (\Sigma T) \times (\Sigma T)$$

For example, in a case where n=5 and m=7, when the correlation equation is calculated with respect to each region (n×n) in the misalignment-detecting-use partial image b (m×m) which region has the same size as the misalignment-detecting-use partial image a, a correlation value Map of 3×3 in size is generated. A fitting quadric is obtained by using the correlation value Map. The quadric is obtained, for example, in such a manner that six points having high correlation out of nine points are selected in S (x,y)=a×x×x+b×x×y+c×y×y+d×x+e×y+f, and simultaneous equations are solved and individual coefficients are obtained. In a case where decimal parts of extreme (maximum) coordinates (both of x and y) of this function are within a predetermined range (herein, 0.3-0.7), it is determined that the process execution requirements "number of necessary image data: 2, amount of misalignment: 0.3-0.7" are met.

The extreme coordinates may be obtained by partially differentiating the quadratic equation to obtain coordinates where values obtained by differentiating the quadratic equation by x and y are 0. In this process, it is unnecessary to actually calculate individual coefficients (a to f), and so it is more efficient to directly use correlation values ($S_1$ to $S_6$). An Equation (3) to be solved is as follows. The origin is set for each window of interest.

$$x = \frac{2 \times S_3 \times S_4 - S_5 \times S_2}{S_2^2 - 4 \times S_1 \times S_3} \quad \text{Equation (3)}$$

$$y = \frac{2 \times S_1 \times S_5 - S_2 \times S_4}{S_2^2 - 4 \times S_1 \times S_3}$$

Misalignment is confirmed with sub-pixel precision at least at one position, and preferably at a plurality of positions.

Then, the output image determining section 114 outputs, to the control section 109, a result of determining whether the process execution requirements are met or not.

(8-9-2) High-Resolution Correction Using a Plurality of Output Target Image Data Next, the following describes processing of the high-resolution correction section 225 in the image forming apparatus 200. The high-resolution correction section 225 carries out high-resolution correction based on plural sets of output target image data contained in a data set received from the mobile terminal apparatus 100.

Several kinds of methods for generating a high resolution image from a plurality of image data are presented in The Institute of Image Information and Television Engineers Journal, Vol. 62, No. 3, pp. 337-342 (2008). In general, a high-resolution correction is made by a positioning process of positioning a plurality of images and a reconstructing process of reconstructing the plurality of images. In the present embodiment, as an example of the positioning process, the method of normalized correlation pattern matching described in the item (8-9-1) is used. That is, the plurality of images can be positioned to match each other by displacing the plurality of images by an amount of misalignment for which S (x, y) shows extreme values.

Next, the high-resolution correction section 225 carries out the reconstructing process. That is, the high-resolution correction section 225 generates reconstructed image data whose number of pixels corresponds to a scale after resolution conversion. In this process, the size of an image indicated by the reconstructed image data is equal to the size of a captured image. Then, the high-resolution correction section 225 determines pixel values of individual pixels of the reconstructed image data as follows. That is, with respect to each pixel (reconstructed pixel) in the reconstructed image data, the high-resolution correction section 225 determines, out of a plurality of captured images, pixels (captured pixels) of a captured image which pixels are near the reconstructed pixel, and carries out interpolation by a general interpolation method (such as linear interpolation and bi-cubic interpolation).

Figure 36:
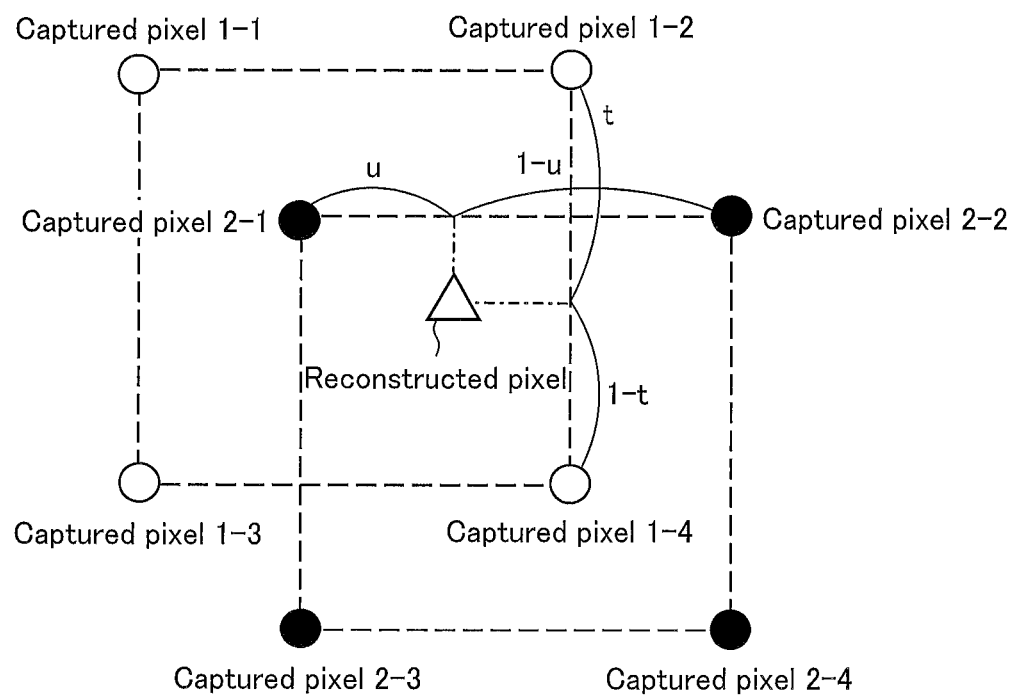
FIG. 36 shows an example of determining a reconstructed pixel value of an image.

Specifically, as illustrated in FIG. 36, the high-resolution correction section 225 selects, both in lateral and longitudinal directions, captured pixels near a reconstructed pixel of interest, e.g. two captured pixels joined by a lattice line (dotted line in FIG. 36) which is closest to the reconstructed pixel of interest. Assume here that the two captured pixels joined by a lattice line closest to the reconstructed pixel of interest in a lateral direction are a captured pixel 1-2 (pixel value: $Vi_{1-2}$. Hereinafter similarly) and a captured pixel 1-4 in first output target image data, and the two captured pixels joined by a lattice line closest to the reconstructed pixel of interest in a longitudinal direction are a captured pixel 2-1 and a captured pixel 2-2 in second output target image data. Selection of captured pixels near a reconstructed pixel is made with respect to a plurality of output target image data having been subjected to the correction of geometrical distortion and the correction of lens distortion. This allows a high-resolution correction on an image while the image has been already subjected to the correction of geometrical distortion and the correction of lens distortion.

Corrected coordinates may be calculated based on coordinates of the plurality of captured images which coordinates are based on consideration of corresponding geometrical correction and lens distortion correction on the plurality of captured images. That is, only corrected values of the geometrical correction and the lens distortion correction may be calculated, and coordinates conversion may be made using the corrected values after the reconstructing process.

Then, the high-resolution correction section 225 calculates, with respect to both of lateral and longitudinal directions, an intersection of (i) a line which is perpendicular to a line segment connecting the selected two captured pixels and which includes the reconstructed pixel of interest and (ii) the line segment. As illustrated in FIG. 36, in a case where the intersection in the longitudinal direction divides internally the line segment in a ratio of t:1−t and the intersection in the lateral direction divides internally the line segment in a ratio of u:1−u, the high-resolution correction section may calculate a pixel value $V_s$ of the reconstructed pixel of interest in accordance with an Equation (4) below. In this case, a linear interpolation is carried out. Pixel values of all reconstructed pixels are calculated similarly, so that image data reconstructed to have high resolution can be obtained as high resolution image data.

$$V_s = \{(1-t)V_{i1-2} + tV_{i1-4} + (1-u)V_{i2-1} + uV_{i2-2}\}/2 \quad \text{Equation (4)}$$

Interpolation may be made by another method. A method described in The Institute of Image Information and Television Engineers Journal, Vol. 62, No. 3, pp. 337 to 342 (2008) may be employed. For example, there may be employed a method for interpolation which minimizes evaluation function corresponding to posterior probability based on estimation, such as MAP (Maximum A Posteriori) method.

(8-9-3) Image-Capturing Section

An explanation was made above as to a case of using misalignment between a plurality of captured images which is caused by camera shake when the image-capturing section 101 sequentially captures a plurality of images. Alternatively, the image-capturing section 101 may slightly move an imaging element (CCD or CMOS) or a lens when sequentially capturing a plurality of images. This allows surely causing misalignment among a plurality of captured images.

(8-10) Timing of Transmitting Image Data from Mobile Terminal Apparatus to Image Forming Apparatus A description was made above as to a case where output target image data accumulated in a document capturing mode is accumulated in the mobile terminal apparatus 100, and at timing when an instruction for transmission is inputted, the output target image data having been accumulated so far are transmitted at the same time. However, timing of transmitting output target image data from the mobile terminal apparatus 100 to the image forming apparatus 200 is not limited to this.

For example, every time when output target image data is stored in the storage section 108 in the document capturing mode, the output target image data may be transmitted to the image forming apparatus 200. In this configuration, in most cases, a user is not present near the image forming apparatus 200. Accordingly, the communication section 104 of the mobile terminal apparatus 100 may transmit output target image data to the image forming apparatus 200 via a portable phone network and the Internet.

(8-11) Output Processing Information

A description was made above as to a case where the mobile terminal apparatus 100 obtains output processing information and transmits the output processing information to the image forming apparatus 200. Alternatively, the image forming apparatus 200 may obtain output processing information (information indicative of type of an output process and setting condition for the output process) when the image forming apparatus 200 obtains user information for user authentication.

(8-12) Output Process

In the image forming apparatus 200, the control section 212 may convert high resolution image data generated in the image processing section 202 into a hyper compressed PDF before carrying out a filing process or an e-mail sending process. Hyper compressed PDF data is PDF data obtained by separating a background portion and a text portion in image data and subjecting the background portion and the text portion to optimal compression processes, respectively. This ensures good legibility and reduction in image file size.

The control section 212 may carry out an OCR process on high resolution image data generated by the image processing section 202, before carrying out a filing process or an e-mail sending process on the high resolution image data, thereby generating text data. Then, the control section 212 may convert the high resolution image data into PDF and add the generated text data as a transparent text to the PDF. The transparent text is data for overlapping (embedding) recognized characters as text information on (in) image data in such a manner that the characters do not appear to a user. For example, in a PDF file, an image file obtained by adding a transparent text to image data is used generally. The control section 212 may output PDF data with the generated transparent text. This allows outputting an electronic document with high utility, such as a file which allows text search.

(8-13) Image Processing Section Included in Image Forming Apparatus

A description was made above as to a case where the image processing section 202 included in the image forming apparatus 200 carries out the high-resolution correction etc. Alternatively, the image forming apparatus 200 may cause a server including the image processing section 202 to carry out the high-resolution correction and other image processes (such as correction of geometrical distortion, correction of lens distortion, correction of contrast, and correction of color balance) on a data set for high resolution output. In this case, the server serves as an image forming apparatus which carries out the high-resolution correction on the data set for high resolution output received from the mobile terminal apparatus 100, and which outputs corrected high resolution image data.

(9) Program and Recording Medium

The present invention encompasses a computer-readable recording medium in which a program to be executed by a computer is stored and in which a method for transmitting an image captured by the mobile terminal apparatus 100 to the image forming apparatus 200 and outputting the image from the image forming apparatus 200 is stored.

Consequently, it is possible to provide a portable recording medium in which a program code for carrying out the above processes (executable program, intermediate code program, and source program) is stored.

In the present embodiment, the recording medium may be a program medium composed of a memory (e.g. ROM) which is not illustrated because the process is carried out in a microcomputer, or may be a program medium which is readable by inserting a recording medium to a program-reading apparatus (not illustrated) serving as an external storage apparatus.

In either case, the stored program may be accessed and executed by a microprocessor. Alternatively, in either case, the program code may be read out and downloaded to a program storage area (not illustrated) of a microcomputer so that the program is executed. A program for downloading may be stored in a main apparatus in advance.

It should be noted here that the program medium is a non-transitory tangible medium arranged to be separable from the main body. The recording medium may be, for example, a tape, such as a magnetic tape or a cassette tape; a magnetic disk, such as a flexible disk or a hard disk, or an optical disk, such as CD-ROM/MO/MD/DVD; a card, such as an IC card (memory card) or an optical card; or a semiconductor memory, such as a mask ROM/EPROM (erasable programmable read-only memory)/EEPROM (electrically erasable programmable read-only memory)/flash ROM. All these storage media hold a program in a fixed manner.

Alternatively, since the present embodiment is a system configuration connectable to communication networks including the Internet, the program medium may be a medium carrying the program code in a flowing manner as in the downloading of a program over a communication network. Further, when the program code is downloaded over a communications network in this manner, the download program may be stored in advance in the main apparatus or installed from another recording medium. The present invention can be realized in the form of a computer data signal, embedded in a carrier wave, in which the program code is embodied electronically.

The recording medium is read by a program-reading apparatus provided in the mobile terminal apparatus 100 or the image forming apparatus 200, whereby the aforementioned image processing method is executed.

As described above, an image-capturing apparatus of an embodiment of the present invention includes: an image-capturing section capturing an object, which is rectangular; display means for displaying a captured image, which is an image captured by the image-capturing section; an output target image determining section determining, as an output target image, the captured image displayed on the display means at a designated timing; a detecting section detecting groups of edge pixels arranged in a shape of a line segment on the image captured by the image-capturing section; and a display processing section causing a contour line representative of a contour of the object to be displayed on the captured image displayed on the display means in such a manner that the contour line is superimposed on the groups of edge pixels detected by the detecting section.

According to the arrangement, the contour line representative of the contour of the object is displayed so as to be superimposed on the groups of edge pixels detected by the detecting section. The groups of edge pixels detected by the detecting section, which are arranged in the shape of a line segment, are highly likely to represent a boundary between the rectangular object and a background. Therefore, when the contour line representative of the contour of the object is displayed so as to be superimposed on the groups of edge pixels, a user can easily recognize on which part of the captured image the object is located. As a result, the user can load image data into the storage section after easily recognizing on which part of the captured image the object is located.

Furthermore, the image-capturing apparatus of the embodiment of the present invention is preferably arranged to further include a switching (selecting) section switching on and off setting of a contour line display function of the display processing section.

According to the arrangement, a user can switch the contour line display function on (select a state where the contour line display function is enabled) in a case where the object is a rectangular object such as a document, and switch the contour line display function off (select a state where the contour line display function is disabled) in a case where the object does not require display of a contour line.

Furthermore, the image-capturing apparatus of the embodiment of the present invention is preferably arranged such that in a case where the contour line display function is set to be in an on-state by the switching section, the display processing section causes the display means to display an image obtained by geometrically correcting a region surrounded by the contour line out of the captured image to a predetermined rectangular shape.

According to the arrangement, by operating the switching section, it is possible to display an image obtained by geometrical correction of the captured image.

Furthermore, the image-capturing apparatus of the embodiment of the present invention is preferably arranged such that the detecting section detects four groups of edge pixels; and the display processing section causes the display means to display first missing information indicating that one corner of the object is outside an image area captured by the image-capturing section, in a case where three of vertexes of a quadrangle surrounded by straight lines corresponding to respective four line segments represented by the four groups of edge pixels detected by the detecting section are within the captured image area and a remaining one of the vertexes of the quadrangle is outside the captured image area.

According to the arrangement, a user who has confirmed the first missing information can easily recognize that one corner of the object is outside the captured image area.

Furthermore, the image-capturing apparatus of the embodiment of the present invention is preferably arranged such that the detecting section detects three groups of edge pixels; and the display processing section causes the display means to display second missing information indicating that one side of the object which is rectangular is outside an image area captured by the image-capturing section, in a case where only two of intersections of straight lines corresponding to respective three line segments represented by the three groups of edge pixels detected by the detecting section are within the captured image area.

According to the arrangement, a user who has confirmed the second missing information can easily recognize that one side of the object which is rectangular is outside the captured image area.

Furthermore, the image-capturing apparatus of the present invention is preferably arranged such that assuming that said one of the vertexes of the quadrangle that is outside the captured image area is a first vertex, the display processing section causes the first missing information to be displayed in vicinity of the first vertex.

Alternatively, the image-capturing apparatus of the embodiment of the present invention is preferably arranged such that (i) said one of the vertexes of the quadrangle that is outside the captured image area is a first vertex, (ii) two vertexes adjacent to the first vertex are a second vertex and a third vertex, (iii) a vertex that is diagonally opposite to the first vertex is a fourth vertex, (iv) an intersection of a line connecting the first vertex and the second vertex and a frame of the captured image area is a first intersection, and (v) an intersection of a line connecting the first vertex and the third vertex and the frame of the captured image area is a second intersection, the display processing section causes the first missing information to be displayed within a predetermined range from a line segment connecting the first intersection and the second intersection.

According to the arrangement, a user can easily recognize that one corner of the object is outside the captured image area in the vicinity of the first missing information.

Furthermore, the image-capturing apparatus of the embodiment of the present invention is preferably arranged such that assuming that (i) the straight lines corresponding to the respective three line segments represented by the three groups of edge pixels detected by the detecting section are a first straight line, a second straight line, and a third straight line, (ii) a first intersection of the first straight line and the second straight line and a second intersection of the second straight line and the third straight line are within the captured image area, (iii) one of intersections of the first straight line and a frame of the captured image area which one is farther from the first intersection is a third intersection, and (iv) one of intersections of the third straight line and the frame of the captured image area which one is farther from the second intersection is a fourth intersection, the display processing section causes the second missing information to be displayed within a predetermined range from a line segment connecting the third intersection and the fourth intersection.

Alternatively, the image-capturing apparatus of the embodiment of the present invention is preferably arranged such that the detecting section (i) divides the captured image area into an upper half and a lower half, (ii) detects, as an upper side group of edge pixels, a group of edge pixels arranged (laid) in the shape of a line segment in the upper half in a direction that is within a predetermined angular range from a width direction of the captured image area, and (iii) detects, as a lower side group of edge pixels, a group of edge pixels arranged in the shape of a line segment in the lower half in a direction that is within a predetermined angular range from the width direction of the captured image area; the detecting section (i) divides the captured image area into a left half and a right half, (ii) detects, as a left side group of edge pixels, a group of edge pixels arranged in the shape of a line segment in the left half in a direction that is within a predetermined angular range from a height direction of the captured image area, and (iii) detects, as a right side group of edge pixels, a group of edge pixels arranged in the shape of a line segment in the right half in a direction that is within a predetermined angular range from the height direction of the captured image area; the display processing section (i) causes the second missing information to be displayed within a predetermined range from an upper side of a frame of the captured image area in a case where three groups of edge pixels excluding the upper side group of edge pixels have been detected by the detecting section, (ii) causes the second missing information to be displayed within a predetermined range from a left side of the frame of the captured image area in a case where three groups of edge pixels excluding the left side group of edge pixels have been detected by the detecting section, (iii) causes the second missing information to be displayed within a predetermined range from a right side of the frame of the captured image area in a case where three groups of edge pixels excluding the right side group of edge pixels have been detected by the detecting section, and (iv) causes the second missing information to be displayed within a predetermined range from a lower side of the frame of the captured image area in a case where three groups of edge pixels excluding the lower side group of edge pixels have been detected by the detecting section.

According to the arrangement, a user can easily recognize that one side of the object which is rectangular is outside the captured image area in the vicinity of the second missing information.

Furthermore, the image-capturing apparatus of the embodiment of the present invention is preferably arranged such that the display processing section causes the contour line and the first missing information to be displayed in different colors from each other.

Furthermore, the image-capturing apparatus of the embodiment of the present invention is preferably arranged such that the display processing section causes the contour line and the second missing information to be displayed in different colors from each other.

According to the arrangement, a user can more easily recognize the first missing information or the second missing information.

Furthermore, the image-capturing apparatus of the embodiment of the present invention is preferably arranged such that the detecting section carries out a detection process of detecting groups of edge pixels arranged in the shape of a line segment with respect to the captured image by use of one detection method selected from a plurality of detection methods for detecting the groups of edge pixels arranged in the shape of a line segment; in a case where the detecting section fails to detect the groups of edge pixels arranged in the shape of a line segment in the captured image to be processed, the detecting section carries out the detection process with respect to a next captured image to be processed by use of a detection method different from the detection method used for the captured image preceding the next captured image to be processed; and in a case where the detecting section succeeds in detecting the groups of edge pixels arranged in the shape of a line segment in the captured image to be processed, the detecting section carries out the detection process with respect to a next captured image to be processed by use of an identical detection method to the detection method used for the captured image preceding the next captured image to be processed.

According to the arrangement, it is possible to apply an optimum detection method depending on the background of the captured image or an illumination state.

Furthermore, the image-capturing apparatus of the embodiment of the present invention is preferably arranged such that the output target image determining section determines that it is the designated timing in a case where, for a predetermined period of time, (i) four groups of edge pixels are detected by the detecting section, (ii) all of four vertexes of a quadrangle surrounded by straight lines corresponding to respective four line segments represented by the four groups of edge pixels are within the captured image area, and (iii) an amount of variation of the vertexes is equal to or lower than a predetermined threshold value.

According to the arrangement, the output target image determining section can automatically determine output target image data. Since the output target image data can be determined without user's operation of the shutter button, it is possible to prevent the object from blurring or sticking out from the captured image area due to operation of the shutter button.

A captured image processing system of an embodiment of the present invention includes: the image-capturing apparatus; and an image output apparatus, the image output apparatus acquiring image data representative of an output target image determined by the output target image determining section and outputting the image data or processed image data obtained by subjecting the image data to image processing.

Also according to the arrangement, the user can load image data outputted from the image output apparatus into the storage section after easily recognizing on which part of the captured image the object is located.

Note that the image-capturing apparatus may be realized by a computer. In this case, the present invention encompasses (i) a program which allows the image-capturing apparatus to be realized by a computer by causing the computer to function as each section of the image-capturing apparatus and (ii) a computer-readable recording medium in which the program is recorded.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is applicable to a captured image processing system that carries out data communication between a mobile terminal apparatus and an image display apparatus.

REFERENCE SIGNS LIST

10: Shutter button
100: Mobile terminal apparatus (image-capturing apparatus)
101: Image-capturing section
105: Display section
108: Storage section
109: Control section
110: Captured image area determining section
111: Geometrical arrangement detecting section (detecting section)
112: Display processing section
113: Output target image determining section
115: Switching section
200: Image forming apparatus (image output apparatus)
300: Image display apparatus

The invention claimed is:

1. An image-capturing apparatus, comprising:
a sensor capturing an image of an object which is rectangular;
a display displaying a captured image, which is an image captured by the sensor; and
a processor configured to:
determine, as an output target image, the captured image displayed on the display at a designated timing;
detect four groups of edge pixels arranged in a shape of a line segment on the image captured by the sensor; and
cause the display to display first missing information indicating that one corner of the object is outside an image area captured by the sensor, in a case where three of vertexes of a quadrangle surrounded by straight lines corresponding to respective four line segments represented by the detected four groups of edge pixels are within the captured image area and a remaining one of the vertexes of the quadrangle is outside the captured image area.

2. The image-capturing apparatus according to claim 1, wherein assuming that said one of the vertexes of the quadrangle that is outside the captured image area is a first vertex, the processor causes the first missing information to be displayed in vicinity of the first vertex.

3. The image-capturing apparatus according to claim 1, wherein assuming that (i) said one of the vertexes of the quadrangle that is outside the captured image area is a first vertex, (ii) two vertexes adjacent to the first vertex are a second vertex and a third vertex, (iii) a vertex that is diagonally opposite to the first vertex is a fourth vertex, (iv) an intersection of a line connecting the first vertex and the second vertex and a frame of the captured image area is a first intersection, and (v) an intersection of a line connecting the first vertex and the third vertex and the frame of the captured image area is a second intersection, the processor causes the first missing information to be displayed within a predetermined range from a line segment connecting the first intersection and the second intersection.

4. The image-capturing apparatus according to claim 1, wherein:
the processor carries out a detection process of detecting groups of edge pixels arranged in the shape of a line segment with respect to the captured image by use of one detection method selected from a plurality of detection methods for detecting the groups of edge pixels arranged in the shape of a line segment;
in a case where the processor fails to detect the groups of edge pixels arranged in the shape of a line segment in the captured image to be processed, the processor carries out the detection process with respect to a next captured image to be processed by use of a detection method different from the detection method used for the captured image preceding the next captured image to be processed; and
in a case where the processor succeeds in detecting the groups of edge pixels arranged in the shape of a line segment in the captured image to be processed, the processor carries out the detection process with respect to a next captured image to be processed by use of an identical detection method to the detection method used for the captured image preceding the next captured image to be processed.

5. The image-capturing apparatus according to claim 1, wherein the processor determines that it is the designated timing in a case where, for a predetermined period of time, (i) four groups of edge pixels are detected by the processor, (ii) all of four vertexes of a quadrangle surrounded by straight lines corresponding to respective four line segments represented by the four groups of edge pixels are within the captured image area, and (iii) an amount of variation of the vertexes is equal to or lower than a predetermined threshold value.

6. The image-capturing apparatus according to claim 1, wherein the processor causes a contour line representative of a contour of the object to be displayed on the captured image displayed on the display in such a manner that the contour line is superimposed on the detected groups of edge pixels detected.

7. The image-capturing apparatus according to claim 6, wherein the processor causes the contour line and the first missing information to be displayed in different colors from each other.

8. The image-capturing apparatus according to claim 6, further comprising a switch switching on and off setting of a contour line display function of the processor.

9. The image-capturing apparatus according to claim 8, wherein in a case where the contour line display function is set to be in an on-state by the switch, the processor causes the display to display an image obtained by geometrically correcting a region surrounded by the contour line out of the captured image to a predetermined rectangular shape.

10. An image-capturing apparatus, comprising:
   a sensor capturing an image of an object which is rectangular;
   a display displaying a captured image, which is an image captured by the sensor; and
   a processor configured to:
      determine, as an output target image, the captured image displayed on the display at a designated timing;
      detect three groups of edge pixels arranged in a shape of a line segment on the image captured by sensor; and
      causes the display to display second missing information indicating that one side of the object which is rectangular is outside an image area captured by the sensor, in a case where only two of intersections of straight lines corresponding to respective three line segments represented by the detected three groups of edge pixels are within the captured image area.

11. The image-capturing apparatus according to claim 10, wherein assuming that (i) the straight lines corresponding to the respective three line segments represented by the detected three groups of edge pixels are a first straight line, a second straight line, and a third straight line, (ii) a first intersection of the first straight line and the second straight line and a second intersection of the second straight line and the third straight line are within the captured image area, (iii) one of intersections of the first straight line and a frame of the captured image area which one is farther from the first intersection is a third intersection, and (iv) one of intersections of the third straight line and the frame of the captured image area which one is farther from the second intersection is a fourth intersection, the processor causes the second missing information to be displayed within a predetermined range from a line segment connecting the third intersection and the fourth intersection.

12. The image-capturing apparatus according to claim 10, wherein the processor:
   (i) divides the captured image area into an upper half and a lower half, (ii) detects, as an upper side group of edge pixels, a group of edge pixels arranged in the shape of a line segment in the upper half in a direction that is within a predetermined angular range from a width direction of the captured image area, and (iii) detects, as a lower side group of edge pixels, a group of edge pixels arranged in the shape of a line segment in the lower half in a direction that is within a predetermined angular range from the width direction of the captured image area;
   (i) divides the captured image area into a left half and a right half, (ii) detects, as a left side group of edge pixels, a group of edge pixels arranged in the shape of a line segment in the left half in a direction that is within a predetermined angular range from a height direction of the captured image area, and (iii) detects, as a right side group of edge pixels, a group of edge pixels arranged in the shape of a line segment in the right half in a direction that is within a predetermined angular range from the height direction of the captured image area;
   (i) causes the second missing information to be displayed within a predetermined range from an upper side of a frame of the captured image area in a case where three groups of edge pixels excluding the upper side group of edge pixels have been detected, (ii) causes the second missing information to be displayed within a predetermined range from a left side of the frame of the captured image area in a case where three groups of edge pixels excluding the left side group of edge pixels have been detected, (iii) causes the second missing information to be displayed within a predetermined range from a right side of the frame of the captured image area in a case where three groups of edge pixels excluding the right side group of edge pixels have been detected by, and (iv) causes the second missing information to be displayed within a predetermined range from a lower side of the frame of the captured image area in a case where three groups of edge pixels excluding the lower side group of edge pixels have been detected.

13. The image-capturing apparatus according to claim 10, wherein the processor causes a contour line representative of a contour of the object to be displayed on the captured image displayed on the display in such a manner that the contour line is superimposed on the detected groups of edge pixels.

14. The image-capturing apparatus according to claim 13, further comprising a switch switching on and off setting of a contour line display function of the processor.

15. The image-capturing apparatus according to claim 14, wherein in a case where the contour line display function is set to be in an on-state by the switch, the processor causes the display to display an image obtained by geometrically correcting a region surrounded by the contour line out of the captured image to a predetermined rectangular shape.

16. The image-capturing apparatus according to claim 13, wherein the processor causes the contour line and the second missing information to be displayed in different colors from each other.

17. A captured image processing system comprising:
   the image-capturing apparatus as set forth in claim 1; and
   an image output apparatus,
   the image output apparatus acquiring image data representative of an output target image determined by the processor and outputting the image data or processed image data obtained by subjecting the image data to image processing.

18. A non-transitory computer-readable recording medium in which a program for causing an image-capturing apparatus as set forth in claim 1 to operate is recorded.

19. A captured image processing system comprising:
the image-capturing apparatus as set forth in claim 10; and
an image output apparatus,
the image output apparatus acquiring image data representative of a determined output target image and outputting the image data or processed image data obtained by subjecting the image data to image processing.

20. A non-transitory computer-readable recording medium in which a program for causing an image-capturing apparatus as set forth in claim 10 to operate is recorded.

* * * * *